US006208859B1

(12) United States Patent
Halvorson

(10) Patent No.: US 6,208,859 B1
(45) Date of Patent: Mar. 27, 2001

(54) SERVICE PREEMPTION FOR MOBILE TERMINALS IN A MOBILE SATELLITE COMMUNICATIONS SYSTEM

(75) Inventor: David H. Halvorson, Cedar Rapids, IA (US)

(73) Assignee: Motient Services Inc., Reston, VA (US)

( * ) Notice: Subject to any disclaimer, the term of this patent is extended or adjusted under 35 U.S.C. 154(b) by 0 days.

(21) Appl. No.: 09/030,953

(22) Filed: Feb. 26, 1998

Related U.S. Application Data

(60) Provisional application No. 60/039,261, filed on Feb. 26, 1997.

(51) Int. Cl.[7] .................................................. H04Q 7/20
(52) U.S. Cl. ...................... 455/430; 455/426; 455/428; 455/12.1; 340/988
(58) Field of Search ..................... 455/430, 427, 455/428, 426, 512, 513, 98, 12.1, 13.1, 13.3, 456; 340/438, 988, 466; 370/277, 281, 296, 328, 343, 329

(56) References Cited

U.S. PATENT DOCUMENTS

| | | | |
|---|---|---|---|
| 4,774,707 | * | 9/1988 | Raychaudhuri .................... 370/95 |
| 4,839,908 | * | 6/1989 | Takayama ......................... 375/104 |
| 5,133,081 | * | 7/1992 | Mayo .................................. 455/18 |
| 5,260,989 | * | 11/1993 | Jenness et al. .................. 370/277 |
| 5,392,450 | * | 2/1995 | Nossen .............................. 455/12.1 |
| 5,448,623 | * | 9/1995 | Wiedeman et al. .............. 379/59 |
| 5,475,597 | * | 12/1995 | Buck ................................. 364/443 |
| 5,523,997 | * | 6/1996 | Bishop, Jr. ........................ 370/54 |
| 5,717,830 | * | 2/1998 | Sigler et al. ..................... 455/426 |
| 5,719,771 | * | 2/1998 | Buck et al. ...................... 364/443 |
| 5,732,359 | * | 3/1998 | Baranowsky, II et al. ...... 455/552 |
| 5,842,125 | * | 11/1998 | Modzelesky et al. ........... 455/426 |
| 5,892,758 | * | 4/1999 | Argyroudis ....................... 370/335 |
| 5,924,014 | * | 7/1999 | Vanden Heavel et al. ...... 455/13.1 |
| 5,937,352 | * | 8/1999 | Courtney et al. ................ 455/435 |
| 5,974,034 | * | 10/1999 | Chin et al. ....................... 370/328 |
| 6,058,307 | * | 5/2000 | Garner ............................. 455/428 |

FOREIGN PATENT DOCUMENTS 2115251    2/1993   (CA) .

* cited by examiner

Primary Examiner—Dwayne D. Bost
Assistant Examiner—Joy K. Redmon
(74) Attorney, Agent, or Firm—Irah H. Donner; Hale and Dorr LLP

(57) ABSTRACT

In a communication system, such as a satellite communication system, a method of performing a priority process for a priority event includes the steps of continuously monitoring, by a mobile communication system (MCS), for receipt of a priority message, transmitting, by a controller, a first message including the priority message in the communication system, and receiving the first message by the MCS. The method also includes the steps of receiving, by the MCS, a second message to be transmitted to the communication system, and performing, by the MCS, a message segment protocol to the second message creating message segments. The method also includes the steps of transmitting, by the at least one MCS, each message segment until all of the message segments have been transmitted, and receiving, by the controller, the message segments, until all of the message segments have been received.

43 Claims, 27 Drawing Sheets

1. ALL MES TRANSMISSIONS SHALL HAVE A PRIORITY ASSIGNED TO THEM THAT PRESERVES THE PRIORITY AND PREEMPTIVE ACCESS GIVEN TO THE AERONAUTICAL DISTRESS AND SAFETY-RELATED COMMUNICATIONS SHARING THE BAND.

2. EACH MES WITH A REQUIREMENT TO HANDLE DISTRESS AND SAFETY-RELATED COMMUNICATIONS SHALL BE CAPABLE OF RECOGNIZING MESSAGE AND CALL PRIORITY IDENTIFICATION WHEN TRANSMITTED FROM ITS ASSOCIATED LAND EARTH STATION (LES).

3. EACH MES SHALL BE ASSIGNED A UNIQUE TERMINAL IDENTIFICATION NUMBER THAT WILL BE TRANSMITTED UPON ANY ATTEMPT TO GAIN ACCESS TO A SYSTEM.

4. AFTER AN MES HAS GAINED ACCESS TO A SYSTEM, THE MOBILE TERMINAL SHALL BE UNDER CONTROL OF AN LES AND SHALL OBTAIN ALL CHANNEL ASSIGNMENTS FROM IT.

5. ALL MESs THAT DO NOT CONTINUOUSLY MONITOR A SEPARATE SIGNALING CHANNEL SHALL HAVE PROVISION FOR SIGNALING WITHIN THE COMMUNICATION CHANNEL.

6. EACH MES SHALL AUTOMATICALLY INHIBIT ITS TRANSMISSIONS IF IT IS NOT CORRECTLY RECEIVING A SEPARATE SIGNALING CHANNEL OR SIGNALING WITHIN THE COMMUNICATIONS CHANNEL FROM ITS ASSOCIATED LES.

7. EACH MES SHALL AUTOMATICALLY INHIBIT ITS TRANSMISSIONS ON ANY OR ALL CHANNELS UPON RECEIVING A CHANNEL-SHUT-OFF COMMAND ON A SIGNALING OR COMMUNICATIONS CHANNEL IT IS RECEIVING FROM ITS ASSOCIATED LES.

8. EACH MES WITH A REQUIREMENT TO HANDLE DISTRESS AND SAFETY-RELATED COMMUNICATIONS SHALL HAVE THE CAPABILITY WITHIN THE STATION TO AUTOMATICALLY PREEMPT LOWER PRECEDENCE TRAFFIC.

FIG. 19

1. ALL LES TRANSMISSIONS TO MOBILE EARTH STATIONS (MESs) SHALL HAVE A PRIORITY ASSIGNED TO THEM THAT PRESERVES THE PRIORITY AND PREEMPTIVE ACCESS GIVEN TO DISTRESS AND SAFETY-RELATED COMMUNICATIONS.

2. THE LES SHALL RECOGNIZE THE PRIORITY OF CALLS TO AND FROM MESs AND MAKE CHANNEL ASSIGNMENTS TAKING INTO ACCOUNT THE PRIORITY ACCESS THAT IS GIVEN TO AERONAUTICAL DISTRESS AND SAFETY-RELATED COMMUNICATIONS.

3. THE LES SHALL BE CAPABLE OF RECEIVING THE MES IDENTIFICATION NUMBER WHEN TRANSMITTED AND VERIFYING THAT IT IS AN AUTHORIZED USER OF THE SYSTEM TO PROHIBIT UNAUTHORIZED ACCESS.

4. THE LES SHALL BE CAPABLE OF TRANSMITTING CHANNEL ASSIGNMENT COMMANDS TO THE MESs.

5. THE COMMUNICATION CHANNELS USED BETWEEN THE LES AND THE MES SHALL HAVE PROVISION FOR SIGNALING WITHIN THE CHANNEL, FOR AN MES WHICH DOES NOT CONTINUOUSLY MONITOR THE LES SIGNALING CHANNEL DURING THE TIME OF A CALL.

6. THE LES SHALL AUTOMATICALLY INHIBIT ALL TRANSMISSIONS TO MESs TO WHICH IT IS NOT TRANSMITTING A SIGNALING CHANNEL OR SIGNALING WITHIN THE COMMUNICATIONS CHANNEL.

7. THE LES SHALL BE CAPABLE OF TRANSMITTING CHANNEL-SHUT-OFF COMMANDS TO MESs ON A SIGNALING OR COMMUNICATIONS CHANNELS.

8. AN LES WITH A REQUIREMENT TO HANDLE DISTRESS AND SAFETY-RELATED COMMUNICATION SHALL HAVE THE CAPABILITY WITHIN THE STATION TO AUTOMATICALLY PREEMPT LOWER PRECENDENCE TRAFFIC.

9. EACH LES SHALL BE CAPABLE OF AUTOMATICALLY TURNING OFF ONE OR MORE OF ITS ASSOCIATED CHANNELS.

FIG. 20

| ROCKWELL MOBILE TERMINAL COMPLIANCE MATRIX | | |
|---|---|---|
| REQUIREMENT | PRESENT PRO2000 CAPABILITY | PROPOSED PRO2000 CAPABILITY |
| 1. ALL MES TRANSMISSIONS SHALL HAVE A PRIORITY ASSIGNED TO THEM THAT PRESERVES THE PRIORITY AND PREEMPTIVE ACCESS GIVEN TO THE AERONAUTICAL DISTRESS AND SAFETY-RELATED COMMUNICATIONS SHARING THE BAND. | SINCE THE ENTIRE SYSTEM IS LAND-MOBILE, IT IS SECONDARY TO AERONAUTICAL OR MARITME DEPENDING ON THE BAND IT IS USING. WITHIN ITS OWN SUBSYSTEM, THE ROCKWELL MT UTILIZES THE PRIORITIES DEFINED BY INMARSAT-C PROTOCOL. | NO CHANGE. |
| 2. EACH MES WITH A REQUIREMENT TO HANDLE DISTRESS AND SAFETY-RELATED COMMUNICATIONS SHALL BE CAPABLE OF RECOGNIZING MESSAGE AND CALL PRIORITY IDENTIFICATION WHEN TRANSMITTED FROM ITS ASSOCIATED LAND EARTH STATION (LES). | THE ROCKWELL MT HANDLES LAND-MOBILE DISTRESS AND SAFETY COMMUNICATIONS PER INMARSAT-C PROTOCOL. THE ROCKWELL MT DOES NOT HANDLE AERONAUTICAL OR MARITIME DISTRESS AND SAFETY COMMUNICATIONS. | NO CHANGE. |
| 3. EACH MES SHALL BE ASSIGNED A UNIQUE TERMINAL IDENTIFICATION NUMBER THAT WILL BE TRANSMITTED UPON ANY ATTEMPT TO GAIN ACCESS TO A SYSTEM. | EACH ROCKWELL MT HAS A UNIQUE EMBEDDED FORWARD (RECEIVE) AND RETURN (TRANSMIT) ID PAIR USED FOR ANY ACCESS TO THE SYSTEM. | NO CHANGE. |
| 4. AFTER AN MES HAS GAINED ACCESS TO A SYSTEM, THE MOBILE TERMINAL SHALL BE UNDER CONTROL OF AN LES AND SHALL OBTAIN ALL CHANNEL ASSIGNMENTS FROM IT. | THE ROCKWELL MT RECEIVES ALL TRANSMIT CHANNEL ASSIGNMENTS FROM THE LES. IT ALSO RECEIVES ALL RECEIVE CHANNEL ASSIGNMENTS EXCEPT THE INITIAL ACCESS CHANNELS FROM THE LES. | NO CHANGE. |
| 5. ALL MESS THAT DO NOT CONTINUOUSLY MONITOR A SEPARATE SIGNALING CHANNEL SHALL HAVE PROVISION FOR SIGNALING WITHIN THE COMMUNICATION CHANNEL. | THE ROCKWELL MT CONTINUOUSLY MONITORS THE FORWARD CHANNEL WHICH CARRIES BOTH SIGNALING AND COMMUNICATION TRAFFIC. THE EXCEPTION TO THIS CONTINUOUS MONITORING IS DURING TRANSMISSIONS. | MODIFY THE MT SOFTWARE FOR "FULL-DUPLEX OPERATION BY USING THE ABILITY OF THE FORWARD ERROR CORRECTION & INTERLEAVED FRAMES TO RECOVER RECEIVE DATA DURING PERIODS OF SIGNAL BLOCKAGE & SHORTEN THE MAX TRANSMIT MESSAGE TIME TO BE LESS THAN 2 SECONDS TO ALLOW CONTINUOUS RECEPTION DURING TRANSMIT "BLOCKAGES". |
| 6. EACH MES SHALL AUTOMATICALLY INHIBIT ITS TRANSMISSIONS IF IT IS NOT CORRECTLY RECEIVING A SEPARATE SIGNALING CHANNEL OR SIGNALING WITHIN THE COMMUNICATIONS CHANNEL FROM ITS ASSOCIATED LES. | THE ROCKWELL MT INHIBITS ITS TRANSMISSIONS WHEN IT IS NOT RECEIVING THE SIGNALING CHANNEL, HOWEVER THE TIME TO DETECT THE LOSS OF THE SIGNALING CHANNEL IS NEARLY 30 SECONDS IN SOME CASES & THE LOSS OF SIGNALING CHANNEL CANNOT BE DETECTED WHILE TRANSMITTING. | MODIFY THE MT SOFTWARE TO DETECT THE LOSS OF THE SIGNALING CHANNEL IN ONE SECOND JUST PRIOR TO INTIATING ANY TRANSMISSION & SHORTEN THE MAX TRANSMIT MESSAGE TIME TO BE LESS THAN 2 SECONDS. THIS PROVIDES A PREEMPTION TIME LESS THAN 3 SECONDS. |
| 7. EACH MES SHALL AUTOMATICALLY INHIBIT ITS TRANSMISSIONS ON ANY OR ALL CHANNELS UPON RECEIVING A CHANNEL-SHUT-OFF COMMAND ON A SIGNALING OR COMMUNICATIONS CHANNEL IT IS RECEIVING FROM ITS ASSOCIATED LES. | THE ROCKWELL MT INHIBITS ITS TRANSMISSIONS UPON RECEIPT OF AN "OUT-OF-SERVICE" COMMAND FROM THE LES, HOWEVER IT CANNOT PRESENTLY STOP A MESSAGE TRANSFER ALREADY IN PROGRESS. | MODIFY THE TRANSMITTER CONTROL LOGIC IN THE MT SOFTWARE TO CHECK THE STATUS OF THE "OUT-OF-SERVICE" FLAG JUST PRIOR TO INITIATING ANY TRANSMISSION. MODIFY THE CONFIGURATION OF THE MT TO ALLOW ALL MTs TO BE ADDRESSED AS A SINGLE GROUP. |
| 8. EACH MES WITH A REQUIREMENT TO HANDLE DISTRESS AND SAFETY-RELATED COMMUNICATIONS SHALL HAVE THE CAPABITLIY WITHIN THE STATION TO AUTOMATICALLY PREEMPT LOWER PRECEDENCE TRAFFIC. | THE ROCKWELL MT IS REQUIRED TO HANDLE LAND MOBILE DISTRESS COMMUNCATIONS ONLY. IT PREEMPTS LOWER PRIORITY LAND MOBILE TRAFFIC PER INMARSAT-C PROTOCOL. THE ROCKWELL MT IS NOT REQUIRED TO COMMUNICATE AERONAUTICAL DISTRESS & SAFETY-RELATED COMMUNICATIONS. | NO CHANGE. |

FIG. 21

| ROCKWELL MOBILE TERMINAL COMPLIANCE MATRIX ||| 
|---|---|---|
| REQUIREMENT | PRESENT ROCKWELL LES CAPABILITY | PROPOSED ROCKWELL LES CAPABILITY |
| 1. ALL LES TRANSMISSIONS TO MOBILE EARTH STATIONS (MESs) SHALL HAVE A PRIORITY ASSIGNED TO THEM THAT PRESERVES THE PRIORITY AND PREEMPTIVE ACCESS GIVEN TO DISTRESS AND SAFETY-RELATED COMMUNICATIONS. | SINCE THE ENTIRE SYSTEM IS LAND-MOBILE, IT IS SECONDARY TO AERONAUTICAL OR MARITIME DEPENDING ON THE BAND IT IS USING. WITHIN ITS OWN SUBSYSTEM, THE ROCKWELL LES UTILIZES THE PRIORITIES DEFINED BY INMARSAT-C PROTOCOL. | NO CHANGE. |
| 2. THE LES SHALL RECOGNIZE THE PRIORITY OF CALLS TO AND FROM MESS AND MAKE CHANNEL ASSIGNMENTS TAKING INTO ACCOUNT THE PRIORITY ACCESS THAT IS GIVEN TO AERONAUTICAL DISTRESS AND SAFETY-RELATED COMMUNICATIONS. | SINCE THE ENTIRE SYSTEM IS LAND-MOBILE, IT IS SECONDARY TO AERONAUTICAL. THE ROCKWELL LES HANDLES LAND-MOBILE DISTRESS AND SAFETY COMMUNICATIONS PER INMARSAT-C PROTOCOL. | NO CHANGE. |
| 3. THE LES SHALL BE CAPABLE OF RECEIVING THE MES IDENTIFICATION NUMBER WHEN TRANSMITTED AND VERIFYING THAT IT IS AN AUTHORIZED USER OF THE SYSTEM TO PROHIBIT UNAUTHORIZED ACCESS. | THE LES VALIDATES THE MES ID OF ANY TERMINAL ATTEMPTING TO ACCESS THE SYSTEM. | NO CHANGE. |
| 4. THE LES SHALL BE CAPABLE OF TRANSMITTING CHANNEL ASSIGNMENT COMMANDS TO THE MESS. | THE ROCKWELL LES TRANSMITS ALL CHANNEL ASSIGNMENTS TO THE MOBILE TERMINALS. | NO CHANGE. |
| 5. THE COMMUNICATION CHANNELS USED BETWEEN THE LES AND THE MES SHALL HAVE PROVISION FOR SIGNALING WITHIN THE CHANNEL, FOR AN MES WHICH DOES NOT CONTINUOUSLY MONITOR THE LES SIGNALING CHANNEL DURING THE TIME OF A CALL. | THE ROCKWELL LES OUTBOUND CHANNELS CARRY BOTH SIGNALING AND COMMUNICATION MESSAGES. THESE MESSAGES ARE TIME DIVISION MULTIPLEXED ON THE CHANNEL. SIGNALING INFORMATION IS TRANSMITTED ONCE IN EACH FRAME (8.64 SECONDS). | NO CHANGE. |
| 6. THE LES SHALL AUTOMATICALLY INHIBIT ALL TRANSMISSIONS TO MESs TO WHICH IT IS NOT TRANSMITTING A SIGNALING CHANNEL OR SIGNALING WITHIN THE COMMUNICATIONS CHANNEL. | THE ROCKWELL LES CONTINUOUSLY TRANSMITS SIGNALING INFORMATION TO ALL MTS AS LONG AS IT IS TRANSMITTING AT ALL. THIS IS INHERENT IN INMARSAT-C PROTOCOL. | NO CHANGE. |
| 7. THE LES SHALL BE CAPABLE OF TRANSMITTING CHANNEL-SHUT-OFF COMMANDS TO MESs ON A SIGNALING OR COMMUNICATIONS CHANNELS. | THE ROCKWELL LES IS CAPABLE OF SENDING AN "OUT-OF-SERVICE" COMMAND TO ALL MTs UNDER ITS CONTROL IF THE MTs ARE CONFIGURED AS A SINGLE GROUP & THE COMMAND IS SENT TO ITS TERRESTRIAL INTERFACE AS A GROUP POLL. | MODIFY THE ROCKWELL BASE STATION (RBS) WHICH IS A DATA CONCENTRATOR FOR THE LES TO SEND GROUP POLLS TO THE LES FOR "OUT-OF-SERVICE". |
| 8. AN LES WITH A REQUIREMENT TO HANDLE DISTRESS AND SAFETY-RELATED COMMUNICATION SHALL HAVE THE CAPABILITY WITHIN THE STATION TO AUTOMATICALLY PREEMPT LOWER PRECEDENCE TRAFFIC. | THE ROCKWELL LES IS REQUIRED TO HANDLE LAND MOBILE DISTRESS ONLY. IT PREEMPTS LOWER PRIORITY LAND MOBILE TRAFFIC PER INMARSAT-C PROTOCOL. THE ROCKWELL LES IS NOT REQUIRED TO COMMUNICATE AERONAUTICAL DISTRESS & SAFETY-RELATED COMMUNICATIONS. | NO CHANGE. |
| 9. EACH LES SHALL BE CAPABLE OF AUTOMATICALLY TURNING OFF ONE OR MORE OF ITS ASSOCIATED CHANNELS. | THE ROCKWELL LES HAS THE CAPABILITY TO TURN OFF ITS CHANNELS WITH MANUAL OPERATOR INTERVENTION. | ADD RF SWITCHES TO THE OUTPUT OF ALL LES CHANNEL UNITS TO IMMEDIATELY TURN OFF ONE OR MORE OF ITS OUTBOUND CHANNELS AUTOMATICALLY IN RESPONSE TO A PREEMPTION COMMAND. |

FIG. 22

| 7 | 6 | 5 | 4 | 3 | 2 | 1 | 0 | BIT/BYTE |
|---|---|---|---|---|---|---|---|---|
| 0 | 0 | 0 | 1 | 1 | 0 | 1 | 1 | 1 |
| 0 | 0 | 1 | 1 | 1 | 1 | 0 | 1 | 2 |
| MESSAGE SEQUENCE NUMBER {MSG_SEQ} (MOST SIGNIFICANT BYTE) | | | | | | | | 3 |
| MESSAGE SEQUENCE NUMBER {MSG_SEQ} (LEAST SIGNIFICANT BYTE) | | | | | | | | 4 |
| MORE=1/ LAST=0 | PACKET NUMBER {N} (01H TO 7FH) | | | | | | | 5 |

MESSAGE SEGMENT HEADER

FIG. 24

| NAME OF FIELD | FIELD VALUE RANGE & DEFINITION | NUMBERS OF BITS |
|---|---|---|
| <ESC> | 1BH | 8 BITS ASCII |
| "=" | 3DH | 8 BITS ASCII |
| MESSAGE SEQUENCE NUMBER {MSG_SEQ} | 0000H TO 270FH ( BASED ON SATELLITE FRAME NUMBER AT THE START OF MESSAGE TRANSFER) | 16 BITS BINARY |
| PACKET CONTINUATION FLAG {N} | 1 = MORE PACKETS  0 = LAST PACKET | 1 BIT BINARY (MOST SIGNIFICANT BIT OF THE BYTE) |
| PACKET NUMBER {N} | 01H TO 7FH (1=FIRST PACKET) | 7BITS BINARY (LEAST SIGNIFICANT BITS OF THE BYTE) |
| MESSAGE SEGMENT (N) {MSG_SLICE} | ORIGINAL MESSAGE CONTENTS FOR SEGMENT (N) | UP TO (SAT_MAX)- (ADDR_LEN)-(HEAD_LEN), MINIMUM OF 1 BYTE |

MESSAGE SEGMENT HEADER FIELD DEFINITION

FIG. 25

| POLL DATA FIELD CONTENTS ||
|---|---|
| DATA BYTE NUMBER | DATA FIELD DESCRIPTION |
| 1 | COMMUNICATION PATH TO SET (01H= SATELLITE,02H =TERRESTRIAL{ARDIS}) |
| 2 | MAXIMUM MESSAGE SIZE (UPPER BYTE) |
| 3 | MAXIMUM MESSAGE SIZE (LOWER BYTE) |
| 4 | OVERSIZE MESSAGE PROTOCOL (00H= NO CHANGE, 01H = FAIL, 02H = MULTIPLE SEGMENT PROTOCOL) |
| 5 THROUGH 231 | OPTIONAL, VARIABLE-LENGTH, TEXT MESSAGE TO BE SENT TO THE DTE PORT(SUBADDRESS 00H) |

FIG. 26

SERVICE PREEMPTION FOR MOBILE TERMINALS IN A MOBILE SATELLITE COMMUNICATIONS SYSTEM

RELATED APPLICATIONS

This application claims priority to U.S. provisional patent application No. 60/039,261, filed Feb. 26, 1997, incorporated herein by reference.

BACKGROUND OF THE INVENTION

1. Field of the Invention

The present invention relates generally to a computer architecture and method of service preemption for mobile terminals in a mobile satellite communication system, and more particularly, to a computer architecture and method of performing continuous reception (full-duplex receiver function) during message channel transmission.

2. Background of the Related Art

FIG. 1 illustrates the general layout of a mobile communication system. A vehicle 18, usually transporting cargo, moves along a transport route. The route can be one that is well known, or it can be one that is being newly travelled by the vehicle. The vehicle is preferably equipped with at least one mobile sensing station, which functions to detect predetermined events or conditions (such as collisions or impacts, potholes or uneven tracks or the like) along the travel route, and transmit data regarding those conditions using the mobile communicator system (not shown) via orbiting satellite 14 to a remote satellite ground station 8 via satellite antenna 10. The satellite ground station 8 transfers the data received from the mobile communicator system to a dispatch or fleet management center to analyze and evaluate the data.

Part of the data transmitted from the mobile sensing station is positional data received or detected from satellite 14 or a separate satellite which is part of a satellite navigation system. Examples of presently available systems are LORAN or the current Global Position System (GPS).

Navigational data sent to the mobile sensing station preferably utilizes a Standard-C data protocol format, which is commonly used in the maritime industry. Experience has indicated that this is the most reliable method of sending navigational data from one mobile station to another. However, other navigation or location systems can be used. For example, a series of radio repeaters located along a predetermined route can track the location of a specific vehicle and can be used to send location data to the mobile communicator as is done by satellite 14 in FIG. 1. Also, other data transfer formats can be used, depending on the navigational system, the transport route, the vehicle and the communication system for transmitting data from the mobile communicator system.

While FIG. 1 illustrates communication between the mobile communicator system in vehicle 18 to satellite 14, the mobile communicator system may also communicate with the fleet management center by means of a cellular telephone system. In this variation, a cellular transceiver is used capable of automatically accessing cellular ground station 4 as it passes from one cell into another. While such equipment may be more complex and expensive than the satellite uplink embodied in FIG. 1, it facilitates easy communication of instructions from the central controller to the mobile sensing station.

The fleet dispatch center includes a central controller that stores the data sent from the mobile communicator system and arranges it so that it can be used in a display, for example, by vehicle 18. The central controller is expected to handle data from a variety of routes, each travelled by a plurality of vehicles optionally having mobile sensing stations. Since the data are preferably transmitted from the mobile communicator system in ASCII format, the user terminal can access selected data from the central controller using a personal computer (PC), a modem and standard communication software.

With the appropriate software, a display of the desired transport route can be generated at the PC terminal, and information is received from various vehicles having mobile communicator systems travelling along that route. For example, boat 16 in FIG. 1 also includes a mobile communicator system for communication with satellite 14. In addition, even vehicles or subscribers who do not contain the mobile communicator system can communicate with the mobile communicator system. For example, vehicle 20 may communicate with satellite 14 via cellular antenna 6, cellular switching office 4, satellite ground station 8 and satellite antenna 10. Similarly, plain old telephone service (POTS) telephone 12 may also communicate with satellite 14 via switching office 8, satellite ground station 8 and satellite antenna 10. Thus, the mobile communicator system may be used to exchange data from among various different vehicles.

The Federal Communications Commission (FCC) has generally required communication system providers to provide some capability for securely and reliably transmitting a priority message in the presence of a priority event. Since various different users utilize the communication system, and the communication system provides the capability of supporting a wide audience, it is desirable to provide a priority and/or preemption capability that can transmit a priority and/or preemption message to various mobile communication systems.

I have determined that the priority and/or preemption capability preferably includes the ability to warn mobile communication systems of a preemption event that may be imminent. I have also determined that the priority and preemption capability must be implemented in an efficient and expedient manner to ensure that communication resources are freed in a timely manner to transmit a priority message. I have also determined that the priority and/or preemption capability optionally includes alteration of functionality in the mobile communication system to facilitate same.

SUMMARY OF THE INVENTION

It is a feature and advantage of the present invention to provide a priority and/or preemption capability that can transmit a priority and/or preemption message to various mobile communication systems.

It is another feature and advantage of the present invention to provide a priority and/or preemption capability preferably that includes the ability to warn mobile communication systems of a preemption event that may be imminent.

It is another feature and advantage of the present invention to provide a priority and preemption capability that is implemented in an efficient and expedient manner to ensure that communication resources are freed in a timely manner to transmit a priority message.

It is another feature and advantage of the present invention to provide a priority and/or preemption capability optionally includes alteration of functionality in the mobile communication system to facilitate same.

The present invention reduces the time for TDM scanning. By implementing the process described herein, the present invention keeps closer track of communication with the satellite. That is, the satellite and the MT operate on a time-based frequency, and they are not necessarily in synch. The satellite and MT get synched up every, for example, 8.64 seconds or bulletin board interval. Therefore, if one or more bulletin boards are missed, there is a chance that the MT may drift off and not be listening on a frequency that is not quite online with where the satellite is broadcasting. Therefore, the MT may have to be resynchronized, which will take more time.

The present invention provides two ways to address compliance with full duplex operation. A first method involves fast acquisition, where when the MT is in preemption mode, only short data packets are sent. The data packets are set up so that only one packet at a time is transmitted. The individual packets are then transmitted within the two second window or other time interval where interleaving may be used to reconstruct or substantially reconstruct the data. Thus, if only two seconds of data is transmitted, and the satellite is reacquired in the substantially same frame, then the entire bulletin board can be decoded/reconstructed so that the MT will be able to determine whether it is possible to transmit again or not.

In accordance with the present invention, a priority message is transmitted to all MTs to shut down to ensure that the priority message will be able to be transmitted immediately. The MT therefore attempts to receive every bulletin board for the preemption command. Thus, if the preemption command is received, the MT transitions into just a listening or receiving mode waiting to be told that it can start transmitting again.

The user, therefore, does not have to wait until the end of the bulletin board period for another bulletin board to have that. Thus, the system and apparatus of the present invention advantageously minimizes the chance of missing a bulletin board that may include a preemption message including the Super DNID, described below. This then minimizes the delay for when the MT can react to a preemption message.

The present invention advantageously uses short messages to further minimize the amount of the bulletin board that is lost, as described below in greater detail. The present invention also provides a control command feature that shuts down the forward channel of the MT. By shutting down the forward channel, e.g., the channel having the bulletin boards, the MT does not have a signal and therefore will not transmit any information, thereby making available resources for the priority traffic.

The short messages of the present invention are divided using a message segment protocol described below. A super DNID message is used to indicate to the MTs to implement the message segment protocol for pre-emption mode. Thus, it is the super DNID, which is a unique number, in the bulletin board sent by the base station or LES that is used to message the MTs to operate in the short message protocol. The super DNID is also unique number that is loaded in all of the MTs and which is matched with the received super DNID to verify preemption mode. Thus, when an emergency hits, the LES sends the super DNID out which indicates that there is going to be an urgent message in the bulletin board or in a near future bulletin board.

The super DNID then indicates to the MT to start sending only short messages to conserve communication resources. Sometime in the future, when the emergency has passed, the short message segment protocol is then disabled, and normal message transmission is restored. The data which follows the super DNID in the bulletin board is the message and may indicate to enable or disable the message segment protocol.

Thus, once the super DNID is transmitted, it allows the MTs to use that frequency but only in short messages, because where in the future that frequency may or is going to be terminated. Step one of the preemption is to send the super DNID. The Super DNID is transmitted and then within, for example, ten seconds the MTs are shut down and the TDM channel may be taken from the MT, thereby freeing up communication resources for a priority message. Thus, the super DNID message operates as a warning message that there may or is going to be a shut down shortly. In addition, the super DNID advantageously allows the MTs to continue operating in full-duplex mode after the super DNID is received until actual shut down. Once the priority message has been transmitted, another super DNID is transmitted to disable the priority mode and return back to normal mode.

Advantageously, by keeping the messages short to for example one packet, the MT is able to continue to communicate without missing any bulletin boards. Thus, by communicating in small messages, the MT transmits and receives, transmits and receives, and so on, similar to a full duplex radio. Thus, when it is transmitting on one channel, the MT is listening for control commands on another channel. Thus, the super DNID may be considered as indicating that the MT can start working but not at full capacity.

For example, if a natural disaster occurred in southern California, and emergency messages were to be transmitted into southern California for earthquake relief or whatever, the super DNID would be transmitted and now all MTs would be operating in short messages. Two hours later, the emergency message may be sent to southern California, and the MTs are shut down, and then subsequently re-enabled, for example, in the message segment protocol, because an hour later another priority message may need to be sent. Thus, the super DNID facilitates the transmission of the shut down message, and serves like a warning.

The MT and communication system and optionally the users know ahead of time that they are going to be shut off. The above described process is optionally completely transparent from the end user.

A second way which the super DNID is implemented is to shut down the TDM channel right away. That means that if the forward TDM channel is shut down anytime within the 1 second, before the MT transmits, even though it may be a long message, the message will not be transmitted. In other words, there is not time to coordinate a controlled shut down using the super DNID, the MT listens approximately 1 second before transmission to determine whether the TDM channel is down. If the MT determines that the TDM channel is down, then the MT will not transmit. By shutting the TDM down, the frequency may be used for some other purpose.

Previously, however, it would take approximately 25 seconds to shut a MT down. According to standard protocol requirements, if the MT hears the TDM channel within three bulletin boards rates, 8.64 seconds times 3 or about 25 seconds, the MT may transmit. Thus, in the previous method, if the MT heard the TDM channel 25 seconds ago and a message came in from a user, the MT would attempt to send it out. Thus, a 25 second delay may result. On the other hand, the present invention reduces the 25 second delay to only 1 second, which is an extremely important improvement.

I have determined that in the past, if 25 seconds ago a forward channel was received by the MT, then the MT gets ready to transmit and transmits the message even though, for example, 5 seconds ago the MT lost the forward channel. That is, the MT generally waited 3 frames of data, approximately 25 seconds, between determining whether the forward channel was acquired.

The 8.64 second interval, or bulletin board interval, is the time that a substantially complete bulletin board is transmitted, which is one of the packets of data from the satellite. Packets are generally broadcast every 8.64 seconds. The bulletin board contains all the data for the data terminal to essentially operate under an outside control, and includes the control commands. When a message is to be sent, a channel is requested. The bulletin board packet includes the channel assignment and slot in that channel to be used for the transmission.

If more than approximately two seconds of the interval or bulletin board are missed, there is a high probability that the missed data will not be able to be reconstructed, and therefore, the MT must wait for another bulletin board. This requires the MT to wait for the next bulletin board, for example, approximately 8.64 seconds. If less than approximately two seconds of the bulletin board is missed, an interleaving procedure may be used to reconstruct the data or bulletin board.

The present invention advantageously maintains a short transmit window of, for example, 2 seconds or less, and then listens to every bulletin board right up to, for example, 1 second before transmission. Therefore, the MT will be substantially prevented from transmitting a message when no forward channel has been acquired. The transmit window has therefore been reduced from 25 seconds to less than 1 second.

To achieve these and other features and advantages of the present invention, a method of performing a priority process for a priority event is provided in a communication system, such as a satellite communication system, includes the steps of continuously monitoring, by a mobile communication system (MCS), for receipt of a priority message, transmitting, by a controller, a first message including the priority message in the communication system, and receiving the first message by the MCS. The method also includes the steps of receiving, by the MCS, a second message to be transmitted to the communication system, and performing, by the MCS, a message segment protocol to the second message creating message segments. The method also includes the steps of transmitting, by at least one MCS, each message segment until all of the message segments have been transmitted, and receiving, by the controller, the message segments, until all of the message segments have been received.

A system implementing the method, and a computer readable tangible medium, such as a floppy diskette, hard drive, and the like, are also provided.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These, together with other objects and advantages which will be subsequently apparent, reside in the details of construction and operation as more fully herein described and claimed, with reference being had to the accompanying drawings forming a part hereof wherein like numerals refer to like elements throughout.

BRIEF DESCRIPTION OF THE DRAWINGS

FIGS. 14-1–14-2 are exploded views of the mobile communicator system;

FIG. 19 is a list of MT requirements for real-time preemptive capability;

FIG. 20 is a list of Land Earth Station/Base Station requirements for real-time preemptive capability;

FIG. 21 is an illustration of a verification matrix that identifies the present and proposed capabilities of a MT compared to the requirements shown in FIG. 19;

FIG. 22 is a verification matrix that identifies the present and proposed capabilities of a Land Earth Station (LES) compared to the requirements shown in FIG. 20;

FIGS. 24–25 are illustrations of a description of the header field to be included at the front of each message segment;

FIG. 26 is an illustration of the format of the data field of the poll to control the parameters;

BEST MODE FOR CARRYING OUT THE INVENTION

The present invention relates to a solution to implement Priority Preemption of service utilizing, for example, the existing/standard Rockwell Pro2000 MSAT Mobile Terminal (MT) hardware. Mobile terminal is defined herein as any mobile earth terminal (MET), mobile data terminal (MDT), mobile earth station (MES), or any other communication device that is capable of receiving and transmitting messages in the mobile communication system described herein. To the extent that the present description describes a specific mobile communication device, it is to be understood that any mobile communication device applies that is capable of providing similar functionality.

Total Preemption requirements are met by a combination of Land Earth Station (LES) requirements, Rockwell Base Station (RBS) and MT requirements, discussed in detail below.

Figure 2:
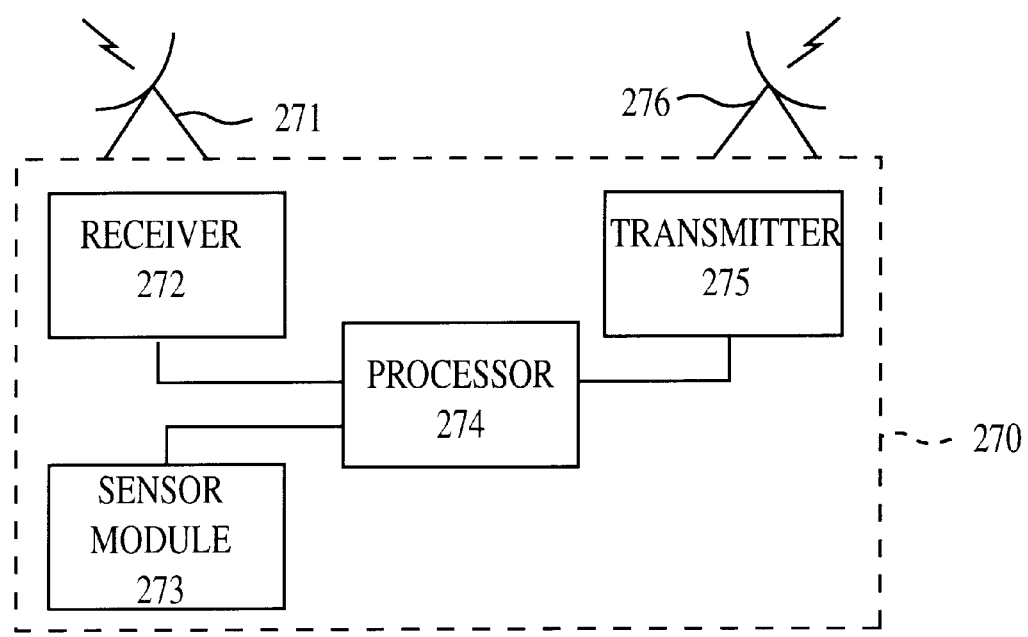
FIG. 2 is a block diagram illustrating the basic electrical elements contained in the mobile communicator system.

FIG. 2 illustrates one example of a mobile sensing station 270. Antenna 271 is used to receive navigational data from a navigational system such as LORAN-C. The data is demodulated in receiver 272 so that it can be stored and/or operated on by processor 274. The navigational data is correlated with the appropriate occurrences of the conditions detected by sensor module 273. The processor also correlates time and date information to the appropriate data corresponding to the occurrence of conditions detected along the transport route.

Sensor module 273 can be of a single sensor type or of a plurality of different types connected so that indication of a variety of conditions can be transmitted to processor 274.

The sensor modules can be located as part of the mobile sensing station package or can be remotely located throughout the vehicle. The sensors can be used to detect a variety of different vehicle conditions, transport route conditions, and cargo conditions. In one embodiment, the sensor module includes an accelerometer capable of three-axis measurement of acceleration vs. time. In many cases, this is the only sensor data that is needed to determine if transport route conditions are appropriate for the cargo being transported.

After correlating the location data from receiver 272 and the sensor 273, data processor 274 sends the correlated data to transmitter 275 which transmits the correlated data to the satellite 14 via antenna 276. A transceiver can be substituted for transmitter 275 so that the satellite system can accommodate transmission of data from satellite 14 (in FIG. 1) to the mobile sensing station. One such system capable of providing such operation is the satellite communication system operated by American Mobile Satellite Corporation, through its subsidiary, AMSC Subsidiary Corporation, which may be used to facilitate one embodiment of the present invention.

Figure 3:
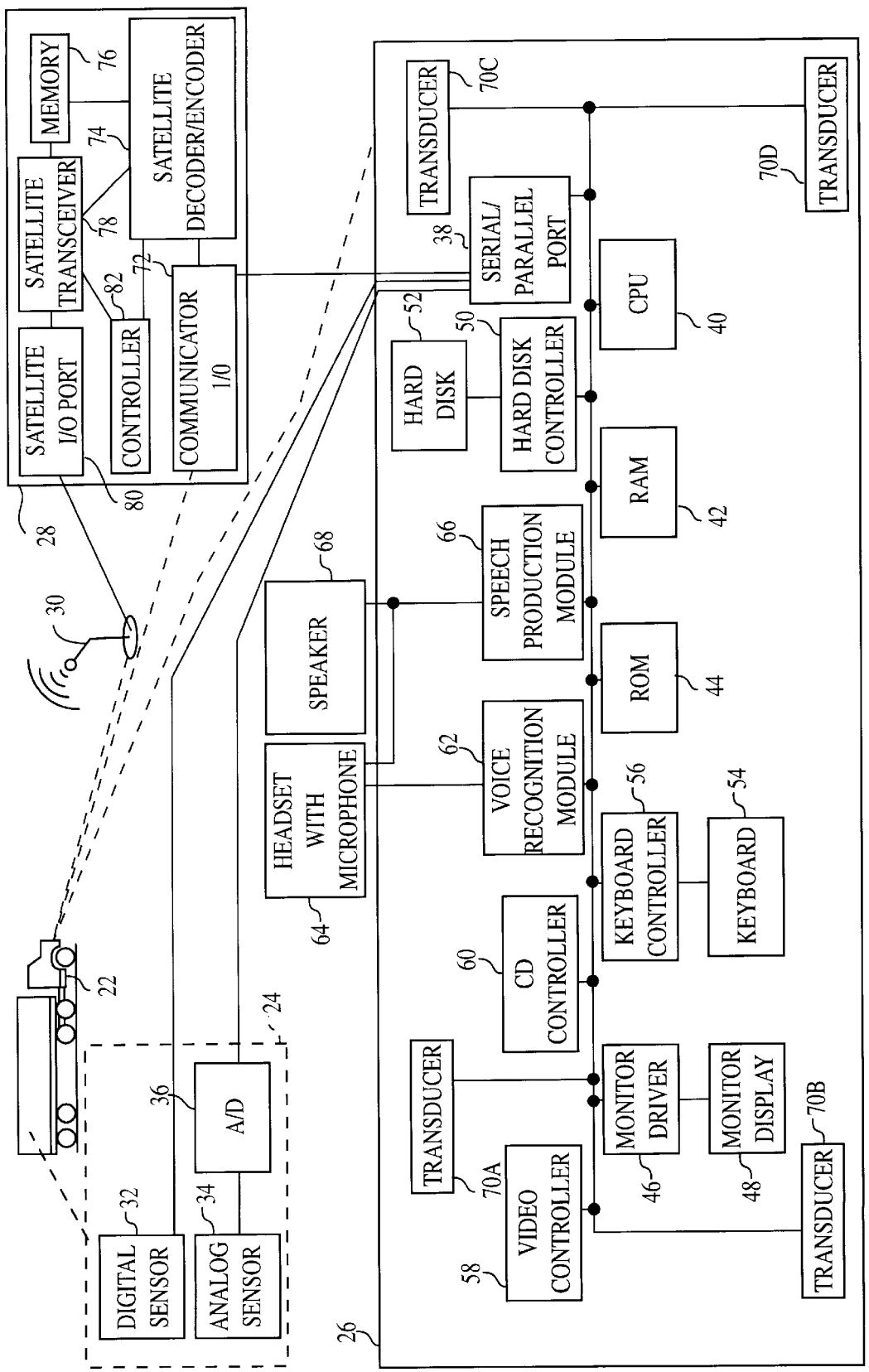
FIG. 3 is a block diagram illustrating the elements contained in a mobile communicator system for one preferred embodiment of the present invention.
Figure 4:
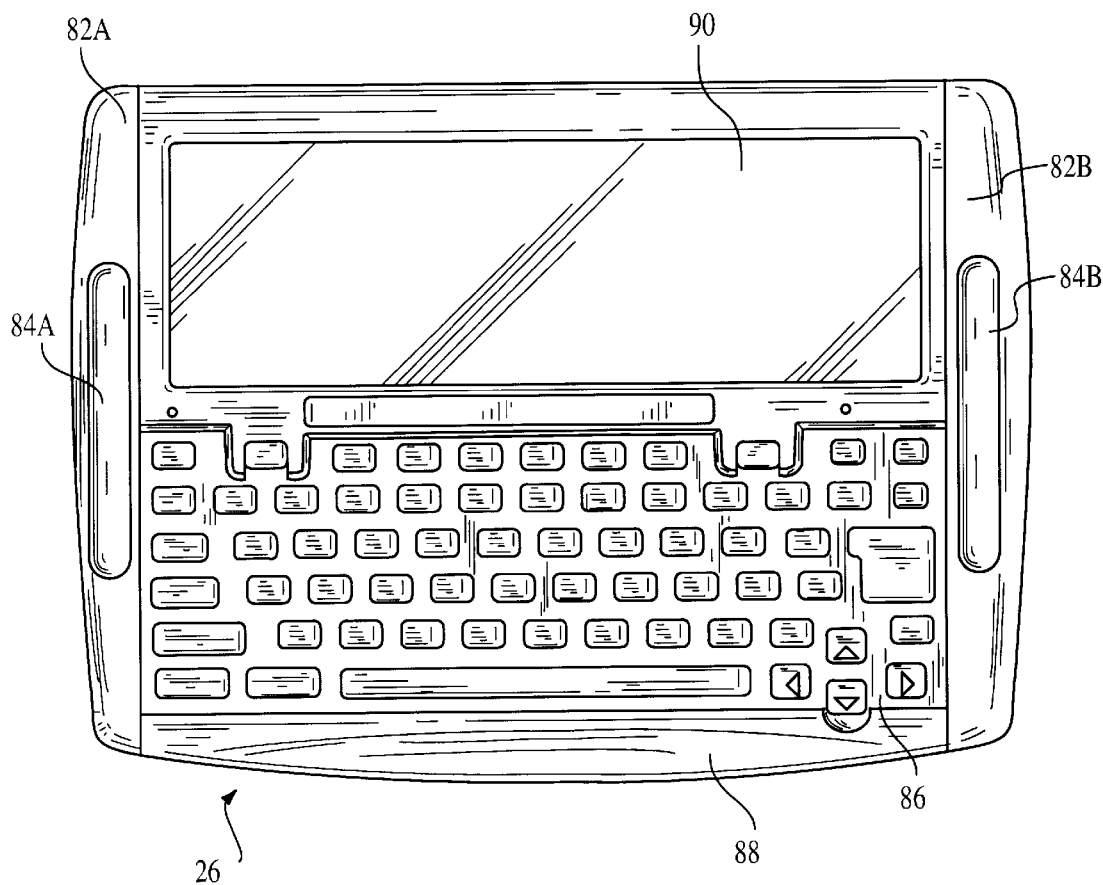
FIG. 4 is a top plan view of the mobile communicator system.
Figure 5:
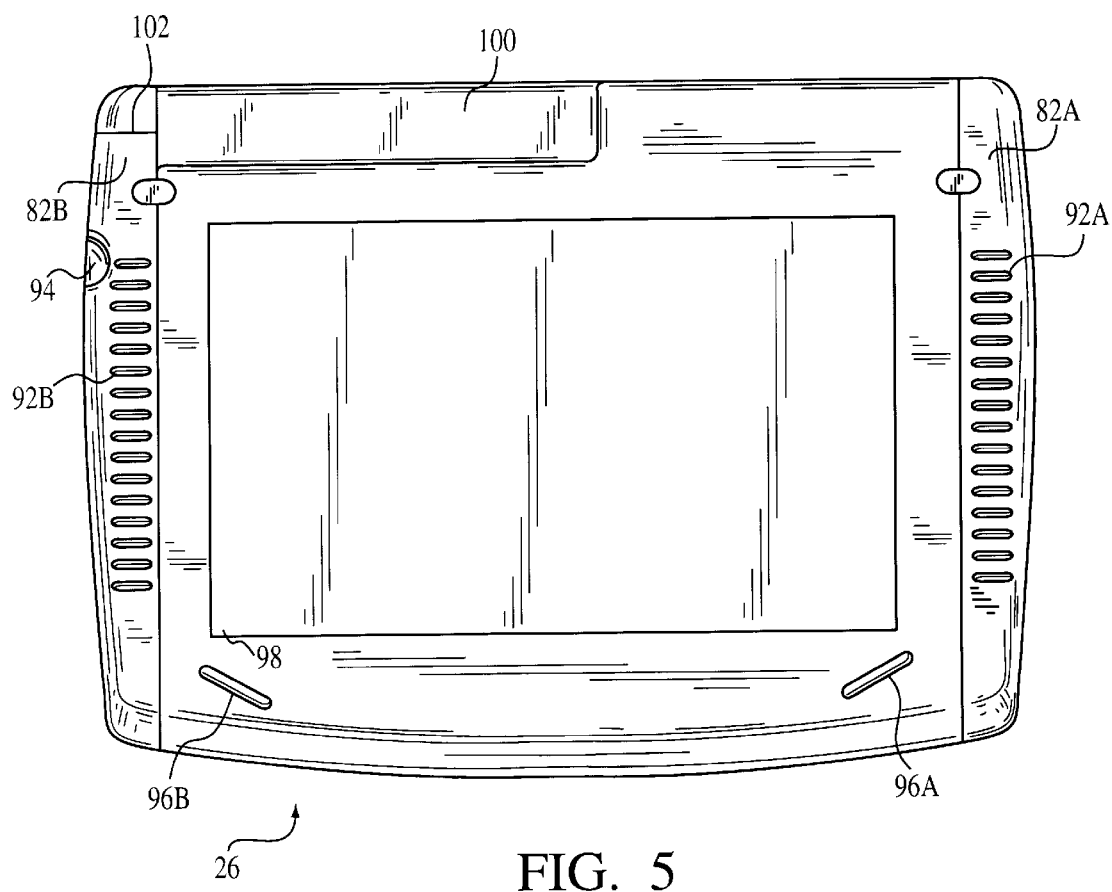
FIG. 5 is a bottom plan view of the mobile communicator system.
Figure 6:
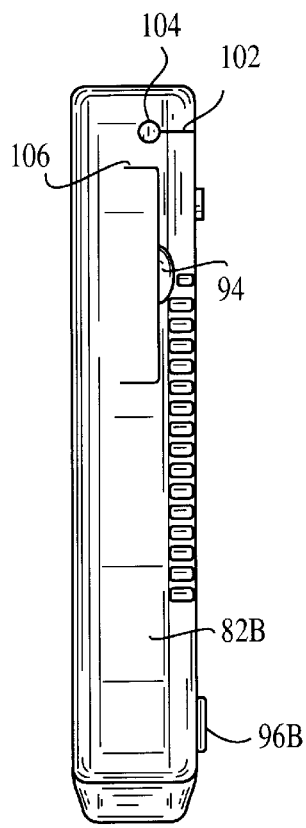
FIG. 6 is a right side elevational view of the mobile communicator system.
Figure 7:
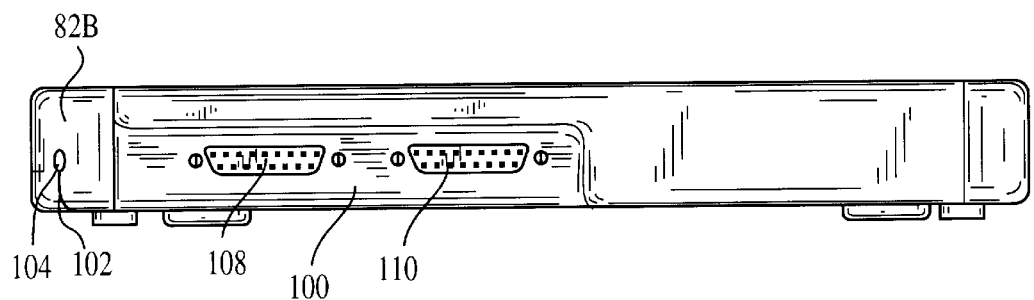
FIG. 7 is a rear elevational view of the mobile communicator system.
Figure 8:
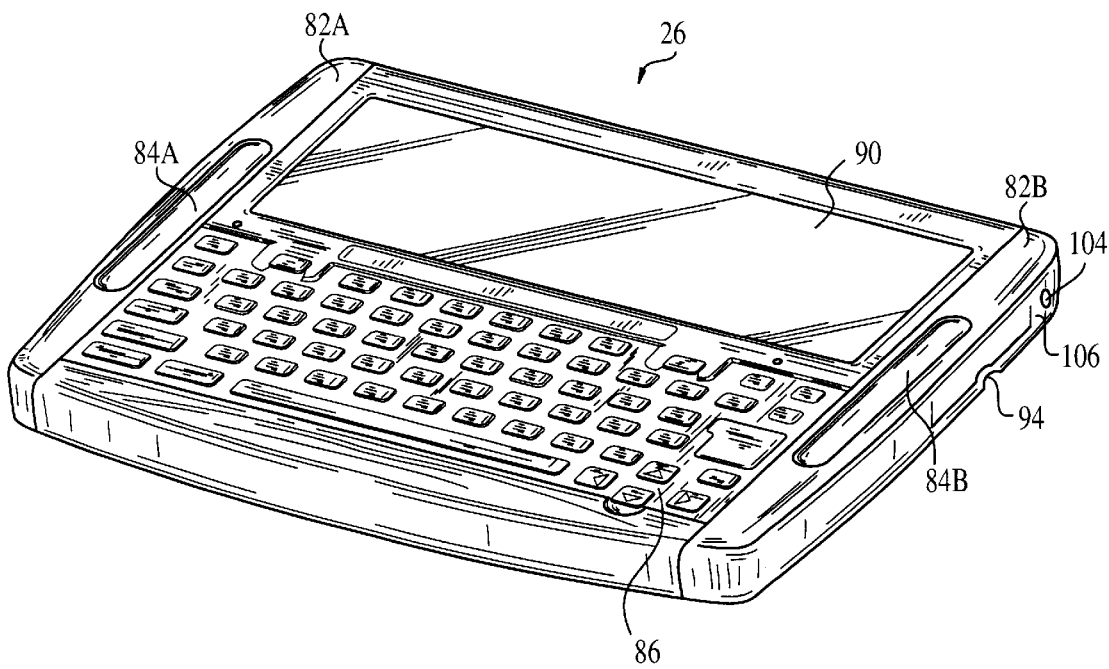
FIG. 8 is a perspective view of the mobile communicator system.

FIG. 3 is a block diagram illustrating the elements contained in the mobile communicator system in more detail and in accordance with one preferred embodiment. In FIG. 3, sensor module 24 located in vehicle 22 can be of a single sensor type or of a plurality of different types connected so that indication of a variety of conditions can be transmitted to mobile communicator 26. For example, sensor module 24 preferably includes digital sensor 32 and analog sensor 34. Analog sensor 34 is equipped with analog to digital (A/D) converter 36 which converts the analog signals into digital signals for transmission to mobile communicator system 26.

In one design, mobile communicator system 26 receives the sensor data from sensor module 24 and correlates the data for transmission to the satellite. In another alternative, the sensor module 24 includes processing capability for correlating and determining when such collected information is to be transmitted to a receiving station. Mobile communicator system 26 includes input/output serial/parallel port 38 for receiving the sensor data from sensor module 24, and for outputting the correlated sensor data to satellite interface system 28.

In addition, serial/parallel port 38 also receives and transmits other data which may be exchanged between the mobile communicator system 26 and, for example, a fleet dispatch center, via the satellite. Data to be transmitted to and received from the satellite may be displayed on display 48 via monitor driver 46. The data may also be printed to a printer connected to the parallel port of serial/parallel port 38, or broadcasted on speaker 68 via speech recognition module 66. Mobile communicator system 26 also includes video controller 58 for display of data on an external monitor.

Data is entered in the mobile communicator system 26 via, for example, any one of keyboard 54 using keyboard controller 56, microphone 64 using voice recognition module 62, hard disk 52 via hard disk controller 50, or via an external compact disk via compact disk controller 60. Each of the various devices are connected to central processing unit (CPU) 40 via the system bus.

CPU 40 performs the processing or operations of mobile communicator system 26 as described above. CPU 40 is conventional, and may be, for example, an IBM compatible 286 or 386 type processor with between 640K–2 MB of random access memory (RAM) and from 20–50 MB of read/write/delete storage such as a standard hard disk 52.

CPU sends the correlated data to satellite interface system 28 which transmits the correlated data to the satellite via antenna 30.

Satellite interface system 28 receives data from the mobile communicator system 26 via communicator input/output port 72. The received data are then encoded in accordance with predetermined formats which are compatible for the different satellites orbiting the planet earth via satellite encoder/decoder 74. Satellite encoder/decoder 74 also compresses the data to maximize the efficiency of the communication between the satellite interface system 28 and the satellite. Memory 76 may be used to temporarily store the data which is encoded and compressed prior to transmission via satellite transceiver 78, satellite input/output port 80, and antenna 30. The various operations in satellite interface system 28 are coordinated and controlled by controller 82. Satellite interface system 28 may be comprised of any standard satellite interface system, such as the Trimble Galaxy Inmarsat Land Mobile Transceiver manufactured by Trimble Navigation of Sunnyvale, Calif. Additional interface systems are described in U.S. Pat. Nos. 4,884,208; 4,258,421; The Electronic Motorist, IEEE Spectrum, pp.37–48 (March 1995); and Remote Sensing, IEEE Spectrum pp. 24–31 (March 1995); all incorporated herein by reference.

The mobile communicator system 26 optionally includes sensors, such as transducers 70a–70d. Transducers 70a–70d are used to determine the external conditions experienced by the mobile communicator system 26. The data may then be analyzed, for example, by the fleet management center or the mobile communicator system 26 itself to determine when such external conditions have occurred to assist in determining corrective measures to be taken to ensure the safe or correct handling of the mobile communicator system 26.

Antenna 30 may be any standard satellite antenna such as the standard C & GPS antenna manufactured by Trimble Navigation of Sunnyvale, Calif. which is generally mounted directly to the vehicle. Alternatively, antenna 30 may be mounted to the vehicle using the antenna mount illustrated in FIG. 11.

Figure 11:
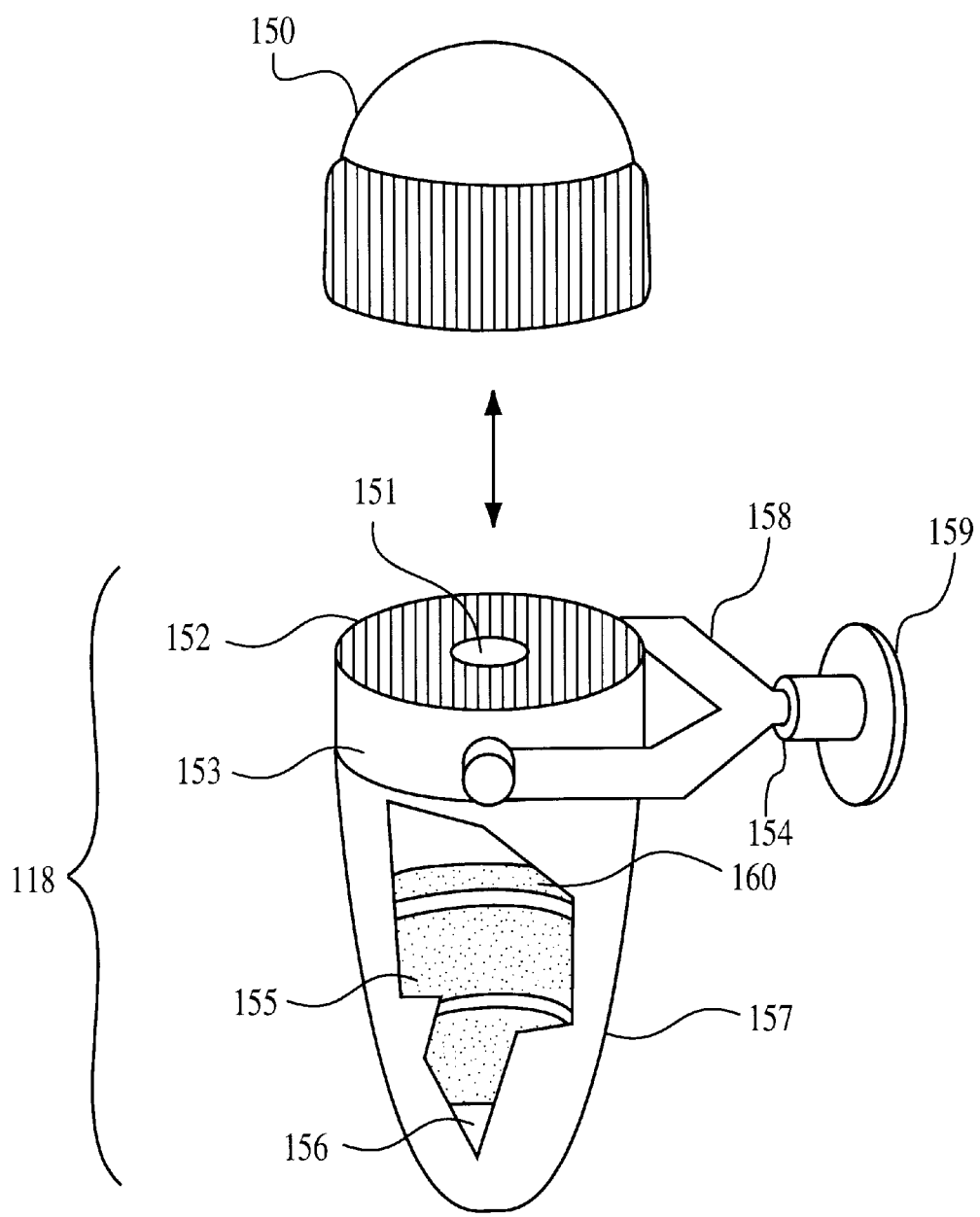
FIG. 11 is a diagram of an antenna mount used with the mobile communicator system.

In FIG. 11, radome 150 is shown in exploded view from ballast assembly 118. Radome 150 houses the satellite antenna 30 of the present invention. Mounting plate 152 on ballast assembly 118 is provided with female threaded portion 151 for receiving radome 150. Female threaded portion 151 may comprise, for example, a 5/16-18 threaded hole.

Mounting plate 152 is attached to housing 157 of ballast assembly 118 which is mounted to yoke 158 via pitch gimbal 153. Mounting yoke 158 is attached to mounting bracket 159 via roll gimbal 154. Housing 157 contains weight 156 located at the bottom of housing 157. In the preferred embodiment, weight 156 comprises a lead weight, although other types of materials may be used which provide suitable mass. Within housing 157 lies dampening fluid 155, which may comprise a viscous fluid such as glycol.

The dampening characteristics of dampening fluid 155 are carefully chosen to provide the correct dampening for the antenna mount of FIG. 11. In addition, dampening fluid 155 is selected to provide a fluid which has appropriate freeze temperature characteristics so that dampening fluid 155 will not solidify in normal use. Further, dampening fluid 155 is selected such that the fluid has a relatively constant viscosity characteristics with respect to temperature.

In an alternative embodiment, pitch gimbal 153 and/or roll gimbal 154 may be provided with additional shock absorption devices. These devices may take the form of pneumatic or hydraulic dampeners or friction disks inserted in gimbal joint 153, 154 to dampen movement. In the preferred embodiment, a pneumatic dampener, such as an Air-Pot™ may be used at the rotational joints of gimbals 153, 154. Alternately, hydraulic or pneumatic dampeners 970 may be externally mounted. Friction disks may be inserted in gimbal joints 153, 154 with tension maintained on the disks my means of a spring mechanism (e.g., belleville washers or the like) so as to provide a predetermined friction within gimbal joint 153, 154. Alternately, other types of mechanical or hydromechanical dampening units known in the art may be applied to gimbal joints 153, 154. These shock absorption devices may be supplied to supplement dampening fluid 155 to aid in the dampening of large accelerations. During large accelerations, the dampening fluid 155 may tend to remain at the bottom portion of antenna mount 118 due to centripetal acceleration. The use of external shock absorbers delays the motion of antenna mount 118, causing displacement of dampening fluid 155 so as to establish the free-surface effect described below. Alternately, these additional shock absorption devices may serve to eliminate or substantially reduce movement of the antenna mount due to minor shocks or vibrations.

Housing 157 may be provided with a series of annular rings 160. Annular rings 160 are provided to alter the dampening action of dampening fluid 155 by providing additional surface area to housing 157 to interact with dampening fluid 155. For the sake of illustration, the antenna lead cable is not shown in FIG. 11. A suitable length of flexible lead cable, for example, may be provided to connect the antenna to shipboard communications equipment. Alternately, a coiled, flexible cable may also be used. In addition, the antenna unit may be self-contained, for example, for use as a self-powered emergency beacon. Finally, as would be readily apparent to one of ordinary skill in the art, contact brushes may be used at the gimbals in order to provide suitable electrical connections for the antenna. Any suitable technique may be used such that the antenna lead does not interfere with the movement of the antenna mount or act to alter the dampening of the system.

Figure 12:
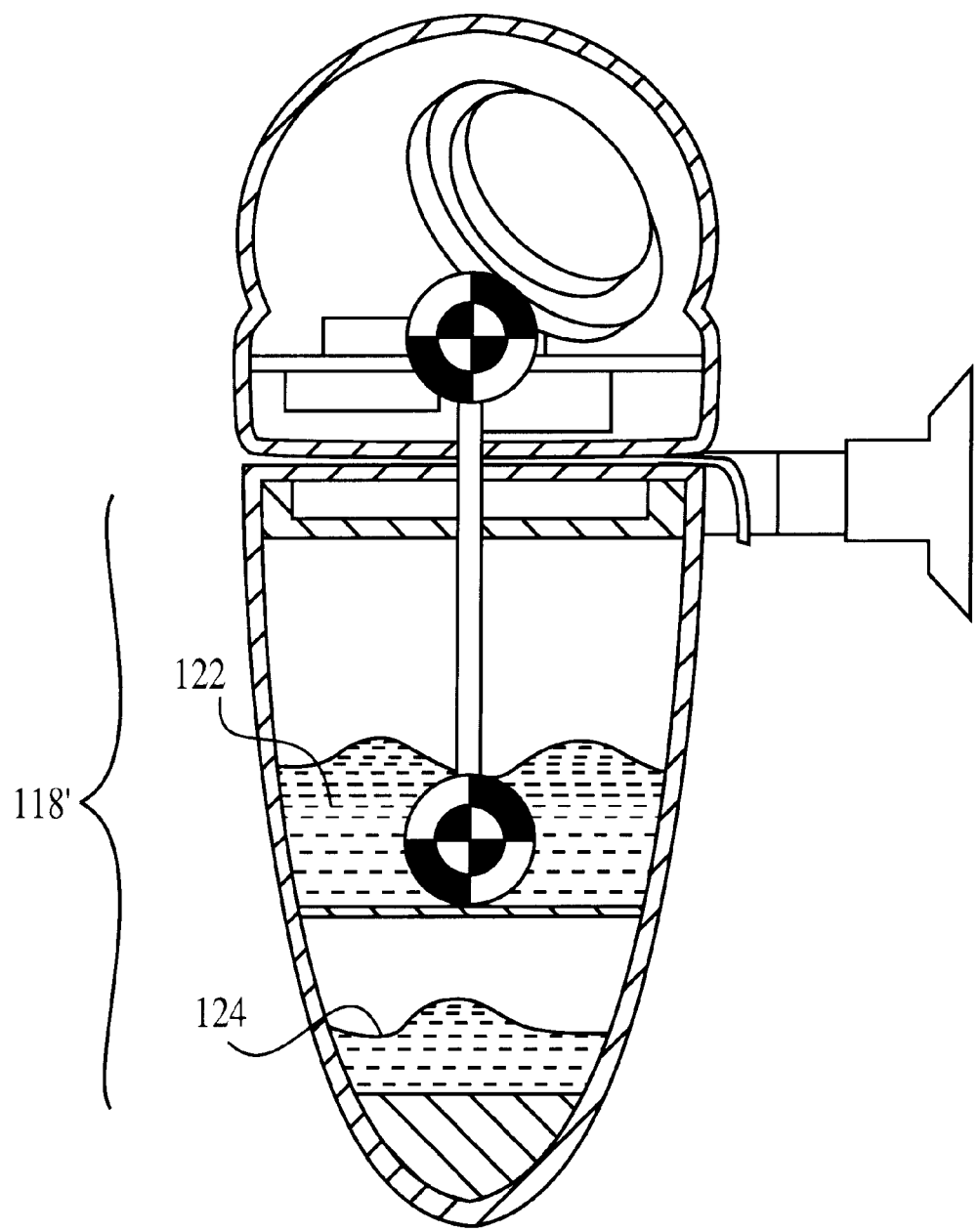
FIG. 12 is a diagram of an antenna mount used with the mobile communicator system.

FIG. 12 is a diagram of another antenna mount used with the mobile communicator system having similar construction as the antenna mount in FIG. 11. In FIG. 12, however, two separate fluid ballast compartments 122 and 124 are provided in ballast portion 118'. FIG. 12 shows an antenna which may be a directional or omnidirectional, mechanically or electronically steered antenna unit. The antenna has one center of gravity while the ballast portion 118' including the housing, dampening fluids, etc. has another center of gravity.

Although in the embodiment of FIG. 12 shows only two fluid ballast compartments 122 and 124, an additional number of fluid ballast compartments may also be used, stacked vertically. These ballast compartments may or may not contain annular baffles 160 shown in FIG. 11.

Both FIGS. 11 and 12 include a ballast weight comprised of a suitably dense material such as lead. Dampening fluids disposed in the fluid chambers preferably comprise a fluid in the viscosity range of 6 to 1000 centipoise, having a specific gravity range of 0.6 to 2.23 grams per centimeter squared. Both the specific gravity and viscosity of dampening fluids should be relatively constant over a broad temperature range (e.g., −40° C. to 100° C.) or at least remain within the above limits over this temperature range. Additional details of the above antenna mount in FIGS. 11 and 12 are disclosed in copending application Ser. No. 08/058,079 filed May 10, 1993, incorporated herein by reference. Alternatively, the antenna mounts in FIGS. 11 and 12 may also include a ballast tank containing fluid above the fulcrum point of the antenna mount, e.g., above gimbal joints 153, 154 in FIG. 11.

Figure 13:
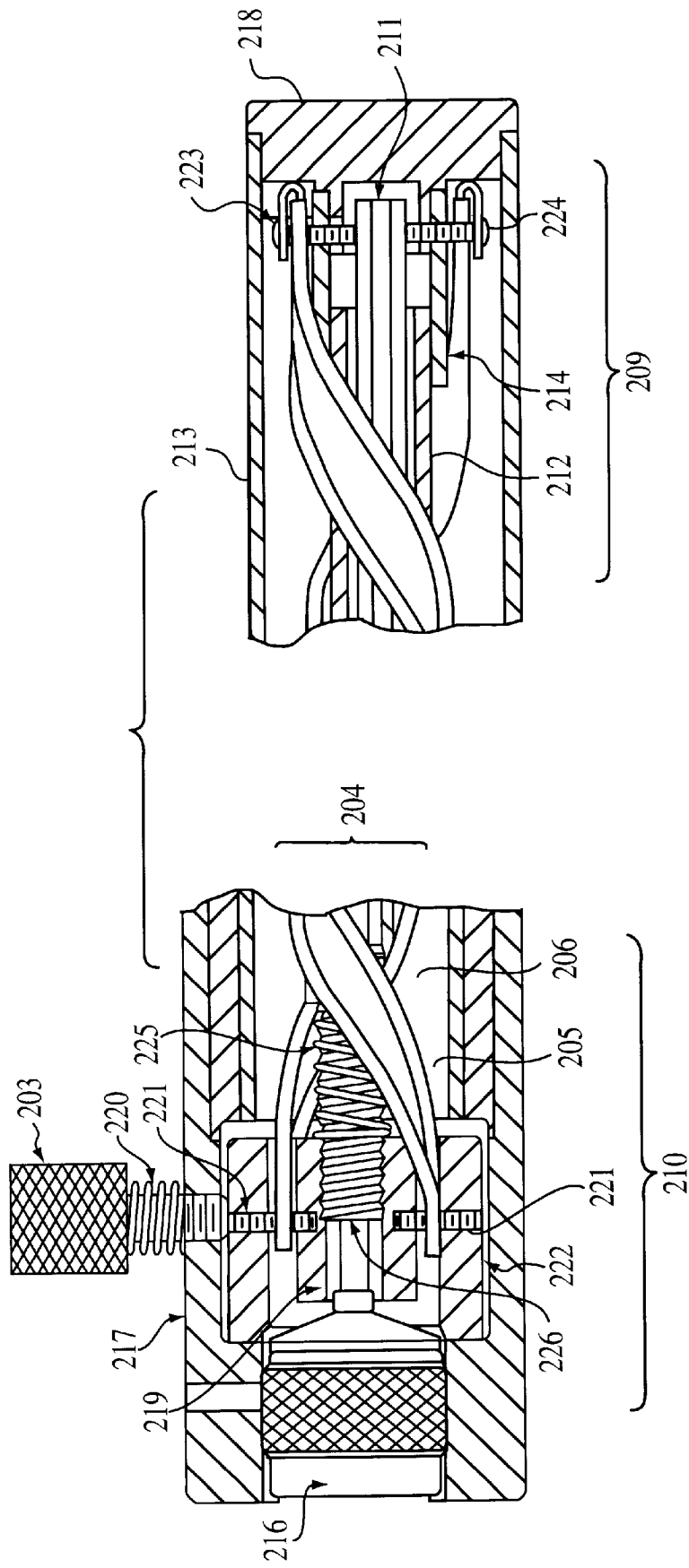
FIG. 13 is a diagram of an antenna used with the mobile communicator system.

FIG. 13 is a diagram of an antenna which may be used with the mobile communicator system. FIG. 13 shows a multi-turn bifilar helix antenna (hereinafter "antenna") using a mechanical design which permits the pitch and diameter of helix elements 205 and 206 to be adjustable. This mechanical adjustment elicits an electrical response in the radiation characteristics of the antenna which permits beam steering of the radiation pattern in the elevation plane. The antenna is capable of scanning its main radiation beam from 20° to 60° in elevation while maintaining relatively omni-directional coverage in azimuth.

A range of 20° to 60° is particularly suitable for use in the CONUS, as this range of elevation corresponds to the angles of inclination between a geostable satellite and locations throughout the CONUS. Other ranges of angles could, of course, be used if the antenna is to be used in another country or countries. A narrower range could be used in applications where the mobile vehicle is anticipated as having a limited range of travel. A fixed elevation angle could be chosen for stationary antennas or antennas used in local mobile applications. At the other extreme, an adjustment range could be provided from 0° (horizon) to 90° (zenith) to provide global coverage. The preferred range of 20° to 60° is shown here for use in the CONUS and is in no way intended to limit the scope of the invention.

The antenna is designed to mount to a detachable base 201 located on the vehicle skin (e.g., trunk, fender, roof or the like) 202. Its scanned radiation angle is set manually by the vehicle operator with the relatively simple adjustment of a knurled sleeve 222 at the base 217 of the antenna.

Bifilar helix 204 comprises two helix elements 205 and 206 separated 180° apart, but sharing a common axis. In the preferred embodiment, helix elements 205 and 206 have conductors made of a highly conductive material, such as copper. Helix elements 205 and 206 serve as the radiating portion of the antenna. Helix 204 has distal end 209 and proximal end 210. In general, the distal end 209 of the vertically mounted antenna is the end which is furthest from the ground plane formed by vehicle skin 202. The antenna is fed at distal end 209 with a balanced assembly comprising coaxial cable section 211 terminating in a balun 214. This distal feed technique is sometimes referred to as the backfire mode.

Helix elements 205 and 206 are formed by being wound around a constant diameter tube to form a uniform helix. The angle of pitch of helix 204 is determined by the number of helix turns for a given axial length. Pitch in unit length is defined as the axial length required for the helix to make one complete turn about its axis. When helix elements 205 and 206 are wound 180° apart as suggested above, a criss-cross effect of the elements is observed when the structure is viewed from the side.

The spacing (helix diameter) and angle of pitch of helix 204 determines the polarization and radiation characteristics of the antenna. A bifilar helix with left-handed helices (ascending counter-clockwise as viewed from the bottom) radiates a right-hand circularly-polarized (RHCP) wave which is relatively omni-directional in azimuth. If the pitch angle and or the diameter of helix 204 is increased from an initial reference point, the radiation in elevation is scanned towards the horizon. In the present invention, the element pitch angle and helix diameter are adjusted by varying the number of helix turns for a fixed axial length.

In one embodiment, helix elements 205 and 206 are made from 300 ohm twin lead line commonly used in FM receivers and some television leads. One of the conducting leads is removed from the polypropylene sheathing of each of helix elements 205 and 206, while the remaining lead serves as the radiating element. Thus, helix elements 205 and 206 each contain only one wire.

Polypropylene was chosen because it readily takes a helix shape when wrapped around a metal tube (not shown) and heated with a hot air gun. Other heating techniques can also be used including heating the metal tube itself. Helical elements 205 and 206 may be formed from two 37 inch lengths of 300 Ohm twin lead line suitably modified as discussed above by stripping one of the leads from the sheathing. When wound six and one-half times around a ⅝ inch diameter tube, helical elements 205 and 206 are formed at an axial length of about 31 inches.

Formed helix elements 205 and 206 are placed over a 31 inch long ⅜ inch diameter hollow supporting tube 212 which may be made of any fairly robust insulating material such as phenolic resin. Supporting tube 212 is centrally located within a 32 inch long outer sheath 213 which is one inch in diameter. Outer sheath 213 also may be formed of any robust insulating material such as polycarbonate and serves to provide environmental sealing of the antenna assembly. Coaxial cable 211 is fed through the center of supporting tube 212 and is terminated at the distal end 209 at balun 214. Coaxial cable 211 may be formed from a UT141 semi rigid coaxial line.

Balun 214 comprises a hollow 3/16 inch diameter brass tube with two feed screws 223 and 224 located 180° apart. The wire portions of Helix elements 205 and 206 are secured to the termination of balun 214, one on each side, by feed screws 223 and 224. Proximal end 210 of coaxial line 211 is terminated by connector 216 which may be press fitted into base 217 of the antenna. Balun 214 serves to maintain a relative phase difference of 180° between the radiating elements for the required frequency bands.

In an alternative embodiment, balun 214 comprises a hollow 3/16 inch diameter slotted brass tube with two slots in the tube located 180° apart. The slots are 0.124 inches wide by 1.85 inches long. The wire portions of Helix elements 205 and 206 are soldered to the termination of balun 214, one on each side, separated by the slots.

Support tube 212 is captured at distal end 209 by end cap 218 set into distal end 209 of outer sheath 213 so as to prevent support tube 212 from rotating. End cap 218 is secured to distal end 209 of outer sheath 213 by glue, screws, threading, press fit, or the like.

Proximal end 210 of support tube 212 is movably attached to inner rotatable sleeve 219 by threaded member 226. Threaded member 226 may be, for example, a ¼-20 threaded stainless steel sleeve. Spring 225 is installed at the point of rotation between support tube 212 and inner rotatable sleeve 219 to prevent undesired relative movement between inner rotatable sleeve 219 and support tube 212. Spring 225 may be made of, for example, stainless steel. Inner rotatable sleeve 219 is held in place by two set screws 221 within knurled adjustment outer sleeve 222. Inner sleeve 219 and outer sleeve 222 are located within base 217 which supports outer sleeve 213 and connector 216. The two grounded ends of helix elements 205 and 206 are attached to rotating set screws 221, creating a mechanism for changing helix pitch. Access to knurled outer sleeve 222 is made by machining two window slots (not shown) in the base 217. Base 217, inner sleeve 219 and outer sleeve 221 may be made from any suitable insulating plastic material with requisite strength requirements, such as DELRIN™ plastic.

Helix 204, preferably made of polypropylene, has the desirous property of maintaining a uniform pitch along its axial length, even when one end is rotated with respect to the other. By fixing proximal end 209 of helix elements 205 and 206 from rotation to balun 214 and attaching proximal ends 210 of helix elements 205 and 206 to rotatable outer sleeve 222, an elevation steerable antenna with fixed height and adjustable pitch is achieved.

In operation, the operator loosens knurled locking bolt 203 (held firm by spring 220) and twists knurled outer sleeve 221 through the two window slots (not shown) to adjust the axial pitch of antenna 200. In its initial position, helix elements 205 and 206 make approximately six and one-half turns within the axial length of antenna 200. This allows for coverage within 20° above the horizon. In the other extreme, helix elements 205 and 206 make just under ten complete turns, allowing for coverage up to 60° above the horizon. A mechanical limiter (not shown) and elevation angle indicator (not shown) are used to prevent the user from forcing the helix elements beyond their six and one-half and ten turn limits and to simplify the process for optimizing the antenna for elevation coverage. The operator's choice of elevation angle can be determined from the latitude where the vehicle is located, or can be positioned with the aid of a standard electronic antenna peaking device. Additional details of the above antenna in FIG. 13 are disclosed in copending application Ser. No. 08/187,996 filed Jan. 28, 1994, incorporated herein by reference.

FIGS. 4–8 are different views of the mobile communicator system. In FIGS. 4–8, mobile communicator system 26 includes left and right end bumpers 82a, 82b, each with left and right recessed handles 84a, 84b disposed therein on the upper surface of end bumpers 82a, 82b. On the opposite side of end bumpers 82a, 82b are respectively positioned finger grips 92a, 92b which further provide traction for gripping mobile communicator system 26. End bumpers 82a, 82b with recessed handles 84a, 84b and finger grips 92a, 92b provide an effective way of protecting mobile communicator device 26 while being handled or gripped by the vehicle operator.

Mobile communicator device 26 further includes keyboard 86 with inclined palm rest 88 and display 90. Keyboard 86 is designed in such a manner to insure that no fluids which might be encountered by mobile communicator system 26 be permitted to pass therethrough. Accordingly, keyboard 86 is comprised of a standard rubber/carbon keyboard which, however, is sealed to the opening around the outer edges of mobile communicator system 26 corresponding to keyboard 86. In this manner, fluids which are spilled onto keyboard 86 will not enter the electrical components of the mobile communicator system 26 Resistive or mechanical switches may be disposed below keyboard 86 for selecting specific characters.

Display 90 also advantageously comprises a shock resistant material, such as tempered glass having a thickness of approximately 0.125 inches. Display 90 is sealed to the housing of mobile communicator system 26 using a seal material such as silicon foam applied to the outer edge of display 90 and the housing using an adhesive. The exterior housing of mobile communicator system 26 is preferably constructed of a shock resistant material, such as a polycarbonite, or G.E. Cycoloy type material. End bumpers 82a, 82b may comprise a elastomeric or silicon rubber. Accordingly, this extremely durable exterior of mobile communicator system 26 provides additional protection which was discovered to be necessary for such a device when used in a vehicle as described and contemplated.

Mobile communicator device 26 further includes the feature of steering wheel steps or rests, 96a, 96b which permit the vehicle operator to temporarily mount mobile communicator system 26 on the steering wheel for convenience of use. Further, mobile communicator device 26 includes recessed area 100 and cable outlet access 102 in right end bumper 82b for further organizing the various cables which may be connected to mobile communicator device 26, and for organizing the cables which are required to be plugged therein, for example, end cable plugs 108 and 110.

Mobile communicator system 26 also includes the advantageous features of sensors embedded therein to automatically determine mishandling of the mobile communicator system, together with a durable and shock resistant exterior. In addition, mobile communicator system 26 includes the conveniences of being able to temporarily mount the device on the steering wheel of a vehicle, as well as organizing the cables in a manner which minimizes the intrusiveness thereof. Finally, mobile communicator system 26 includes means which facilitates the easy handling of the device by providing hand grips on both sides of the device in the end bumpers.

Mobile communicator system 26 also includes PCMCIA port 106 which is covered by a rubber protective cap in which also includes recessed access portion 94 for opening the rubber cover to gain access to the PCMCIA port.

Figure 9:
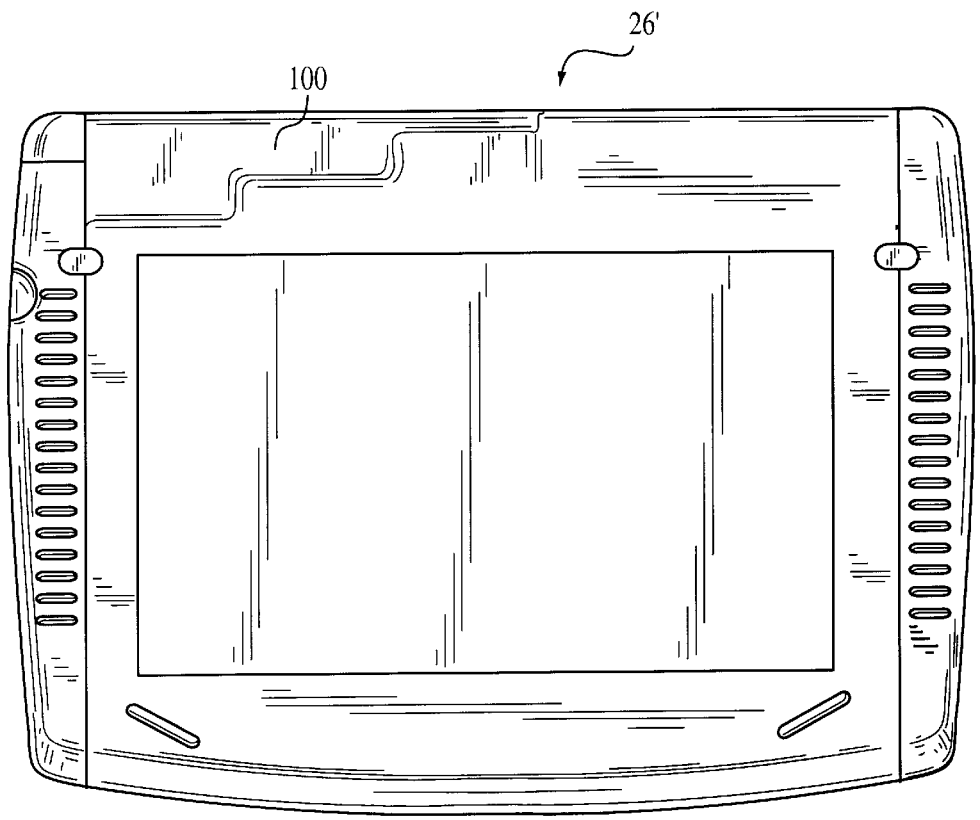
FIGS. 9–10 are respective bottom plan and rear elevational views of another embodiment of the mobile communicator system.
Figure 10:
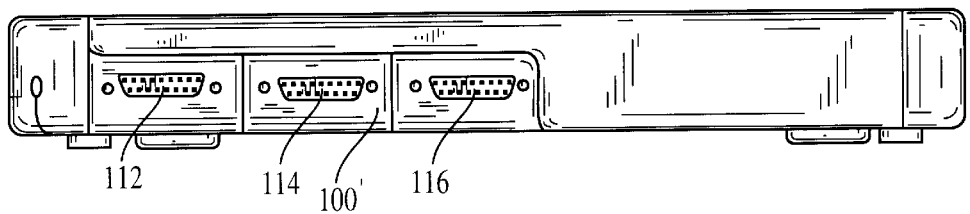

FIGS. 9–10 are respective bottom plan and rear elevational views of another embodiment of the mobile communicator system. The remaining views of mobile communicator device are essentially similar as described in connection with the first embodiment. As shown in FIG. 9–10, mobile communicator device includes modified recessed area 100' which accommodates multiple input/output ports 112, 114, and 116. Advantageously, recessed area 100' is configured in a step like function or manner so that the corresponding cable ends for each of the cables do not interfere with each other and which permit the cables to be uniformly exited through exit hole 104 of right end bumper 82b.

Figure 1:
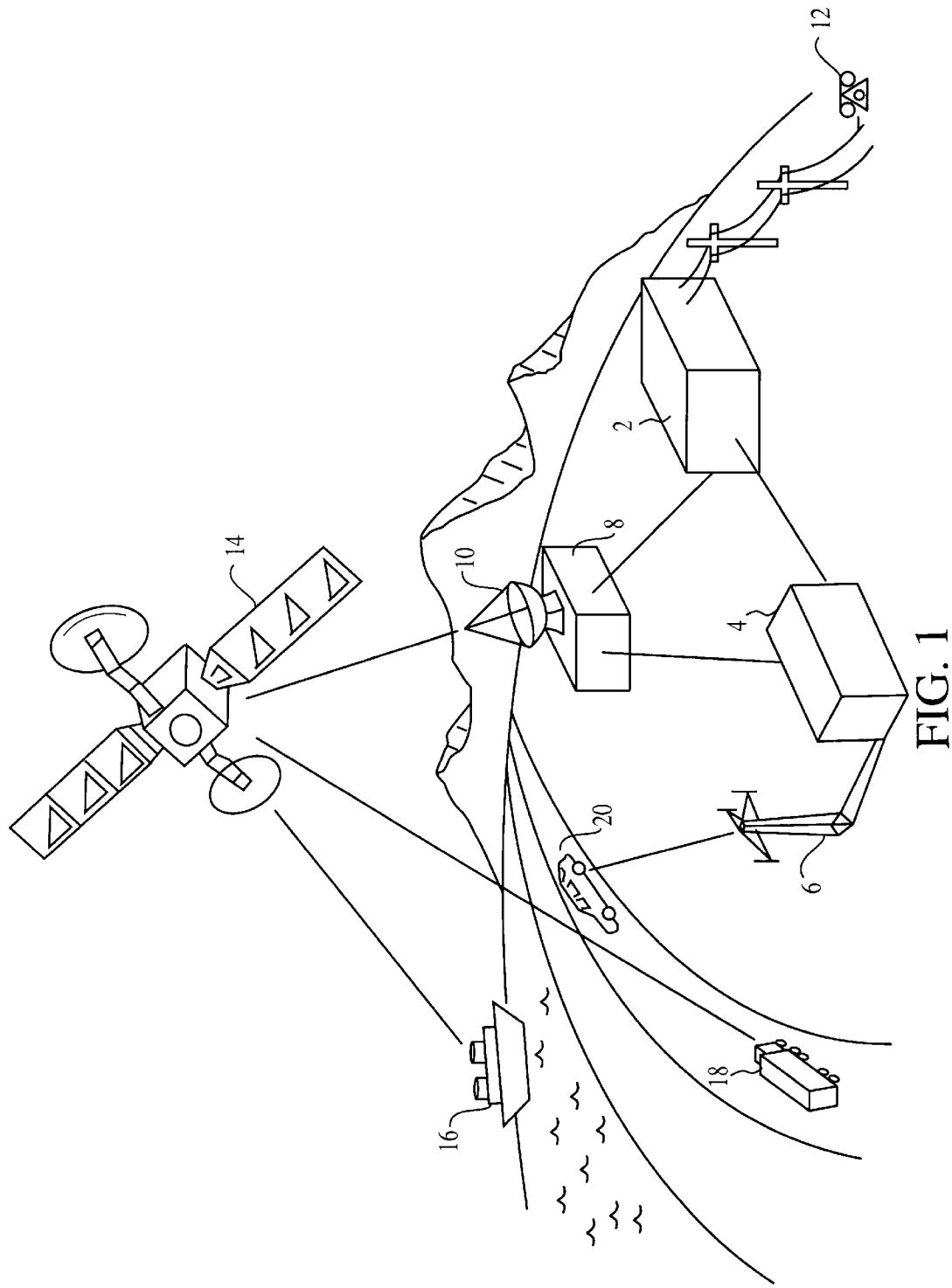
FIG. 1 is a diagram of the overall mobile communicator system.
Figures 1, 14:
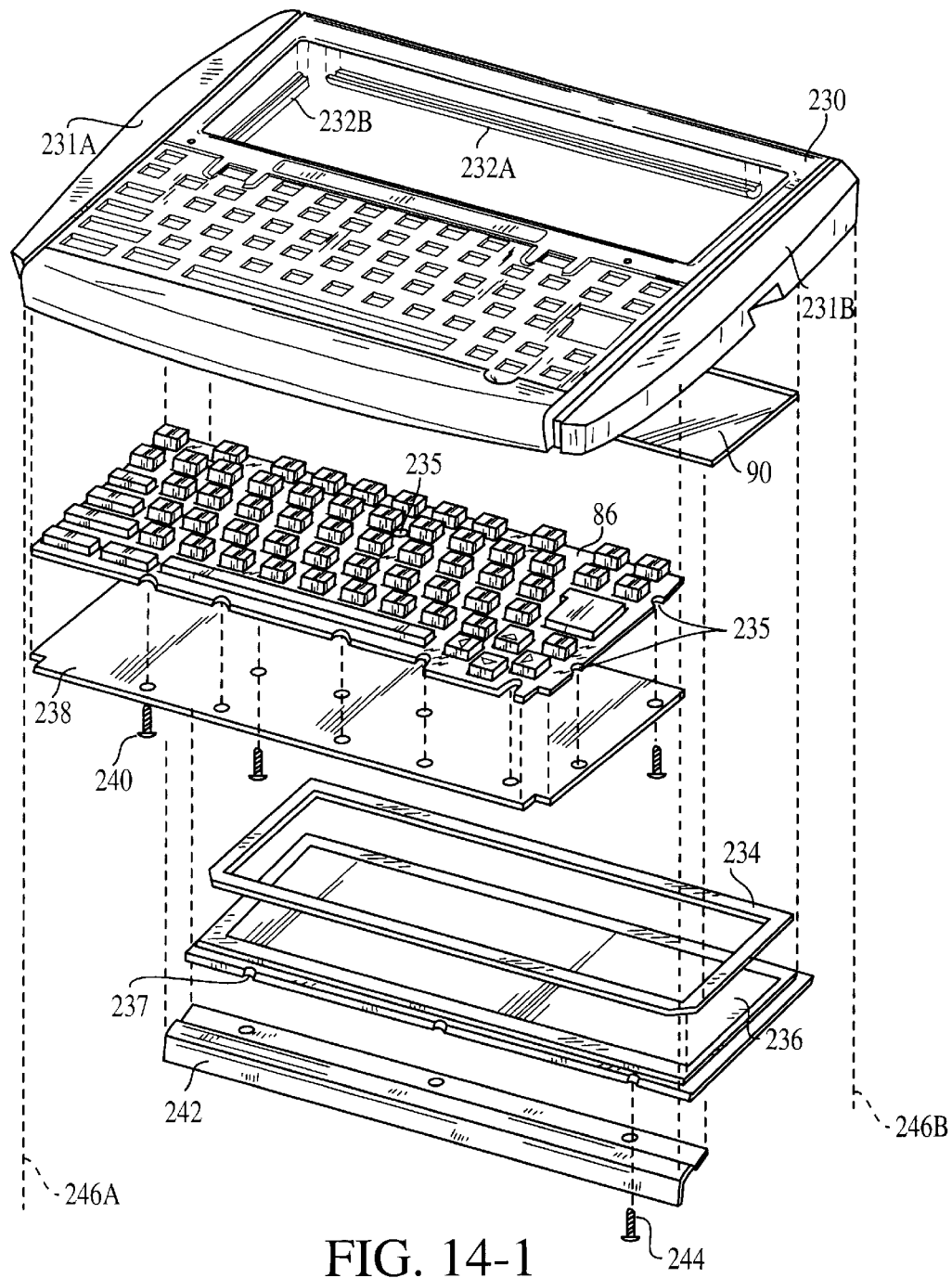
Figures 2, 14:
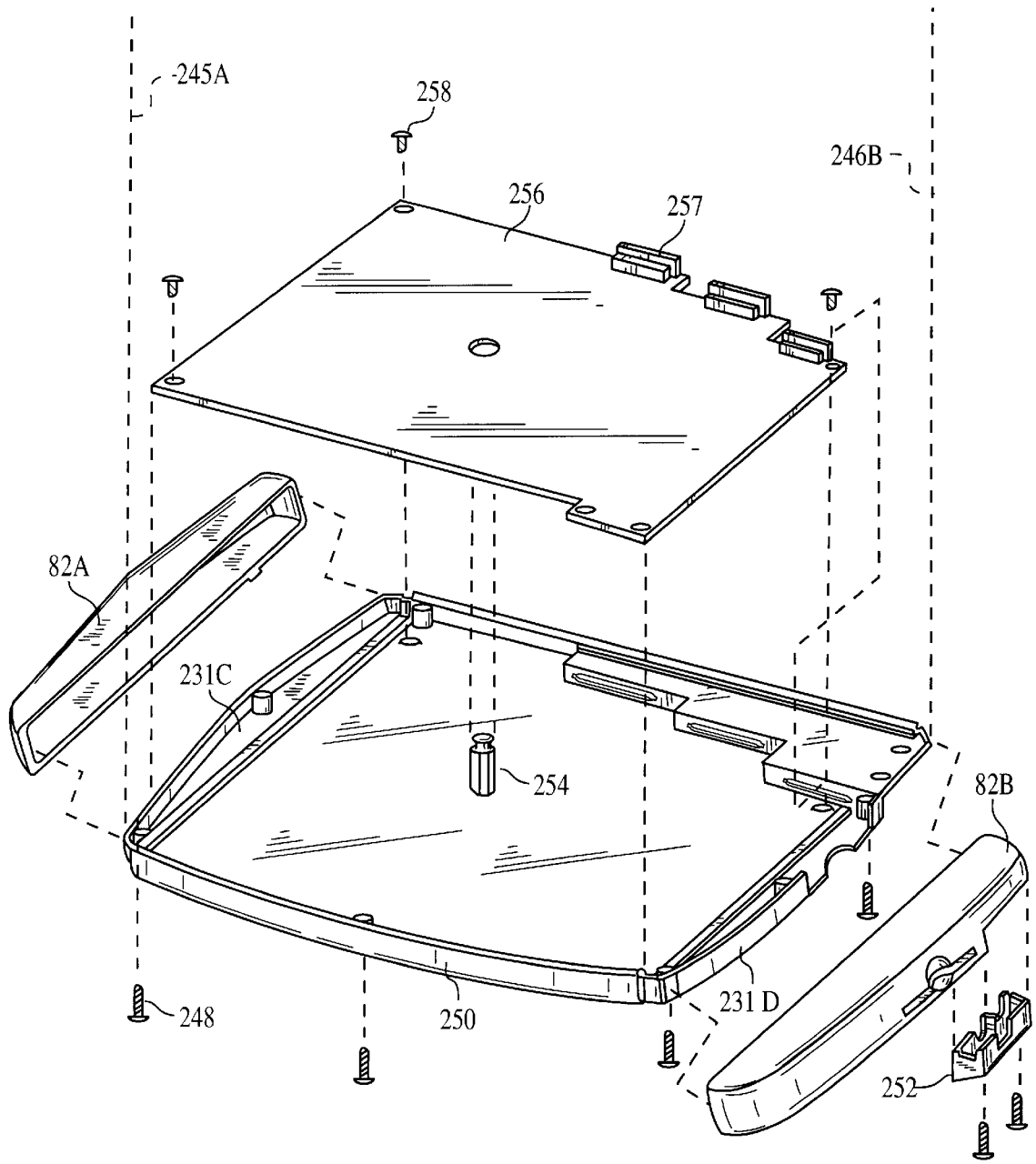

FIGS. 14-1–14-2 are exploded views of the mobile communicator system showing the inner components. FIG. 14-1 illustrates the construction of the upper portion of the mobile communicator system, while FIG. 14-2 illustrates the construction of the lower portion of the mobile communicator system. The upper and lower portions are assembled together as illustrated by dashed lines 246a and 246b and connection screws 248. Connection screws 248 are attached or mounted to female connectors mounted in the upper portion described in detail below in connection with FIG. 16.

The upper portion in FIG. 14-1 comprises upper casing 230 with upper handle receiving portions 231a and 231b. Upper handle receiving portions 231a and 231b are used for mounting end bumpers 82a, 82b illustrated in FIG. 14-2. End bumpers 231a and 231b advantageously serve to protect the mobile communicator system from adverse conditions, such as mishandling, falls, etc. Upper casing 230 includes elastomer sections 232a and 232b and tempered glass 90 for protecting monitor 236 used to display data transmitted and received between the mobile communicator system and a central control system, sensors, etc. Elastomer sections 232a and 232b are used to absorb shock experienced by the mobile communicator system, thereby protecting tempered glass 90 from being broken, chipped or shattered. Elastomer sections 232a and 232b are also used as a seal for the monitor portion of the mobile communicator system preventing or inhibiting the entrance of fluid therein. Similarly, tempered glass 90 protects monitor 236 from the external conditions experienced or encountered by the mobile communicator system.

An additional elastomer or foamed material 234 is advantageously disposed or arranged between tempered glass 90 and monitor 236. Foamed material 234 may be adhesively secured to either of the monitor 236 or tempered glass 90. Tempered glass 90 may be either chemically or heat treated tempered glass. However, we have discovered unexpectedly that for the mobile communicator bracing system application, heat treated tempered glass performs much better for he types of external conditions the mobile communicator will experience. An additional foamed material similar in construction to foamed material 234 may also advantageously be disposed between upper casing 230 and tempered glass 90. This additional foamed material provides enhanced protection for the tempered glass 90 and inner components by simultaneously providing additional shock distribution and a water resistant seal between the upper casing 230 and the tempered glass 90. Monitor 236 includes screw holes 237 advantageously shaped in the size of a "half moon." As will be described in detail below, screw holes 237 facilitate the easy removal of monitor 236 while maintaining connection of other components inside the mobile communicator system.

The upper portion of the mobile communicator systems also includes keyboard related components which are mounted to upper casing 230. In particular, keyboard 86 is comprised of a standard rubber/carbon keyboard which, however, is sealed to the opening around the outer edges of the mobile communicator system. In this manner, fluids which are spilled onto keyboard 86 will not enter the electrical components of the mobile communicator system. Thus, keyboard 86 includes mounting holes 235 around its periphery in a "half moon" shape as well as circular holes placed between the various elevated keys. Printed circuit board 238 includes resistive switches positioned below the keys of keyboard 86 for selecting specific characters. Screws 240 are used to mount printed circuit board 238 and keyboard 86 to upper casing 230 in a secure and water resistant or water proof manner as will be described in detail below. Screws 240 enter holes in printed circuit board 238 and mounting holes 235 around the periphery and within keyboard 86.

Mounting bracket 242 is then positioned above monitor 236 and printed circuit board 238 for securely mounting the keyboard and monitor components to upper casing 230 via screws 244. Screws 244 advantageously are not inserted in any circular hole in monitor 236, but rather are inserted in "half moon" shaped hole 237 of monitor 236, permitting easy removal and insertion of monitor 236 from upper casing 230. Thus, the pressure exerted from screws 244 on mounting bracket 242 and monitor 236 thereby holds or retains monitor 236 to upper casing 230.

The bottom portion of the mobile communicator system in FIG. 14-2 includes lower casing 250 with lower handle receiving portions 231c and 231d which cooperate with upper handle receiving portions 231a and 231b for mounting end bumpers 82a and 82b to the upper and lower casings 230 and 250. End bumper 82b is advantageously configured to include a recessed portion which receives cable securing member 252 mounted thereto.

Cable securing member 252 is used to affix or secure cables which are connected between input/output ports 257 of the mobile communicator system to external devices or destinations. Input/output ports 257 are connected to printed circuit board 256 which advantageously comprises the overall microprocessor circuitry for performing the processes of the mobile communicator system. Printed circuit board 256 is advantageously mounted to lower casing 250 via screws 258, and includes a center hole for receiving therethrough support 254. Support 254 is mounted to lower casing 250 and is used to maintain clearance between upper and lower casings 230 and 250 as well as prevent buckling of the upper and lower casings 230 and 250 together. Thus, support 254 is an important structural feature of the lower casing 250. Advantageously and significantly, support 254 includes at its upper surface a rubber or shock absorbing element that reduces or distributes the shock experienced by the mobile communicator and on its inner components. Thus, this additional shock absorbing element is also a feature of the structure of the mobile communicator bracing system.

FIGS. 14-1 and 14-2 therefore illustrate the modular construction of the mobile communicator system which permits the various components relating to the keyboard, monitor and microprocessor related elements to be securely mounted to the upper and lower casings 230 and 250. Accordingly, the components within the mobile communicator system are protected from external shock and external conditions, including the feature of being water resistant.

Figure 15:
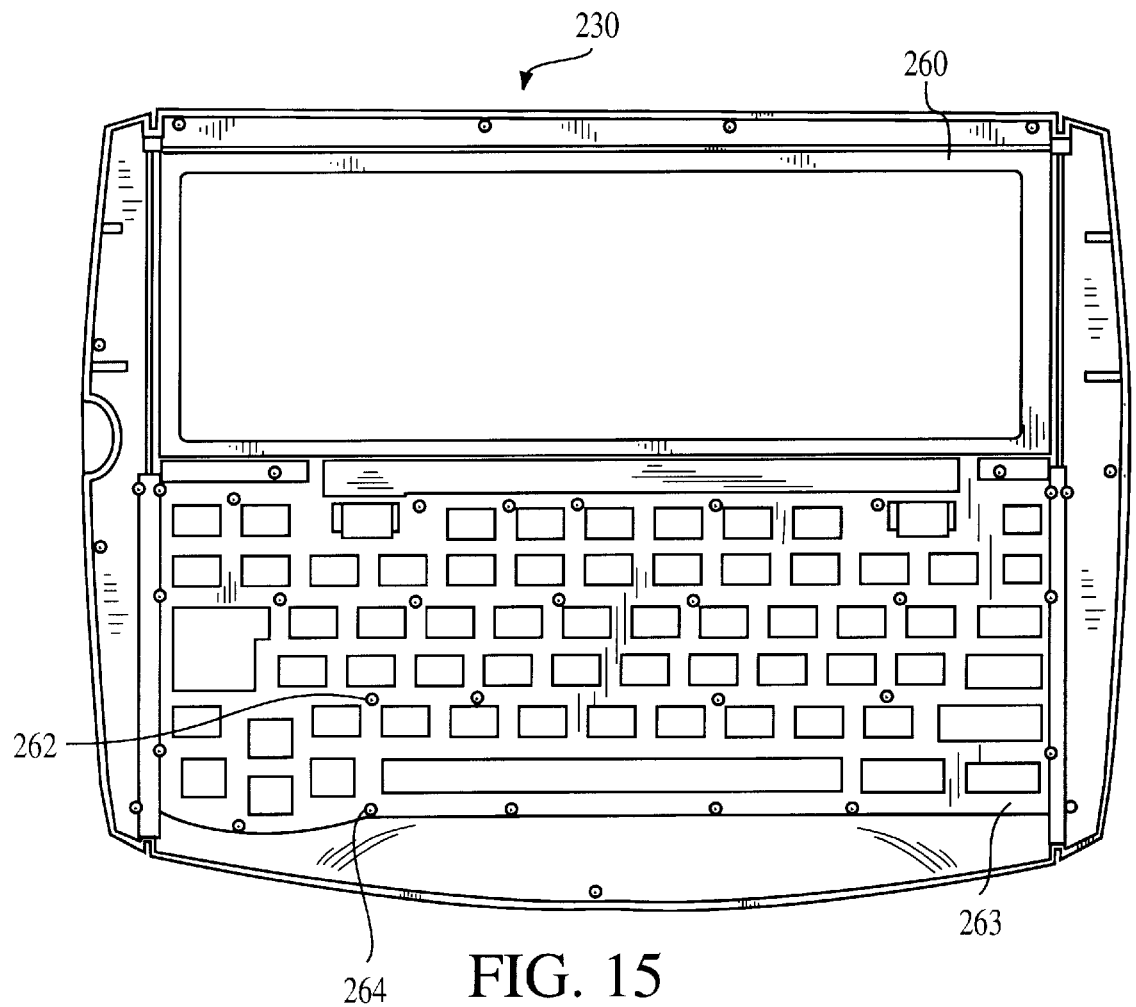
FIG. 15 is a top plan view of the upper casing in the mobile communicator system viewed from the inside.

FIG. 15 is a top plan view of the upper casing in the mobile communicator system viewed from the inside. No internal components of the mobile communicator system have been mounted to upper casing 230. As illustrated in FIG. 15, upper casing 230 includes protruding or elevated rod or stick-like portions 260 which extend around the monitor opening of upper casing 230. Elastomer sections 232a and 232b (shown in FIG. 14-1) are placed on elevated portions 260 and used as a seal for the monitor portion of the mobile communicator system, preventing or inhibiting the entrance of fluid therein. Keyboard template 263 includes female mounting connectors 262 and 264 which extend above the surface and which enter or penetrate through keyboard holes 235 in keyboard 86 (keyboard holes 235 and keyboard 86 are illustrated in FIG. 14-1).

Figure 16:
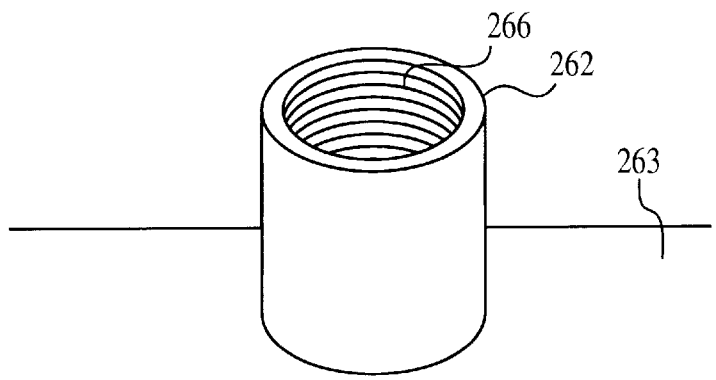
FIG. 16 is an enlarged view of a female connector in the upper casing of the mobile communicator system of FIG. 15.

FIG. 16 is an enlarged view of a female connector in the upper casing of the mobile communicator system of FIG. 15. As illustrated in FIG. 16, female connector 262 (or connector 264 in FIG. 15) is elevated and extends above keyboard template surface 263. Female connector 262 includes threaded portions 266 formed therein for receiving screws 240 (illustrated in FIG. 14-1) to mount the keyboard to the upper casing. Female connectors advantageously extend above surface 263 to enhance the water resistivity of the mobile communicator system and to firmly secure the keyboard to the upper casing. Thus, the keyboard is not only tightly secured around its outer edges to the upper casing, but also in various locations interior or more centrally located in the keyboard.

Figure 17:
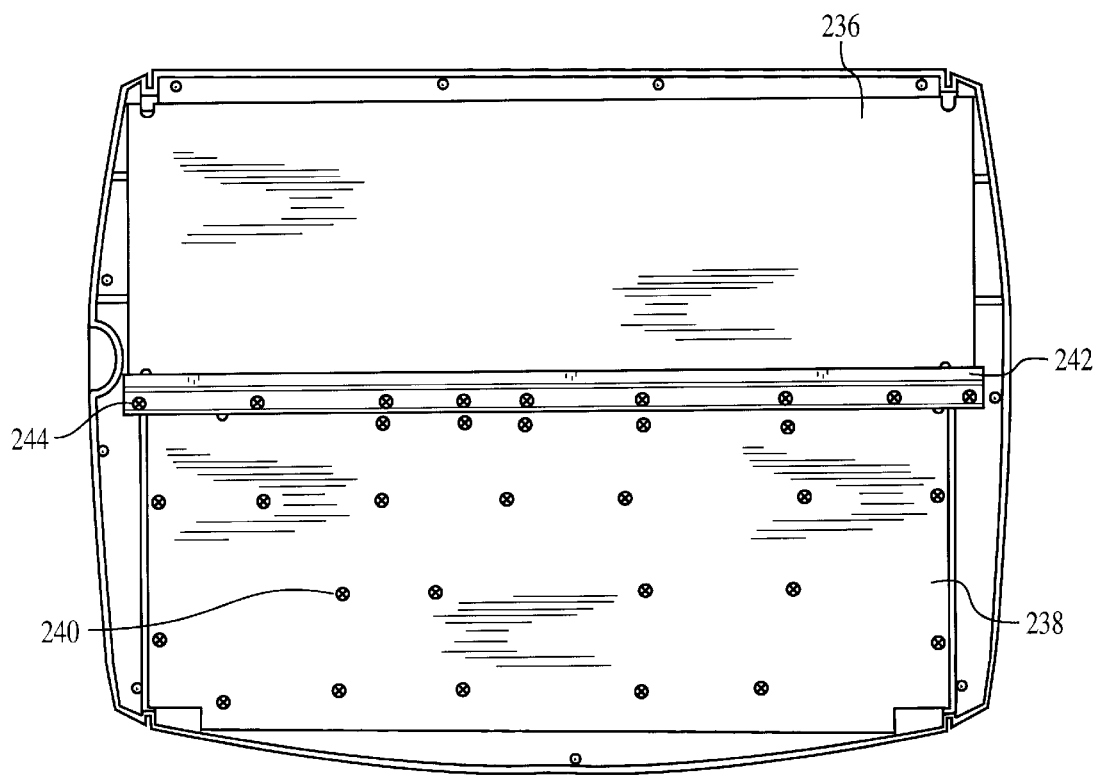
FIG. 17 is a top plan view of the mobile communicator system viewed from the inside when assembled.

FIG. 17 is a top plan view of the mobile communicator system viewed from the inside when assembled. As shown in FIG. 17, monitor 236 is secured by the pressure of mounting bracket being fixed to the upper casing via screws 244. Printed circuit board 238 (used in connection with the keyboard) is also mounted to the upper casing via screws 240.

Figure 18:
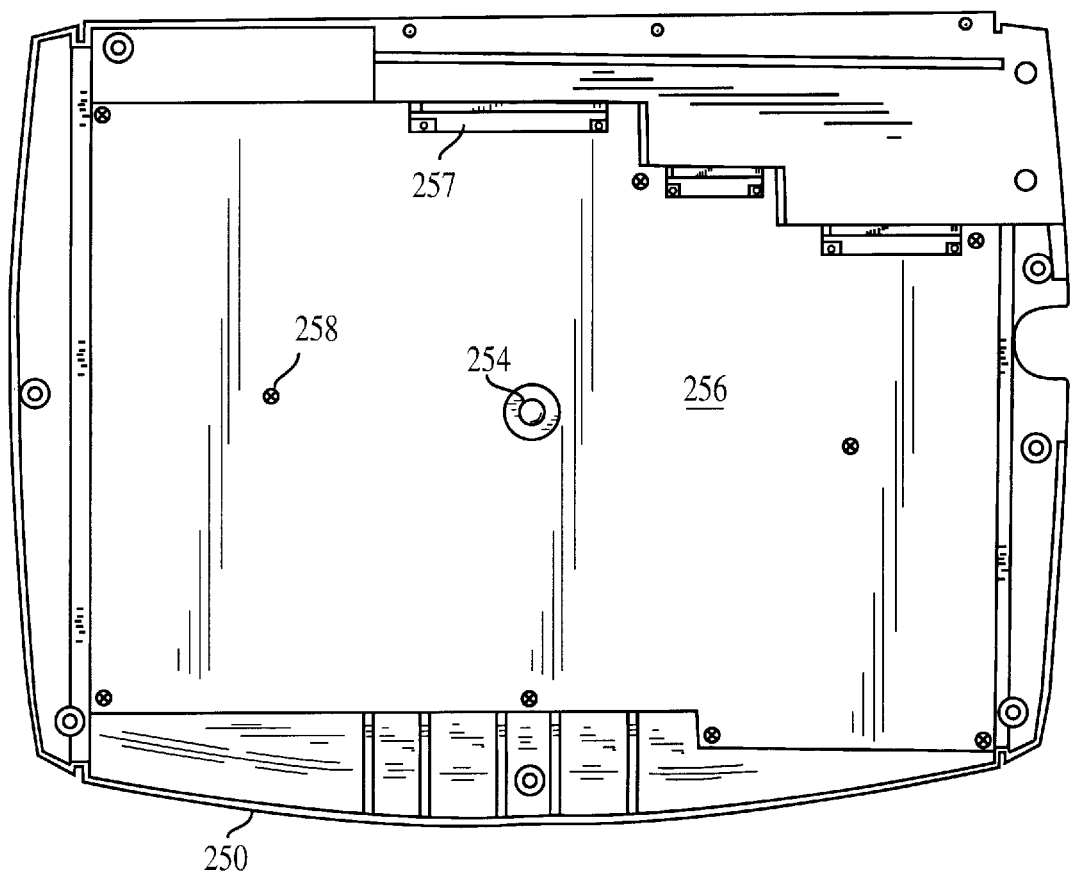
FIG. 18 is a bottom plan view of the mobile communicator system viewed from the inside when assembled.

FIG. 18 is a bottom plan view of the mobile communicator system viewed from the inside when assembled. As illustrated in FIG. 18, printed circuit board 256 is secured via screws 258 to the lower casing 250. Input/output ports 257 are positioned to cooperate with external holes (not shown) in the lower casing 250 for connection to external devices or destinations. Support 254 protrudes through a hole in printed circuit board 256, and prevents the lower and upper casings from buckling inward.

The present invention provides full duplex operation and to provide full compliance to priority preemption requirements. The most concise definition for this "real-time preemptive capability" is illustrated in FIGS. 19 and 20. FIG. 19 lists MES/MT requirements, and FIG. 20 contains a list of minimum requirements for Land Earth Stations (LESS) associated with the Mobile Satellite Service (MSS) operating in the 1545–1559 MHz and 1646.5–1660.5 MHz bands.

Mobile Terminal Compliance Analysis: FIG. 21 illustrates a verification matrix that identifies the present and proposed capabilities of, for example, the Rockwell Pro2000 Land Mobile Terminal (MT) compared to the requirements shown in FIG. 19. This use of the Rockwell Pro2000 is for illustrative purposes, and as described above, any MT that can perform the functions described herein applies to the present invention. This matrix shows that the Pro2000 already meets requirements 1 through 4, and 8. These basic requirements, although worded somewhat differently, can be found in the INMARSAT-C System Definition Manual (SDM), incorporated herein by reference.

It should also be noted that on requirements 6 and 7, the Rockwell MT actually meets the letter of the requirement, it is just a matter of the amount of time that it takes to meet the requirement. The proposed changes will allow, for example, the Rockwell MT to meet all of the requirements outlined for operation in the upper L-Band in a real-time preemptive access environment. The proposed changes that are shown in summary form in FIG. 21 will be explained in detail below.

Land Earth Station Compliance Analysis: FIG. 22 is a verification matrix that identifies the present and proposed capabilities of, for example, the Rockwell Land Earth Station (LES) compared to the requirements shown in FIG. 20. Other LESs may also be used in the present invention. This matrix in FIG. 22 shows that the Rockwell LES already meets requirements 1 through 6, and 8 without any additional changes required. These basic requirements, can be found in the INMARSAT-C System Definition Manual (SDM).

It should be noted that on requirement 7, the Rockwell LES actually meets the requirement, however the proposed change automates the process of sending shutoff commands to the MTs. The proposed changes will allow the Rockwell LES to meet all of the requirements outlined for operation in the upper L-Band in a real-time preemptive access environment. A standard computer to computer interface over dedicated communication lines from either an aeronautical or maritime system to the Rockwell LES is utilized. The proposed changes that are shown in summary form in FIG. 22 are explained in detail below.

Mobile Terminal changes

1. Develop a protocol for sending long, from-mobile, via satellite messages as multiple, short (one packet) messages.

Protocol is between the transceiver and RBS.

Protocol is enabled by a new poll command type to the transceiver utilizing a Super DNID, described below in detail.

An optional function of rejecting the message to the KDU with a reason code.

2. Change the control to the DSP following a transmission of a one packet message to be exactly the same as presently used for signaling channel transmissions. (This change allows the MT to operate in a software full-duplex mode.)

3. Add a check of carrier signal quality just prior to initiating any satellite transmission.

Add the capability to the DSP to provide Signal Quality averaged over the prior 1 second to the control processor (CP) in response to a query. Signal Quality will continue to be output periodically at the end of each 8.64 second frame.

Add the capability to the CP to query the DSP for Signal Quality and to process the response.

Add the logic in the CP transmit control function to abort a transmission if Signal Quality is below a minimum threshold.

4. Upon receipt of the out-of-service poll, a command to abort any satellite protocol transaction currently in process is issued, and all future satellite transmissions are inhibited until an in-service poll is received.

5. Add a check of the maximum message size and verify that the current message meets the requirement just prior to entering the message into the via-satellite queue. It is presently checked only when the message arrives from the source. Verify that there are no messages in process that exceed the size requirement when the short message size is commanded.

6. Add the capability to receive a new poll type. The data field in this new poll is used to set the message size limit and select whether long messages are to be sent using the new protocol or just rejected. The data field can also be used to disable the message size limit.

7. Add the capability for the MTs to be loaded with a special/unique DNID or Super DNID that is not unique to a subaddress or to an LES ID. This Super DNID is used as a super group allowing all MTs to be addressed with a single poll command.

8. For the standard Jaguar transceiver only, add the capability to download DSP code from the control processor. This capability already exists in the hardware for the pre-Jaguar transceivers.

Proposed Changes To The Pro2000 Mobile Terminal: This section describes in detail the proposed changes to the Pro2000 MT for operation in a "real-time" preemptive access environment. Similar changes may also be implemented for other standard data terminals to perform the functions described. The changes to the MTs are of utmost importance because it is difficult to upgrade a large quantity of mobile units once fielded. The proposed changes refer to the MES minimum requirements shown in a Letter to the FCC Common Carrier Bureau Chief (see FIG. 19). Only requirements 5, 6, and 7 are addressed here since all other requirements are already met by, for example, the Pro2000 MT.

Requirement 5: All MESs that do not continuously monitor a separate signaling channel have provision for signaling in communication channel.

The MT continuously monitors the forward channel which carries both signaling and communication traffic. The exception to this continuous monitoring is during transmissions. Two additional functions to the MT software are required to provide this enhancement.

Shorten Maximum Transmit Message Size: The first change is to shorten the maximum transmit message size to, for example, less than 113 bytes. This makes the maximum transmitter "on" time equal to 1.973 seconds for message channel transmissions. The reason for making this change is to make the transmitter "on" time short enough to allow continuous receiver operation during the "blanked" periods of transmission. The present message size limit is 1,600 bytes which is equivalent to 23.733 seconds. Messages longer than 113 bytes constitute less than 1% of the total message traffic on the Rockwell network.

In order to accommodate these longer messages, an additional message transport protocol layer is added between the transceiver and the LES or Base Station (BS) to automatically send longer messages as multiple short messages over the satellite message path. The message size limit and an enable for the use of the long message transport protocol can optionally be downloaded to the MTs over the air.

The other available transmit channel is a signaling channel. The transmitter "on" time for the signaling channel is 0.263 seconds. No changes are required for signaling channel operation.

Utilize FEC And Interleaving To Provide Continuous Receive Operation During Transmit: The second change to the MT software allows continuous monitoring of the signaling channel, "full-duplex mode", by taking advantage of the robust standard INMARSAT-C Forward-Error-Correction (FEC) coding and interleaved frames during the short blockage of the receive signal by transmission. The combination of the Forward-Error-Correction coding and the interleaved frames allow the receiver to operate continuously in a Land Mobile environment where the receive signal is frequently blocked by obstructions such as buildings, trees, overpasses, road signs and bridges.

The forward channel of an INMARSAT-C is sent as 8.64 second frames. Each of these frames consists of 639 bytes (5,112 bits) of usable information. This data is encoded using a error detection/correction algorithm with the encoder generating 2 symbols per input bit of information. A unique word (used for frame synchronization) consisting of 128 symbols and a flush word consisting of 16 symbols are added to make up a frame of 10,368 symbols. These 10,386 symbols are interleaved using a standard INMARSAT-C algorithm that fills a table "column-wise" and empties it "row-wise" in a pseudo-random order so that no adjacent symbols are sent on the RF channel adjacent to each other.

This encoded and interleaved channel is sent over the satellite and the MT receiver digital signal processor (DSP) deinterleaves and decodes the signal a frame at a time using the standard INMARSAT-C error correction algorithm to correct as many as the errors as possible. These error correction algorithms allow the MT to correctly receive and decode frames with as much as 40% of the frame missing.

The INMARSAT-C System Definition Manual (SDM) specifies several tests to verify the correct operation of the receiving system in the presence of signal blockages typical of Land Mobile operation. The first of these requirements is continuous packet reception at no more than a 2.0 percent packet error probability (128 byte packets) with 2 second signal blockages repeating every 8.9 seconds. The second requirement is continuous packet reception at no more than 10 percent packet error probability (128 byte packets) with 2.7 second signal blockages repeating every 8.9 seconds. The MT, for example the MT Pro2000, meets both of these requirements.

It is very significant to note that with the message size limit of 113 bytes, the longest MT transmission is 1.973 seconds and with INMARSAT-C protocol the repetition rate for a transmission can be no more than about every 90 seconds on the message channel. On the signaling channel the MT transmission is 0.263 seconds and the maximum repetition rate is every 17.28 seconds. The blockage to the receive signal caused by the transmitter with these transmit times is far less significant than encountered in a typical Land Mobile environment.

The MT digital signal processor (the receiver function) operates continuously during transmissions up to 1.973 seconds in length, correcting the errors created by the short signal blockage of the transmitter in the transmitter signal interface function. This continuous receiver operation is already in place for signaling channel transmissions.

Requirement 6: Each MES automatically inhibits its transmissions if it is not correctly receiving a separate signaling channel or signaling within the communications channel from its associated LES.

The MT inhibits its transmissions when it is not receiving the signaling channel, however the time to detect the loss of the signaling channel is, for example, nearly 30 seconds in some cases, and the loss of signaling channel cannot generally be detected while transmitting. In addition, the message size limit discussed above is required to achieve "real-time" preemption capability.

Transmit Inhibit In Present Pro2000 Software: The FEC and Interleaving of the receive channel discussed above causes the time to detect loss of signaling to be quite long using the methods defined in the INMARSAT-C SDM. In all cases, the shut down of the outbound signaling channel will eventually cause all MTs to inhibit transmission. For signaling channel transmissions, the time to detect outbound signaling channel loss and inhibit transmit is, for example, 3.456 seconds (40% of an 8.64 second frame) plus 9.095 seconds (the receive to transmit frame offset time specified by INMARSAT-C) plus 0.263 seconds (the transmitter "on" time) or 12.814 seconds.

For message channel transmissions, the time to detect outbound signaling loss and inhibit transmit is, for example, 3.456 seconds (40% of an 8.64 second frame) plus 17.28 seconds (2 frame times) plus 9.095 seconds (the receive to transmit frame offset time specified by INMARSAT-C) plus 1.973 (the transmitter "on" time for a 113 byte message) or 31.804 seconds. It is significant to note that full duplex hardware implementation of a MT utilizing INMARSAT-C protocol will have generally the same transmit inhibit times, unless the standard software algorithms for inhibiting transmit are also changed.

Change In Standard Signal Loss Detection Algorithm To Reduce Transmit Inhibit Time: The Digital Signal Processor (DSP) in the MT, such as the Pro2000, has an output which represents the average quality of the signal being demodulated (on a symbol by symbol basis) for the previous one second of time. This output is provided once each frame for purposes other than controlling the transmit function in the MT.

The present invention makes this output available to the transmit control software just prior to (within, for example, 20 milliseconds) of the start of transmit. The time to detect a loss in the outbound signaling and inhibit transmit with the above change is, for example, 1.0 second (the minimum time to reliably detect the loss of a very narrow bandwidth channel) plus, for example, 0.020 seconds (the time from the receive sample to the start of transmission) plus the transmitter "on" time.

For signaling channel transmissions (greater than, for example, 86% of all MT transmissions) the inhibit time is, for example, 1.283 seconds. For message channel transmissions the inhibit time is, for example, 2.993 seconds.

The only negative aspect of this change is that occasionally a transmission will be aborted due to a blockage condition that occurs just prior to a transmission. In many cases this may be a non-issue since the receive blockage will also block the transmit signal. In any case, the protocol will recover and attempt to resend the message.

Significantly, if the above described software change was implemented on full-duplex hardware, the inhibit time for signaling channel transmission would be unchanged (because the transmit time is less than the receive sample period), and the message channel inhibit time would be reduced, for example, about 0.973 seconds (the difference between the transmit time of 1.973 seconds and the receive sample period of 1 second).

Requirement 7: Each MES shall automatically inhibit its transmissions on any/all channels upon receiving a channel-shut-off command on a signaling or communications channel from its associated LES.

The MT inhibits its transmissions upon receipt of an "out-of-service" command from the LES, however it cannot presently stop a message transfer already in progress. The MT in accordance with the present invention provides this enhancement of stopping a message transfer already in progress. An additional configuration parameter is loaded into each MT to allow all MTs to be addressed as a single group.

Change In Processing "Out-Of-Service" Command: A command in the form of an INMARSAT-C poll is already in place that causes the MT to inhibit the use of its transmitter. (There is also an "in-service" poll that re-enables the transmitter.) The present invention also modifies the transmitter control logic in the MT software to check the status of the "out-of-service" flag just prior to initiating any transmission. This reduces the time for the MT to respond to the "out-of-service" command.

Modify The Configuration Of The MT To Allow All MTs To Be Addressed As A Single Group: Group polls are already defined by INMARSAT-C and are implemented, for example, in the Pro2000. The size of the group is limited to 255 members for normal INMARSAT-C operation because it is possible to request an Acknowledgment or Response with a poll and a group larger than this could overload the network. To efficiently send commands to MTs for preemption purposes, I have determined that it is not necessary (or desirable) to have acknowledgments or responses, therefore the group size limitation is not needed.

The change in configuration is to add a separate receive only DNID which is common to all MTs. Group poll commands addressed to this DNID are received by all MTs simultaneously, greatly reducing the time required to send commands to a large group of MTs. The MT controlling software is also altered to make this DNID a default parameter and to prevent any transmission in response to a poll that DNID.

Mobile Terminal Overall Preemption Performance: This section describes the Mobile Terminal overall preemption performance with the above proposed changes incorporated. Since the entire Data Service is, for example, Land Mobile, it is secondary to aeronautical or maritime distress or safety-related communications in their respective frequency bands, and therefore, subject to priority preemption. Requirements 5, 6 and 7 as identified in FIG. 19 are appropriate for considering priority preemption of a MT.

Requirements 5 and 7 must be considered in conjunction with each other since simply monitoring a signaling channel (#5) has no value unless there is a command defined that can shut-off the transmitter (#7). With the above changes implemented, the MT is capable of being preempted by the LES shutting down the outbound channel (requirement 6) or using a shut-off command (requirement 7). Preemption by shutting down the outbound channel is the preferred approach because it is much quicker using a shut-down command and it is absolutely fail-safe.

Mobile Terminal Preemption Due To Outbound Signaling Channel Loss (Preferred approach): The modified Mobile Terminal worst case preemption time was 2.993 seconds on the inbound message channels, and 1.283 seconds on the inbound signaling channels. These times were measured from time the received RF signal disappears at the antenna terminal of the MT until the MT is no longer radiating any transmit RF signal from its antenna. This is the easiest, quickest and safest way to preempt the network. The advantages of this method are:

1. All MTs detect the loss of the outbound signaling channel simultaneously.
2. MTs that may have been blocked or powered off at the time of preemption are automatically preempted without any possibility of missing a command.
3. The outbound channel bandwidth is preempted simultaneously with all of the inbound channels (commanded preemption requires outbound channel capacity to send the commands).
4. The preemption does not incur the delay of having to synchronize to the outbound channel frames (this causes up to 8.64 seconds of delay on commands).
5. The preemption does not incur the delay associated with receiving any command by the MT (because of interleaving all messages received by the MT are spread over an 8.64 second frame period).

The MT preemption times due to loss of the outbound signaling channel compared favorably with the preemption times specified for the Aeronautical Mobile SatComm by RTCA Special Committee 165 in DO-210, Change Notice 1, incorporated herein by reference. DO-210 paragraph 2.2.4.2.8c specifies the criteria for inhibiting transmissions if not correctly receiving forward channel signaling information. The specified criteria is:

1. R-Channel inhibit unless P-Channel frame lock (false lock probability $<10^{-5}$). Loss of Lock declared in 4 frames (4 frames times 2 second frames=8 seconds) of successive incorrect unique word detects.
2. T-Channel inhibit unless super-frame locked to the P-Channel (frame lock and frame number decode). A P-Channel super-frame is 8 seconds.
3. C-Channel return inhibit if the forward C-Channel Bit-Error-Rate (BER) is greater than $10^{-3}$ for more than 40 seconds.

The time to inhibit transmission upon receipt (at the antenna of the mobile) of a Selective Release command is 4 seconds which exceeds the MT preemption time by more than 1 second.

Mobile Terminal Preemption Due To Receipt Of A Shut-Off Command: The modified Mobile Terminal worst case preemption time using a shut-off command is 8.64 seconds (one frame period) from the time the entire command was received at the MT antenna. In addition to this preemption time being longer than that with shutting off the outbound channel, there are some other disadvantages of using this approach. The disadvantages of this method are:

1. The overall system preemption time incurs the additional 8.64 second delay associated with receiving any command by the MT (interleaving spreads all messages received by the MT over an 8.64 second frame period).
2. The overall system preemption time incurs the additional delay of the LES having to synchronize the command to the outbound channel frames (this causes up to 8.64 seconds of delay on commands).

3. The outbound channel bandwidth is not immediately available as preempted bandwidth because its capacity is required to send the shutdown command. This adds as much as 17.28 seconds to the preemption time of the outbound channel.

While the capability of always monitoring the outbound signaling channel is not recommended to be used for actual preemption, it is used to receive a preemption warning command, described below. This preemption warning command is sent out repeatedly starting a few minutes in advance of an possible expected preemption event. The preemption warning command sets the maximum message size to, for example, 113 bytes for all from-mobile satellite messages. Once the preemption (or the possibility of preemption) is over, another command is sent that sets the maximum message size back to, for example, 1,600 bytes. Of course, various different message sizes for the long and short messages may also be used.

The use of a "preemption warning" command and a "preemption over" command minimizes the impact of the proposed changes on the network performance during normal operation by forcing the use of the "multiple short message" protocol layer for long messages only when really needed. The use of this additional protocol layer must be minimized because it has a negative impact on the system bandwidth efficiency (fewer MTs per channel).

Detailed Transceiver Process Requirements

Transmit only Short Messages Via Satellite

The transceiver provides a configurable, maximum-message-length-limit parameter for from-mobile messages to be sent via satellite (the present software has this parameter in the Router function). This parameter is settable from, for example, 7,932 bytes to 120 bytes with a default value of 7,932 bytes. (Note that for preemption this parameter will be set to, for example, 120 bytes which corresponds to a single packet transmission.) As described above, however, other message sizes may also be used. This parameter represents the total number of bytes to be transferred on the satellite message channel in a single transaction including the address field additional information (this is, for example, 7 bytes for a single X.25 destination).

Note that this size parameter is in addition to an overall message size parameter (message processor function) used to restrict message size for application reasons (such as a 1,600 bytes). These requirements also apply to poll response messages. From-mobile messages to be sent via satellite that exceed the limit are handled as follows:

The message is split into multiple message segments such that each message segment plus its associated protocol overhead does not exceed the maximum size parameter. These multiple message segments are sent using the protocol defined in section. If the message is split into multiple message segments, message transfer status information (Success, Fail, etc.) is not generally provided to the source of the message until the entire message is substantially or completely transferred (or failed).

The message is failed back to the source of the message using the protocol. The selection of how to handle the long via-satellite messages is controlled by a configurable parameter. This parameter has two possible states:

Split long messages into multiple message segments.

Fail long messages back to the message source (default).

If data compression is available in the transceiver, it is performed prior to the check for excess message length. The use of data compression is highly recommended since it will minimize the number of messages that exceed the maximum length limits.

Transfer Long Messages an Multiple Message Segments

Figure 23:
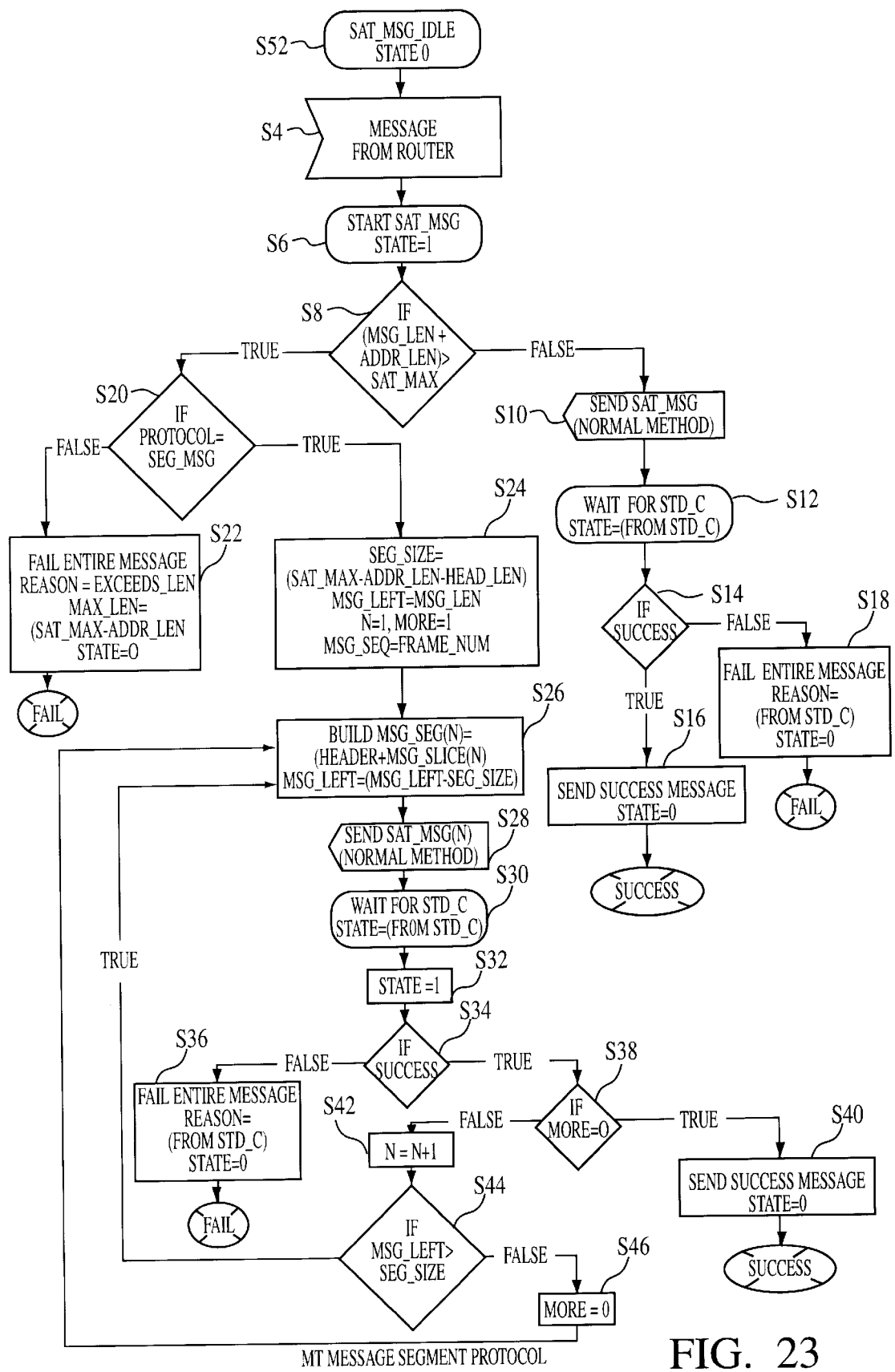
FIG. 23 is an illustration of the process to be followed by, for example, the transceiver to transfer long messages as multiple message segments.

The protocol to transfer long messages from the MT as multiple message segments is defined in this section. The process to be followed by the transceiver to transfer long messages as multiple message segments is shown in FIG. 23. Note that the variable names defined in FIG. 23 are for reference only, and do not imply an implementation of the protocol. The variables shown in FIG. 23 are defined as:

Msg_Len The original length of the message as received from the source.

Addr_Len The length of the address field sent in the first packet of satellite message channel. This length is 7 bytes for X.25 addressing.

Max_Len The maximum length message that will be accepted when the protocol for excess length messages is fail the message to the source. Max_Len is Sat_Max minus Addr_Len.

Sat_Max The maximum length of a satellite message transfer. For preemption this will be set to, for example, 120 bytes.

Seg_Msg A flag that when "true" indicates messages longer than Sat_Max are to be sent as multiple message segments.

Seg_Size The number of message bytes that can be sent in a single message segment. This is Sat_Max minus Addr_Len minus Head_Len.

Head_Len The length of the header field to be included at the front of each message segment. This length is 5 bytes. The header is defined in FIG. 24 and FIG. 25.

Header The header field to be included at the front of each message segment. The header is defined in FIG. 24 and FIG. 25.

Msg_Left The length of the original message remaining to be sent as segments.

N The current message segment number. N starts at 1 is incremented for each subsequent message segment.

More A 1 bit flag in the message header that when set to "1" indicates there are more segments to follow.

Msg_Seq A 16 bit number sent in the header that uniquely identifies a message sent as multiple message segments. This number has a range of 0 to 9,999 decimal.

Frame_Num A 16 bit number that indicate the current frame just received on the satellite channel. This number has a range of 0 to 9,999 decimal. This number changes every 8.64 seconds and rolls over to 0 once per day at midnight UTC.

Msg_Seg The current message segment to be sent. Msg_Seg consists of the header and the portion of the message to be sent in the current segment.

Msg_Slice The portion of the message to be sent in the current segment. All Msg_Slice's except the last are Seg_Size in length.

Sat_Msg The message (or message segment) transferred to, for example, the INMARSAT-C protocol process.

State The process state, such as the INMARSAT-C process state.

In FIG. 23, the MT transmits messages from its application to the central controller or LES. To take advantage of the full duplex capabilities of the MT during a priority situation, the present invention limits the MT to short transmissions, such as 120 characters at a time.

Other message sizes may also be used that accomplish similar results of transmitting short messages that allow the MT to transmit while being able to receive a priority or shut down message. For example, if 1600 characters are to be sent, the MT sends the characters 120 at a time in packets that also identify position.

Messages that are received by the MT from, for example, via the LES, do not go through any of this process. One of the reasons is that the MT does not have to worry about preemption because all messages comes from a land earth station. The transceiver, which is the part that actually interfaces with the satellite, gets messages from the mobile user. The transceiver looks at that message and counts the characters and decides whether, first of all if the message already qualifies as a short message. A message received from the MT is then optionally broken into segments making it into little segments, as described below. The super DNID is used to activate the MT to tell it when to send short messages, as a warning signal of a potential shut down.

At Step S2, the process is idle and awaiting receipt of a message for transmission from the MT. A message is composed, using, for example, the MT keyboard and the send key or other mechanism is activated to initiate message transmission. The message is received from the standard router in Step S4. The router is used because the MT optionally has other ways to send messages, such as non-satellite messages. At Step S6, the states of the process are initiated for internal software housekeeping process. Thus, satellite message state is set to 1 in Step S6.

At Step S8, the mobile terminal process checks to see if the message is small enough to be transmitted normally. In Step S8, it is determined whether the message is less than a predetermined number of characters, such as 120 characters, and if so, the message is transmitted in the normal manner starting with Step S10. In this situation, the message need not be segmented.

In Step S12, the MT (e.g., the transceiver), waits for an acknowledgement signal that indicates whether the message was transmitted successfully or not, as determined by Step S14. If the message was transmitted successfully, then the user is sent a message that indicates that the message was sent successfully in Step S16. If the message was not transmitted successfully, then the user is optionally sent a message that indicates that the message was not sent successfully in Step S18, or perhaps an automatic re-send operation is alternatively or also provided via the router and transceiver.

If it is determined in Step S8 that the message is too long or greater than a predetermined length, then the process continues at Step S20 where it is determined whether the message segment protocol is to be used in any event. This determination may be user selectable, or initiated by the LES as well. When the message segment protocol is not to be used, then message is failed in Step S22, and the user is optionally notified that the message cannot be sent. Thus, long messages cannot be transmitted, and they cannot be segmented either. Only short messages may be transmitted in this situation.

For example, if the problem prevented the transmission of short messages for only a short term, it may not be worth having all MTs sending segmented messages, because I have determined that sending short messages consumes more total satellite capacity then sending a few long messages.

When segmenting messages is allowed in Step S20, then the segment size is defined in Step S24 responsive to predetermined criteria, such as how the terminal was set up, and the like. The message segments are built in Step S26, and include a header plus a message. Then message left variable indicates how much length is left of the message.

Then the satellite message is sent the normal way in Step S28, as a short message. The process waits until the satellite protocol comes back and acknowledges transmission of the message in Step S30. In Step S32, state is set to one indicates that there is a message segment to be transmitted. If the state is zero, that indicates the complete message has been transmitted, as described below. If the state is equal to one, more message segments are to be sent.

If the message segment transmission is not successful in Step S34, then the message segment is failed in Step S36, and the user or system can resend the message segment, and start all over. Now, if the message segment transmission was successful in Step S34, then the process determines whether the more flag is equal to 0, the more flag being initially set to one. If more equals zero, then the message segment transmission are complete and a successful message is sent in Step S40.

If more equals one, then the message segment transmission is not complete. In Step S42, the variable N is incremented in accordance with the specific message segment to let the LES know how to, or the order to, combine the message segments. In Step S44 it is determined whether there is any message left to be transmitted, and if not, the more variable is set to zero in Step S46. If there are more message segments to be transmitted, then the process returns to Step S26 for the additional transmissions.

The header shown in FIG. 24 is placed, for example, at the beginning of each message segment sent from the transceiver. The header fields shown in FIG. 24 are further defined in FIG. 25.

Distress Priority Messages and Distress Alerts

A new message input to the transceiver with "Distress Priority" causes any message transfer currently in process to be aborted unless the transfer in process is also "Distress Priority". The message aborted is failed back to its original source following the protocol already implemented for failures due to distress (or Land Mobile) Alerts.

A Distress Alert (or Land Mobile Alert) input to the transceiver causes any message transfer currently in process to be aborted unless the transfer in process is also "Distress Priority". The message aborted is failed back to its original source following the protocol already implemented for failures due to distress (or Land Mobile) Alerts.

Long Message Failure Protocol

From-mobile messages that exceed a maximum message size parameter are failed back to the source of the message. The failure back to the source uses the form:

<DCS>W; Failed nnnn-ss-xxx-zzzz<ST> where:
   nnnn—is the transmit reference number
   ss—is the process state that failed
   xxx—is the code for a "Message Length Error", e.g., "027" allocated to this error
   zzzz—is the maximum length acceptable message.
   <ST>—is Sat_Max minus Addr_Len Set Message Size Command A single, dedicated DTE interface command is defined and implemented to control the from-mobile message size limit parameters. The destination subaddress for this command is, for example, 2Eh. Other storage addresses may also be used. This command is capable of changing, for example, only one set (satellite or terrestrial) of the parameters at a time, however, other commands that are capable of changing the above parameters substantially simultaneously are also within the scope of the method and/or apparatus described herein.

A field in the command selects which of the parameters is to be changed. This command is capable of setting the following parameters:

1. The satellite maximum message size limit.
2. Terrestrial communication path(s) maximum message size limit. (future growth)
3. Select the protocol for handling messages that are over the size limit (no change, segment or fail).

DSP Control After Single Packet Message Channel

The control of the DSP (Digital Signal Processor) is modified, for example, at the end of the transmit function to minimize the time that the receive function is unavailable. These changes, when combined with the transmit message size limit, allow the transceiver to operate in a software full-duplex mode. The changes defined in this section are not dependent upon configuration parameter settings relative to maximum message length but automatically detect those transmissions that are short enough to take advantage of the DSP's ability to continuously receive through blockage conditions. The transmissions that fall into this category are:

1. All successful signaling channel transmissions.
2. Successful, one-packet message channel transmissions, but only if the transmit rate is 1200 symbols per second (sps).
3. All transmissions that are prematurely terminated due to a failure occurring less than 2.0 seconds after the start of transmission.

DSP Control After Successful Transmission

The control command issued to the DSP following a successful, one-packet, 1200 sps, message channel transmission is substantially or exactly the same as the command used following a successful signaling channel transmission. This command is, for example, "DSP_RECEIVE_CMD". Following all other successful message channel transmissions, the "CHANNEL_RETUNE_CMD" is issued to the DSP.

DSP Control After Failed Transmission

The control command issued to the DSP following failed transmissions is, for example, "DSP_RECEIVE_CMD" if the failure occurs less than, for example, 2.0 seconds after the "DSP_TRANSMIT_CMD" has been issued. If the failure occurs, for example, more than 2.0 seconds after the "DSP_TRANSMIT_CMD" has been issued, the "CHANNEL_RETUNE_CMD" is issued to the DSP.

Standard Jaguar Platform Unique Changes

A portion of the "non-receive" time associated with each transmission is allocated to allowing the AGC (Automatic Gain Control) to achieve a steady state value after the transmitter has been shut off. This time is currently defined to be, for example, 400 milliseconds. This length of time is required to allow the receiver hardware to provide a constant IF (Intermediate Frequency) output to the DSP function. The value of "DSP_RX_DELAY" is set to, for example, 100 milliseconds for the Jaguar version of transceiver only.

Check Carrier Signal Quality Just Before Transmit Enable

A check of the received carrier signal quality just prior to initiating a transmission is added to the transmit control function. This check is used to inhibit the start of a transmission if the receive carrier is not present within a one second time window just prior to the transmission. This check is in addition to the Bulletin Board (Tx_Enable) and Signaling Channel slot validity checking already specified by the INMARSAT-C protocol.

DSP Signal Quality Reporting Requirements

A new command from the Control Processor (CP) to the DSP is defined and implemented to request an immediate output of carrier signal quality. Upon receipt of a signal quality request command, the DSP outputs both bytes of the Signal Quality Information message (e.g., Identifier 0001). The Signal Quality Information message is output from the DSP after the receipt of the request command. (The total time allocation for the CP request, DSP response, CP processing, and transmit inhibit is approximately 20 milliseconds.)

The Signal Quality value represents the average quality of the demodulated receive carrier for not more than the previous one second time window. The periodic output of the Signal Quality Information message at the end of each set of frame data remains unchanged.

CP Signal Quality Processing Requirements

As part of the initiate transmit sequence, the CP issues a request to the DSP for signal quality just prior to issuing the "DSP_TRANSMIT_CMD". The Signal Quality value received in response to that request is compared to a configurable threshold that is settable over a minimum range of, for example, 500 to 2,000 in increments of 10 or less. The default value of this configurable threshold is, for example, 950.

If the Signal Quality is less than the configurable threshold, the transmission is aborted before it starts (prior to the command "HDW_TRANSMIT_AMPLIFIERS, ON"). Subsequent retry of the aborted transmission is in accordance with the higher level protocols already part of the baseline design. If the transmission is aborted, the requirements for control of the DSP following a failed transmission apply.

Scan Function Performance Improvement (Option)

The changes specified above can be used to significantly reduce the time required for the TDM scanning function to operate. Presently when a TDM channel is acquired, it is received for three frames (25.92 seconds) so that its signal quality can be averaged over those three frames. However the average used is for three, one-second windows of time each separated by 8.64 seconds as described above. If the scanning function were modified to use the Signal Quality request as defined above, the time between samples could be reduced so that three (or more) samples could be obtained in a single frame. This reduces the scanning time by 17.28 seconds per channel acquired. MTs operating in the midwest region often acquire three channels during scanning, therefore the total time saving could be more than 50 seconds.

Check Out-Of-Service Flag to Transmit

The MT includes the capability of being set to an out-of-service state upon receipt of a predefined out-of-service poll command type. When set to out-of-service, the MT is not capable of transmitting on the satellite network. This out-of-service poll command type is not acknowledged or responded to since any response would involve using the transmitter. The MT has the capability of being set to an in-service state upon receipt of a predefined in-service poll command type. When set to in-service, the MT is capable of performing all functions normally including acknowledging or responding to the poll as required. These predefined poll commands are to be utilized by operations staff.

In addition, the receipt of an out-of-service poll causes any satellite transaction in process to be terminated. It is not required that an actual transmission in process be terminated upon receipt of the poll.

In-Service Poll

The In-Service Poll is a standard command type 7Fh. This poll is sent to standard MT subaddress 42$h$. This poll is acknowledged by the MT if an Ack is requested, unless it is received by the super group DNID defined below. This poll is accepted as an individual, group, or area poll. This requirement is part of the baseline capability of the MT.

Any "abort" flags previously set are cleared on the receipt of an in-service poll.

Out-of-Service Poll

The Out-of-Service Poll is a standard command type 7Eh. This poll is sent to standard MT subaddress 42h. This poll is not acknowledged by the MT if an Ack is requested. This poll is not responded to with a data report or a message even if one is requested. This poll is accepted as an individual, group, or area poll. This requirement is part of the baseline capability of the MT.

Upon receipt of the Out-Of-Service poll, an "abort" command is automatically sent to stop any satellite protocol transaction in process at that time. The "abort" command used is the standard <CSI>0Z sent to subaddress 2Fh. Subsequent transactions via satellite will never start because the out-of-service flag is checked before any satellite transaction can start. It is not required that an actual transmission in process be terminated upon receipt of the poll.

Abort Function Enhancements

The satellite abort function is enhanced so that it is checked just prior to the actual start of transmission. The present functionality has a maximum time window of about 9 seconds between the last check of the abort flag and the beginning of transmit. (This will require the checking of the abort flag from within "hdw_transmit_via_satellite".) Any message that is terminated by the "abort" flag being set clears the "abort" flag so that subsequent messages do not fail.

Check Message Size Limit to Start Transmit

New Message Transfers

All messages are checked to verify that they meet the maximum message size requirement prior to being entered in the via satellite queue.

Message Transfers in Process

Upon receipt of a DTE command or poll setting a message size limit, a check is made to determine if there is a from-mobile satellite message in process, and if there is, to verify that it meets the commanded size requirement. If the message in process exceeds the size requirement, an "abort" command is automatically sent to stop any satellite protocol transaction in process at that time. The "abort" command used is the standard <CSI>0Z sent to standard subaddress 2Fh.

Receive & Process a New Poll Command

The MT has the capability of changing its maximum message size parameters upon receipt of a predefined Message-Size poll command type. The parameters to be changed with this poll are as defined above. The format of the data field of the poll to control the parameters is as shown in FIG. 26. The poll contains an optional text field in addition to the required data fields. The contents of this optional text field is automatically sent to the default DTE interface port (subaddress 00h) as a normal received message. This optional message may be used to inform the operator of impending preemption events. This poll command is to be utilized by, for example, operations staff.

The Message-Size Poll is a standard command type 7Dh. This poll is sent to MT subaddress 2Eh. This poll is acknowledged and/or responded to by the MT if an Ack or Response is requested unless it is received by the super group DNID defined below. This poll is accepted as an individual, group, or area poll.

"SUPER GROUP" DNID

The MT implements the capability of having a special DNID loaded that has the following characteristics.

The DNID is "receive only". No data report or message transmissions associated with this DNID destination are allowed. Polls addressed to this DNID are not required to match an LES ID in order to be received. Polls addressed to this DNID are not required to match a subaddress in order to be received. There are no Member Number associated with this DNID. Polls addressed to this DNID are not acknowledged by the MT if the Ack Bit is set.

The MT does not generally send a response to a poll addressed to this DNID if a response is requested. The data contents of polls addressed to this DNID are forwarded to the subaddress specified in the poll. Polls addressed to this DNID may be Individual, Group or Area Polls. Any Poll Command Type may be sent to this DNID. One Super DNID is made a default operating parameter for all MTs to be operated on the Rockwell MSAT network. The actual DNID number to be used as default is, for example, 9990 decimal. The DNID 9991 is used for Beta testing.

The DNID 9992 is used for development testing. The default DNID is not present for the INMARSAT version of the MT.

It is possible to load additional "Super Group" DNIDs into the MT. "Super Group" DNIDs are loaded (or deleted) using the <DCS>\RCKWL\@ . . . command. A unique value of the flag field is used to identify these DNIDS. The INMARSAT Download DNID poll command is not capable of downloading a "Super Group" DNID. The INMARSAT Delete DNID poll command is not capable of deleting a "Super Group" DNID. "Super Group" DNIDs are common across all LESs.

The concept of "Super Groups" is applicable to satellite capable MTs. It is generally the responsibility of the sender to this DNID to ensure that the embedded contents of the poll do not cause a large group of MTs to begin transmission within a short period of time. (Application layer acknowledgments or responses are not generally allowed.)

DSP Software Download Capability to Jaguar Platform

The Jaguar transceiver is capable of downloading DSP software from the Control Processor (CP) flash memory for purposes of providing new DSP code to execute for the Jaguar transceivers. Any new DSP code release for the Jaguar requires a CP code release since the executable DSP code is stored in the same device(s) as the CP executable code. The DSP code is downloaded from the CP at power-up, stored in DSP RAM, and executed from there. Error detection and recovery mechanisms are put in place in the CP to reload the DSP if it ever resets and loses its executable code.

A similar functionality already exists for the other standard transceiver platforms through the use of dedicated flash memory for the DSP executable code. The DSP software version reported in the response is the version embedded in the CP flash memory that is downloaded to the DSP by the CP, and not the version in the DSP ROM.

Changes To Land Earth Station (LES)

This section describes in detail the proposed changes to the LES, such as an LES administered by Rockwell, to satisfy the FCC requirements for operation in a "realtimes" preemptive access environment. The changes refer to the MES minimum requirements shown in the Letter to the FCC Common Carrier Bureau Chief (see FIG. 19). Only requirements 7 and 9 are addressed here since all other requirements are already met by the LES.

Requirement 7: LES capable of transmitting channel-shut-off commands to MESs on a signaling or communications channels.

The LES is capable of sending an "out-of-service" command to all MTs under its control if the MTs are configured as a single group and the command is sent to its terrestrial interface as a Group Poll. In order to efficiently utilize this capability, the base station software must be modified to send pre-defined group poll commands to all MTs through the LES.

Modify Base Station (BS) To Send "Out-Of-Service". Group Polls To The LES: All message traffic to and from the LES(s) is routed through one or more Base Stations (BS). The BS is a logical control point to send "out-of-service" (or "in-service") polls since it has dedicated communication lines to one or more or all LES(s). The required change causes the BS, when commanded to send pre-defined poll commands to the DNID (group ID) associated with all MTs. The commands can be sent to one or more of the LESs and can be directed to one or more of the spot beams on the MSAT system.

The default destination for the poll commands (i.e., general control commands) is all LESs and all spot beams. This same capability could be utilized to send "preemption warning" and "preemption over" commands by using different pre-defined poll commands, if that option is pursued. When polling is initiated for preemption, it will continue periodically until commanded off to increase the probability of all MTs receiving the command, including those that power-up after the initial command is sent. The interface to the RBS to initiate the sending of predefined poll commands is a standard computer interface.

Requirement 9: LES capable of automatically turning off one or more of its associated channels.

The LES has the capability to turn off its channels with manual operator intervention. In order to automatically shut off one or more of the outbound LES channels, additional control points must be added to each RF channel which is under control of a preemption command.

Add RF Switches To Each LES Channel Unit Output: The fastest way to preempt a Pro2000 MT is to shut off the outbound signaling channel. Internally the LES synchronizes interfaces to its channel units to 8.64 second frames. This limits the ability to shut off the channels very rapidly. A faster and simpler solution is to insert standard RF switches in each of the IF (approximately 70 MHz) outputs of the channel units before it is transferred to the microwave upconverter for transmission to the satellite. In this case, the time to preempt the outbound channel is defined by the switch delay (less than 50 milliseconds for most RF relays) plus the propagation delay time from the LES to the satellite and back to the MTs (approximately 46,500 miles at the speed of light or 250 milliseconds).

These switches are controllable from a stand-alone computer dedicated to preemption control. This computer can shut off any or all of the switches on command. The interface to the preemption computer to command the shut-off of channels is a standard computer interface.

Data Network Overall Preemption Performance: This section describes the combined preemption performance with the above proposed changes incorporated in the MT, BS, and LES. Since the entire Data Service is Land Mobile, it is secondary to aeronautical or maritime distress or safety-related communications in their respective frequency bands and therefore subject to priority preemption. With the above proposed changes implemented the in the MT and in the LES, the system is capable of being preempted by the LES shutting down the outbound channel(s) or sending a shut-off command to all MTs.

Network Preemption With The LES Shutting Down Outbound Channel(s): The modified network worst case preemption time is estimated at, for example, 3.293 seconds (2.993 for the MT, 0.25 for RF propagation delay and 0.050 for RF switch delay) on the inbound message channels and 1.583 seconds (1.283 for the MT, 0.25 for RF propagation delay and 0.050 for RF switch delay) on the inbound signaling channels. These times are measured from the time the command to preempt is received and validated at the LES preemption control computer until the MT is no longer radiating any transmit RF signal from its antenna. This is generally the easiest, quickest and safest way to preempt the network. The advantages of this method are:

1. All MTs detect the loss of the outbound signaling channel simultaneously.
2. MTs that may have been blocked or powered off at the time of preemption are automatically preempted without any possibility of missing a command.
3. The outbound channel bandwidth is preempted simultaneously with all of the inbound channels (commanded preemption requires outbound channel capacity to send the commands).
4. The preemption does not incur the delay of having to synchronize to the outbound channel frames (this causes up to 8.64 seconds of delay on commands).
5. The preemption does not incur the delay associated with receiving any command by the MT (because of interleaving all messages received by the MT are spread over an 8.64 second frame period).

Network Preemption Due To Receipt Of A Shut-Off Command: The network worst case preemption time if a shut-off command is used is about, for example, 28 seconds (2 seconds to get from the RBS to the LES, up to one 8.64 second frame to wait to insert the command, one 8.64 second frame to send the command, and 8.64 seconds for the MT to process the command) from the time the command was received and validated at the RBS. In addition to this preemption time being longer than that with shutting off the outbound channel, there are some other disadvantages of using this approach. The disadvantages of this method are:

1. There is possibility that MTs that may have been blocked at all of the times that the shut-off command should have been received and then attempt to transmit before the outbound signaling channel is shut down.
2. The outbound channel bandwidth is not immediately available as preempted bandwidth because its capacity is required to send the shutdown command.

Preemption Process

Preemption of the Land Mobile Satellite Data Service for AMSS(R) involves interaction between two or more separate networks. The AMSS(R) network detects the need for preempted bandwidth and send appropriate commands to the Network (as well as other networks utilizing this L-Band spectrum). The network must then preempt its service for as long as the AMSS(R) network requires its preempted bandwidth. When the AMSS(R) network no longer requires preempted bandwidth, it must send appropriate commands to the network to release the bandwidth.

Figure 27:
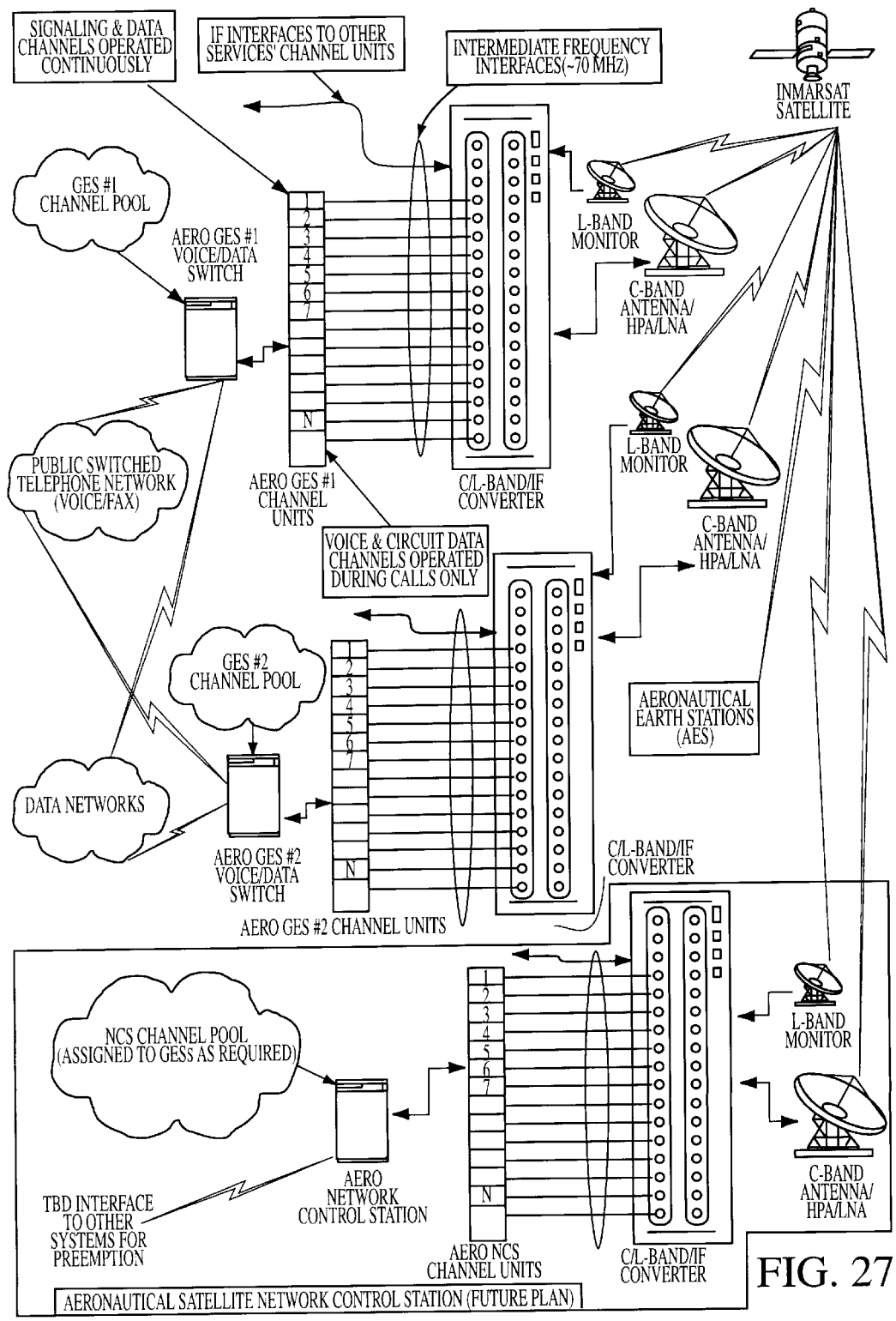
FIG. 27 is an illustration of a simplified block diagram of a mobile satellite system with two ground earth stations, and a planned Network Control Station.

A simplified block diagram of the INMARSAT Aeronautical system (with only two Ground Earth Stations) and the planned Network Control Station is shown in FIG. 27.

Preemption From The Aeronautical System View: Each of the LES or Ground Earth Stations (GESs) in this system operates substantially independently. Each GES has a set of channel units which defines absolutely the maximum number of channels it can operate with. It is always possible to add more channel units to a GES but this must be planned well in advance of any possible need due to the lead-time, cost and configuration changes required to utilize them.

Associated with each GES is a group of frequency channels allocated on a permanent basis for its use. Some of these channels are operated on a continuous basis for signaling and packet data transfer.

Signaling and packet data channels are added to the GES from its channel pool, but the need for these types of channels changes very slowly because it is dependent on the number of aircraft logged into the GES, and not on outside influenced conditions. The other channels are used only as needed to support voice, FAX or circuit switched data calls. The need for these channels is dynamic as calls are initiated and completed. All unused channels reside in a channel pool reserved specifically for the GES when not in use.

Within the present INMARSAT aeronautical system there is no mechanism for utilization of unused channels at another GES when a GES has no more additional channels. There is also no mechanism for routing a call through another GES (which has available channels) when a GES has no more channels (either hardware channel units or allocated channels). Within the GES, distress or safety priority calls preempt routine priority traffic as required.

The Network Control Station (NCS) to the aeronautical network brings with it significant capability to support the AMSS(R) system. The most significant improvement is the ability of the aeronautical system to more efficiently utilize the bandwidth it is allocated (without preemption) for safety services. In addition, the NCS includes an additional channel pool that can be dynamically assigned to GESs as required. More importantly the NCS is a single control point that could detect an impending and immediate need for preempted bandwidth.

This detection of need for preempted bandwidth could be a simple calculation of the percentage (or number) of the channels available at any point in time for safety or distress services. When the percentage (or number) drops below a predefined level, the NCS issues a warning to other services that preemption is imminent. If the percentage (or number) drops below a critical threshold, preemption commands are issued to other services in a predefined manner to make bandwidth available to safety services as required.

The actual preemption of other services could be done in several steps. The first step begins when the NCS detects that the need for preemption is imminent. At this point the NCS establishes a connection to the preemption controller of the service to be preempted. This connection may be, for example, a telephone modem, X.25, TCP/IP, dedicated line or some other type of connection. The connection would include some level of security verification on the part of the service to be preempted to prevented intentional or accidental sabotage of services.

Once the connection is made, the NCS would indicate the amount of bandwidth to be preempted. The NCS and the service to be preempted maintains the connection on a continuous basis until the preemption event is completed. The second step of preemption begins when the NCS detects that the need for preemption is immediate. The NCS issues a shutdown command over the established connection for the bandwidth previously identified. At any time, the NCS could issue commands identifying additional bandwidth that may be needed and issue commands to shut down on that bandwidth.

As the need for preempted bandwidth for the aeronautical system declines or disappears, the NCS issues release bandwidth commands to the preempted service over the established connection. The release of bandwidth back to the original service could be incremental or include all preempted bandwidth in one command. Upon the release of all preempted bandwidth, the connection between the aeronautical system and the preempted system may be cleared. Also note that preemption of other services in this view includes all other types of services in the L-band spectrum and is not limited to the Rockwell data service only.

Distress and safety priority interfaces and the detection capabilities required to use preempted bandwidth are part of the aeronautical system. Other issues include that the NCS will have the capability to direct traffic from fully loaded GESs to GESs with available capacity, that the NCS will know the priority of all calls at all GESs under its control, that the NCS will be able to preempt routine calls at any GES so that priority calls may either be routed through that GES or its bandwidth may be allocated to another GES in need of bandwidth.

It is very important that preemption of routine priority calls within the aeronautical system for safety services be an integral part of any system definition. Preemption of calls within the same service has the advantage of freeing up the GES channel unit resource as well as the frequency spectrum resource. As can be seen from FIG. 27, the GES channel unit resource may very well be the limiting resource for aeronautical safety services.

Other issues to be addressed include the order in which non-AMSS(R) services are to be preempted. Data services optionally operate using more than one Land Earth Station (LES), each of which could be preempted independently releasing bandwidth incrementally. Voice service may optionally be operated in the same frequency band. This voice service operates with channel pools similar to the aeronautical system. This service could be incrementally preempted from its channel pool without the need for a complete shutdown of service as long as the need for preempted bandwidth was small.

Figure 28:
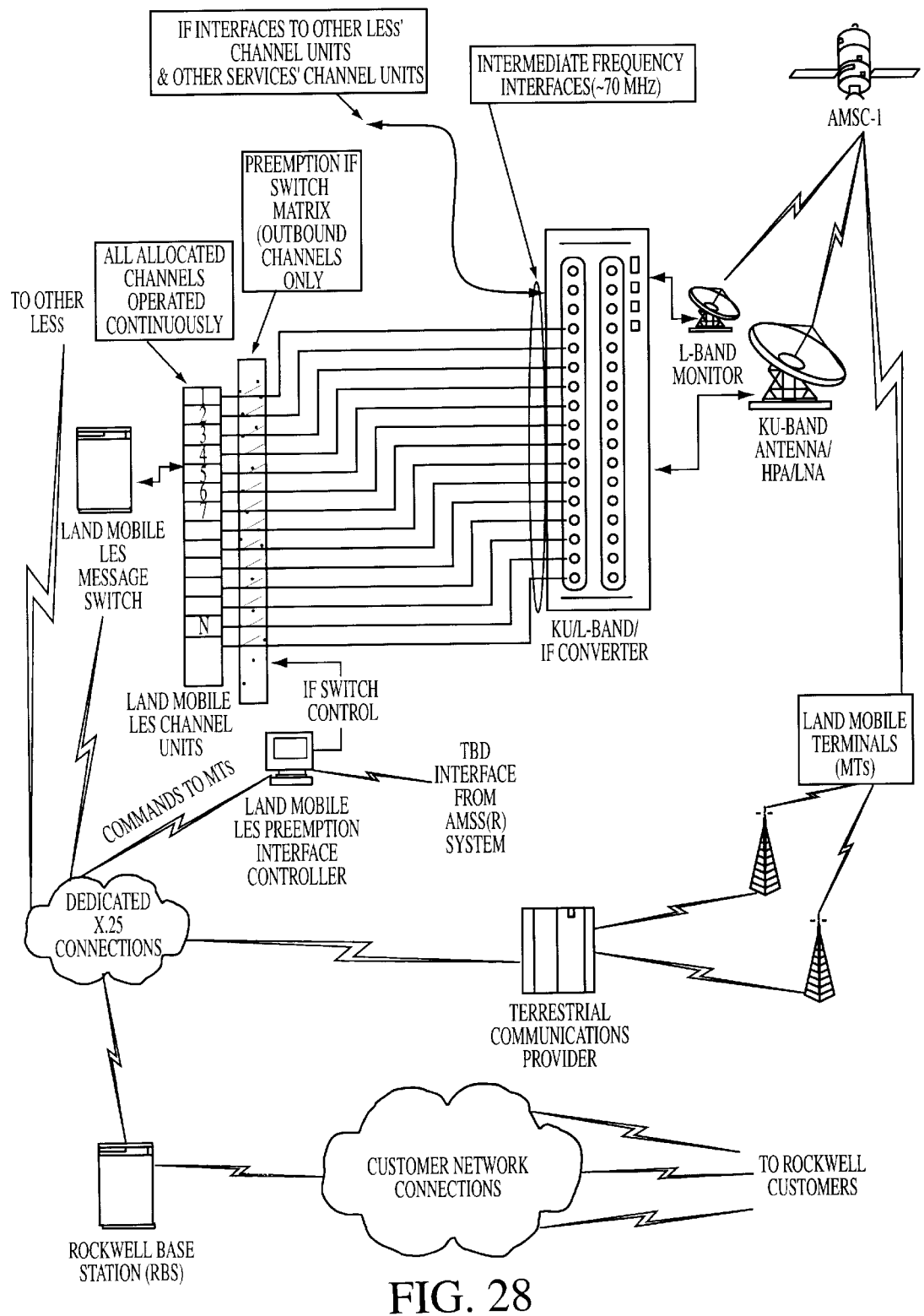
FIG. 28 is a block diagram of the data system.

Preemption From The System View: Once the AMSS(R) system detects the need for imminent or immediate preemption, the data service is capable of supporting it with real-time priority preemption. FIG. 28 is a block diagram of the Data System. FIG. 28 shows one satellite Land Earth Station (LES) for simplicity. Additional LESs are added as capacity is needed. FIG. 28 shows only a portion of the terrestrial communication network (ARDIS) that is used as part of a multi-mode network.

Each of the LESs in the system has a set of channel units which define the number of channels that it operates with. Associated with each channel unit is an allocated frequency channel that is directly associated with the channel unit. Unlike the aeronautical system, the Land Mobile system does not have a channel pool. Each allocated frequency is utilized on a full time basis for signaling (all outbound channels and some inbound channels) or for packet data transfer (all outbound and inbound channels). A fully loaded LES is projected to utilize, for example, approximately 9—5 KHz channels of outbound bandwidth and 45—5 KHz channels of inbound bandwidth and support about 20,000 multi-mode MTs. Preemption of the Land Mobile Data Service can be done in increments, as small as one spot beam on one LES (one outbound 5 KHz channel with its associated five—5 KHz inbound channels on the least populated spot beam) and as large as all LESs simultaneously.

The preemption of the service is done in the same sequence of steps as defined above for the aeronautical system. In the first step, the AMSS(R) system connects to the Preemption Interface Controller and its identification and password is validated. Following the validated connection, the AMSS(R) system indicates the bandwidth that it may require for preemption. Once the preemption controller determines the bandwidth that may be needed, it begins sending group poll commands to all MTs utilizing that bandwidth.

The group poll commands cause the MTs to set their maximum satellite message size to, for example, 113 bytes which is equivalent to a maximum transmit time of 1.973 seconds. This step is completed, for example, 30 seconds or more before shutdown command to be effective. The second step of preemption occurs when the AMSS(R) system sends a shutdown command for the previously identified bandwidth. When the shutdown command is received, the preemption controller turns off the RF switches associated with the desired bandwidth. All preempted bandwidth is available within, for example, 3.293 seconds from the receipt of the shutdown command. At any time, the AMSS(R) system could issue commands identifying additional bandwidth to be preempted.

The preemption controller follows the same steps as above in this case. Once the AMSS(R) system no longer needs preempted bandwidth, it will issue commands to the preemption controller indicating the bandwidth it is releasing. In response to this command, the preemption controller turns on the RF switches associated with the identified bandwidth. It does not begin sending group poll commands to reset the message size until the AMSS(R) system disconnects and the possibility of imminent preemption is past.

Transfer Long Messages as Multiple Message Segments
Message Transfer Protocol

Figure 29:
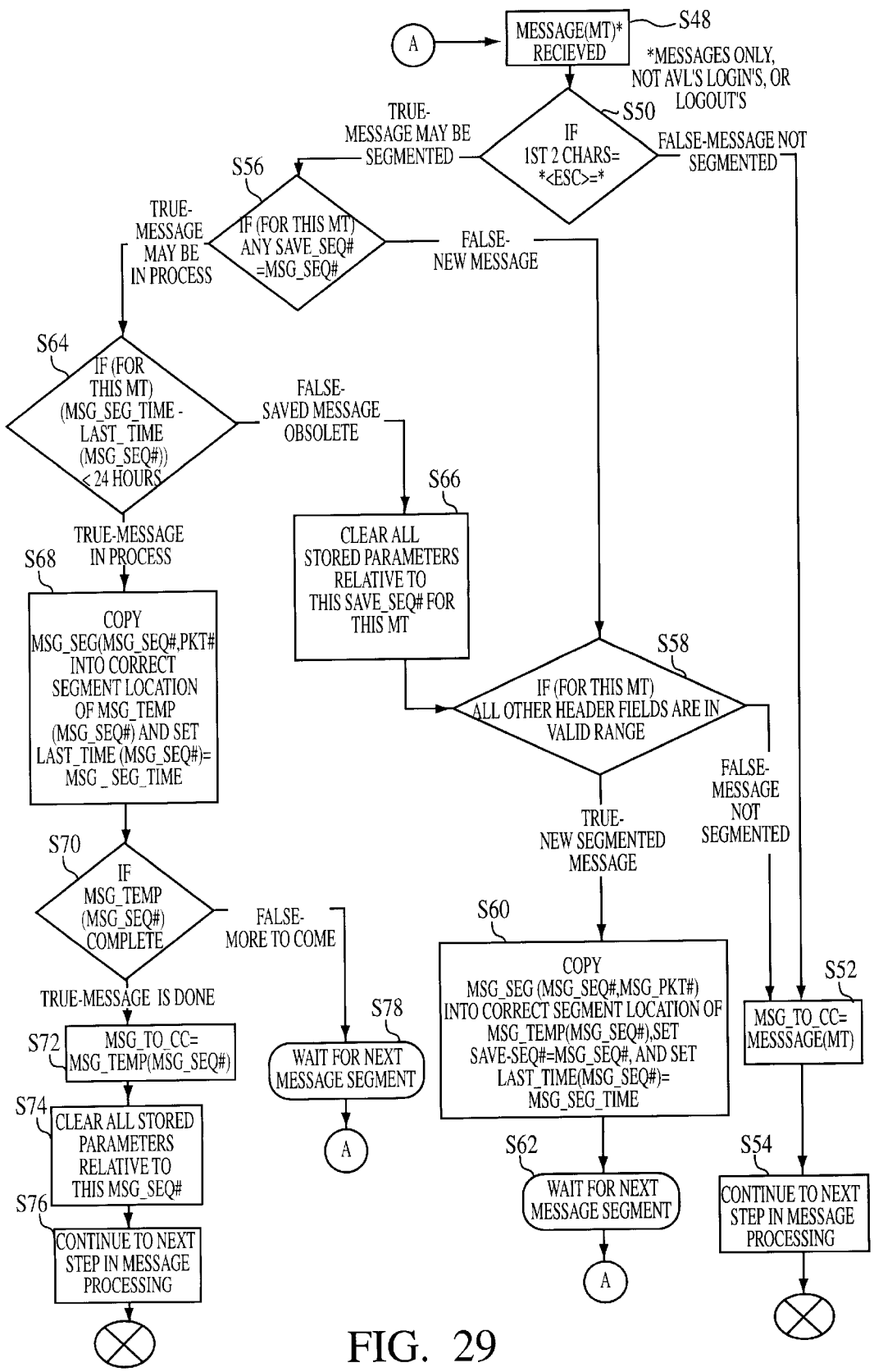
FIG. 29 is an illustration of the process to be followed by, for example, the land earth station and/or the base station to receive long messages as multiple message segments.

The protocol to transfer long messages to the BS as multiple message segments is defined below. The protocol for splitting the message into segments and sending the message segments is defined above. Note that the variables defined FIG. 29, are for reference only and do not imply an implementation of the protocol. The header portion of each message segment is as shown in FIG. 24 and FIG. 25.

If data compression is available in the MT, it will generally be performed prior to message segmentation, although post message segmentation is also possible. The BS receives all segments of a segmented message before data decompression is attempted. All incomplete segmented messages are held by the BS for 24 hours after the latest segment was received before being discarded. There will be many incomplete segmented messages discarded by the BS due to the nature of the segmented message protocol in the MT.

Any failure to deliver any segment of the message in the MT results in a complete retry of the message or segment. When this occurs after one or more segments have been delivered, the BS will be left with an incomplete segmented message. Successful delivery of the message is declared in the MT only after each and every segment is successfully delivered to the LES. Another possible cause of incomplete messages in the BS would be a failure of the LES to deliver a received from-mobile messages for a period greater than 24 hours.

It is possible that message segments could be delivered to the BS out of order due to temporary line outages and/or multiple processes in the BS operating at different rates. The protocol defined in FIG. 29 takes this possibility into account.

The variables shown FIG. 29 are defined as:

Message(MT A message received from a particular MT. This does not include AVLS, login reports, or logout reports.

Msg_Seq# A 16 bit number sent in the header that uniquely identifies a message sent as multiple message segments from a particular MT. This number has a range of 0 to 9,999 decimal. This number rolls over to 0 once per day at approximately midnight UTC.

Save_Seq# The Msg_Seq# from a segmented message transfer currently in progress from a particular MT.

Msg_Pkt# The current message segment number from a received message segment for a particular MT. Msg_Pkt# starts at 1 is incremented by the MT for each subsequent message segment. The valid range of Msg_Pkt# is 1 to 127 decimal. With the current mode of from-mobile message addressing and the 1600 byte application layer message limit, the practical range of Msg_Pkt# is 1 to 15 decimal.

Msg_Seg_Time The time (and date) that the current message segment for a particular MT was received at the BS.

Last_Time(Msg_Seq#) The time (and date) that the last received message segment was received at the BS for a particular segmented message sequence for a particular MT.

Msg_Temp(Msg_Seq#) A copy of a reconstructed, segmented message with all of the previously received segments for a particular segmented message sequence for a particular MT. This copy has the headers removed and place-holders for the missing segment(s).

More A 1 bit flag in the message header that when set to "1" indicates there are more segments to follow for this segmented message.

Msg_To_CC The complete reconstructed message to be sent on to the next step in processing in the BS.

Msg_Seg The message portion of a segmented message. (A message segment without its header.)

Now The current time (and date).

In FIG. 29, the land earth station receives and sends these little segments through as individual messages to the base station, which is generally another computer. Alternatively, the LES and the base station may be integrated together, on one or more computers. The base station then has connections to individual customers.

As illustrated in FIG. 23, each message segmentation process is conducted for each MT, since a MT may only perform message segmentation one at a time. On the other hand, the LES and/or base station may receive multiple messages from different MTs. Therefore, FIG. 29 is a representation of the process conducted within an LES and/or base station for each message received from a different MT. This process is therefore replicated many times within that computer.

In FIG. 29, the segmented message is received in Step S48, and, for example, a timesharing/parallel process is begun. The message is received from a MT including the message header. The first check is performed in Step S50, is to check the header that is in the message. The MTs send for each segmented message a unique character, string or identification to alter the LES/BS that a segmented message is present. In this case, the MT sends the first two characters as an escape character followed by an equal sign.

If these two characters are not present, then the message is not a segmented message and the message is received in the normal manner in Step S52, and readied for the next step processing for the destination in Step S54.

If the predetermined/unique characters are received in the message header in Step S50, e.g., the escape character and the equal character, then it is determined whether this segmented message is new in Step S56. In Step S56, to determine whether the message is new, the process consults whether a previously saved message sequence number exists that matches the received message sequence number from the MT. If there is no match, then in Step S58 it is determined whether the header fields are in the valid range, and if not, then message reception is not to be performed using the message segment process according to Step S52.

If the message is determined to be segmented in Step S58, then the message segment is copied to an appropriate location in Step S60 to be reassembled later by the process described herein. The message sequence number, the message segment, the packet number, is copied and temporarily stored. The process then waits for the next message segment in Step 562, and control may be directed, for example, to Step S48.

In Step S56, when it is determined that the received message sequence number matches the stored message sequence number, it is optionally determined in Step S64 whether the stored message sequence number is older than 24 hours. If the stored message is more than 24 hours old, then it is assumed that the prior message does not belong to the new message, and the received message is considered a new message in Step S66.

If the message is less than 24 hours old, then the process of copying the segment, monitoring, and recording the time that the previous segment is received is performed in Step S68. The message is essentially being put together at this point, and there are two or more segments at this point. The new message segment is appended to the previously stored or received message segments.

If the process determines that the message temp variable is complete, which means this was the last segment packet received in Step S70, then all segments have been received. The message header indicates the number of segments and the segment number. For example, it is possible that the LES/BS receive segment 1 of 10, segment 3 of 10, segment 2 of 10, and the like.

If the process determines that the message temp variable is not complete, which means this was not the last segment packet received in Step S70, then all segments have not been received. The process then waits for additional message segments in Step S78. The entire message is preferably collected before being sent on to the customer center. Alternatively, a predetermined amount of the message may also be forwarded immediately or substantially immediately on receipt.

Figure 30:
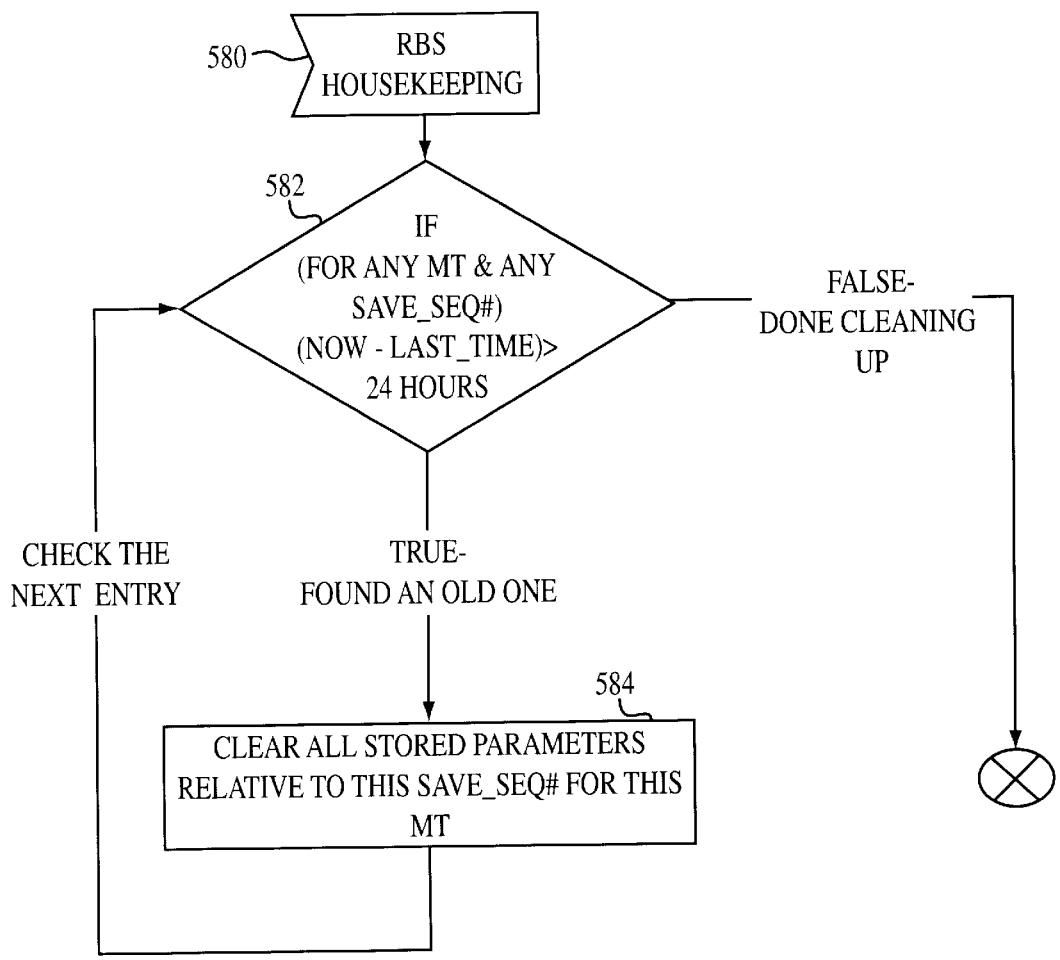
FIG. 30 is an illustration of a housekeeping process used to delete old messages and.or message segments in the land earth station and/or the base station.

FIG. 30 is an illustration of a housekeeping process used to perform checks for any segments of messages that may be laying around for more than 24 hours. The process throws away the message segments in Step S84, that are determined to be old in Step S82, e.g., older than 24 hours. This process cleans out the message segments that do not get deleted any other way.

Automatic Detection of the New Protocol

The BS automatically detects the message segment protocol by checking all from-mobile messages received for the, for example, "<ESC>=" sequence as the first two characters of a message. If this sequence is found, the protocol shown in FIG. 29 is followed to further validate and reconstruct the message from the message segment. The check for the "<ESC>=" sequence is done prior to the check for any other "<ESC>" sequences.

Since the BS and MT are capable of transferring binary data, it is possible for the "<ESC>-=" sequence to appear as the first two characters of a normal message. The additional validation checks specified in FIG. 29 make the probability of a random binary message being mistaken for a segmented message less than $3*10^{-7}$.

Transceiver Software Change Requirements Summary:

The transceiver responds to two new poll command types specifically defined for preemption. One of the poll commands is used to set the maximum satellite transmit message size to, for example, 1 INMARSAT-C packet. The other poll command is used to set the maximum transmit message size to the original value as set in EEPROM. The status of the flag used to determine the mode of the transceiver relative to satellite message size is non-volatile. The text field in each of these polls may contain a text field used to inform the user of preemption status. This text field is automatically sent to the KDU port (subaddress 00*h*) as a text message if it is present.

The transceiver checks the status of the satellite transmit message packet limit just prior to initiating any message channel transmission. This feature is to reduce as much as possible the latency between the receipt of the poll command and the termination of long message transmissions. If the one packet limit is set and a message channel transmission longer than one packet is commanded, the transmission is aborted. Aborted (or rejected) messages due to excess length is retried using, for example, ARDIS if available. All retry mechanisms in the KDU (or other devices) together with the transceiver continues to attempt to send the message either via ARDIS or via satellite after the message size restriction is removed.

The status message to the KDU (or other devices) optionally includes a reason field indicating that the message was failed (or rejected) due to excess length and also indicates the maximum length available. This capability is to allow the future development of an end-to-end protocol to deliver the failed messages in multiple packets.

OPTION: The transceiver in conjunction with the BS implements a protocol layer designed to transport long from-mobile messages as multiple single packet satellite messages. This protocol does not affect messages being sent via ARDIS. This protocol also does not affect messages being sent to the MT. The protocol is capable of reconstructing messages correctly when the blocks are received at the BS out of order or duplicate blocks are received. Partial messages received at the BS are saved for TBD hours before being discarded. The status of messages on the KDU is not changed to SENT until all segments of the long message are sent. If ARDIS coverage becomes available or the 1 packet transmit message limit is removed during the time when a split message is being sent, it is acceptable to send the message as a single long message and abort the split version of the message unless all segments have been sent. The split messages from the transceiver are sent to a different destination X.121 address so that the BS does not have to open all messages to check for the split message protocol. (Recent data from the MSAT service indicates that less than 13 percent of all satellite from-mobile messages would utilize a split message protocol.) The split message protocol is enabled and disabled in the transceiver using the two poll commands defined above. It is possible to independently set the message length limit and select whether messages that exceed the limit are rejected to the sending device with an adequate reason for failure indication or whether messages that exceed the limit are sent using the above protocol layer.

The transceiver optionally provides continuous receiver operation during both signaling channel and one packet message channel transmissions. Continuous reception is already part of the baseline for signaling channel transmissions. The DSP control algorithms are capable of transmitting one packet message channel exactly like, or similar to, signaling channel transmissions. A code inspection (hdw__ 05.c) also revealed several failure paths from the transmit control function that must be changed to allow continuous reception during these times as well. The DSP delay time should also be reduced for the Jaguar transceiver only. This delay as presently defined compensated for switched power line interaction with the AGC hardware. The continuous reception will work with the delay at its present value but more margin is possible with a shorter delay.

The transceiver checks for the presence or absence of receive carrier just prior to initiating a satellite transmission of any type. The DSP is modified to return the signal strength parameter in response to a query from the control processor at any time. The signal strength value returned by the DSP is for, for example, the 1.00 second (1,200 symbols) just prior to the query. The control processor queries the DSP for signal strength just prior to the start of transmission (for example, within 20 milliseconds of RF on). If the signal is present, the transmission is started normally. If signal is not present, the transmission is aborted with normal protocol recovery and retry of the transmission as required.

The ability to query the DSP for signal strength could also be used to reduce the scanning time of the transceiver. Presently, the transceiver waits 3 frames for a signal strength average on each TDM it acquires during scanning. Three frames is nearly 26 seconds. A change in the process to get perhaps 8 samples in one frame could increase the accuracy of the signal strength reading and reduce the scan time by 17–18 seconds per channel acquired.

The transceiver checks the status of the "out-of-service" flag just prior to initiating a transmission. This feature reduces as much as possible the latency between the receipt of the "out-of-service" poll command and the termination of satellite transmissions. If the flag is set, the transmission is aborted with normal protocol recovery and retry of the transmission as required.

The transceiver is configured with a "universal DNID" used to receive the group polls defined above and the "out-of-service"/"in-service" polls to all MTs as a single group. This DNID may be, for example, a default parameter on the MSAT MTs. This DNID should disable any capability to send and Acknowledgment or Response. This DNID should be LES ID independent. This DNID should be subaddress independent. The "universal DNID" is optionally registered to a PIN that is different from any customers PIN on the LES(s). This PIN will generally have no mobiles registered to it.

BS/LES Software Change Requirements Summary:

The BS sends up to four predefined group poll command types to a DNID contained in all MTs. The two new poll command types are specifically defined for preemption. One of the poll commands is used to set the maximum satellite transmit message size to, for example, 1 INMARSAT-C packet. The other poll command is used to set the maximum transmit message size to the original value as set in transceiver EEPROM. The other polls to be sent are the "out-of-service" and the "in-service" polls. The polls are sent periodically (the period is selectable and as frequently as 3 times per minute per LES) when commanded using the same or similar sequence number in each poll type. These polls are separated from the normal outbound satellite message queue so that they are not lost in the event of an LES shutdown for preemption.

When a command is given to stop sending polls, all polls stuck in an outbound queue are deleted. The destination for these polls is selectable by LES and by Spot Beam and may include any combination of LESs and Spot Beams up to all LESs and all Spot Beams. The commands to control the sending of the polls are from a customer center connection with new commands defined as required to control the above specified functions.

OPTION: Use a PC with standard remote software, such as PCREMOTE software, to perform the above functions. The PC is connected directly to an X.25 PAD to send the polls to the LES. This PC could be located anywhere there is access to an X.25 PAD, a telephone line, and uninterruptable power. It may be advantageous to locate it at the LES. The selections could be done by selecting batch files to run.

OPTION: The BS in conjunction with the transceiver implements a standard protocol layer designed to transport long from-mobile messages as multiple single packet satellite messages. This protocol does not affect messages being sent via ARDIS or affect messages being sent to the MT. The protocol is capable of reconstructing messages correctly when the blocks are received at the BS out of order or duplicate blocks are received. Partial messages received at the BS are saved for TBD hours before being discarded. The status of messages on the KDU are not be changed to SENT until all segments of the long message are sent.

If ARDIS coverage becomes available or the 1 packet transmit message limit is removed during the time when a split message is being sent, it is acceptable to send the message as a single long message and abort the split version of the message unless all segments have been sent. The split messages from the transceiver are sent to a different destination X.121 address so that the BS does not have to open all messages to check for the split message protocol. (Recent data from the MSAT service indicates that less than 13 percent of all satellite from-mobile messages would utilize a split message protocol.)

The split message protocol is enabled and disabled in the transceiver using the two poll commands defined in item #1 above. Distress messages partially received are forwarded immediately with an indication that it is a partial message only. As other portions of the distress message are received, all received portions of the distress message are forwarded again until a complete distress message is forwarded.

As another alternative, an "end-to-end" protocol may be defined that could perform the same function without adding this layer into the transceiver and BS. This eliminates the BS effort to meet this requirement.

Other Requirements Summary:

The LES outbound TDM channels are capable of being shut down within 50 milliseconds of the receipt of a command to shut down. It is assumed for this type of response time that a validated connection from the AMSS(R) system has already been established. The TDMs to be shut down are selectable by Spot Beam within an LES, up to all Beams. Within the system, it is possible to shutdown all LESs by Spot Beam up to all Beams simultaneously. It may be possible to incorporate this functionality directly into the LES.

OPTION: It is presently envisioned that a separate preemption control computer may optionally be used to drive RF switches installed on the TDM outputs of the channel units (see FIG. 28). A PC with remote software may be used to perform the above functions. The PC is connected directly to a special interface card used to drive the RF switches. This PC is optionally located at the LES, and requires access to an external communication source (telephone line, X.25 PAD, TCP/IP port, etc.), the LES channel unit TDM outputs, and uninterruptable power. The selections by LES and Spot Beam could be done by selecting batch files to run. It may also be possible to combine this function in the same computer used to send group polls to the MTs.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

GLOSSARY

AMS(R)S

Aeronautical Mobile Satellite (Route) Service, the service that has priority access on the upper L-Band spectrum.

BS

Base Station, the system element that provides connection between various communication services (multiple LESs, terrestrial service provider network) and the customer centers.

FCC

Federal Communications Commission, the government agency responsible for controlling the use of frequency spectrum and issuing licenses for equipment operating on that spectrum.

FAA

Federal Aviation Administration, the government agency responsible for aeronautical safety. Aeronautical safety communication has been granted priority and preemptive access to much of the spectrum to be used by MSAT communication systems.

INMARSAT

International MARitime SATellite organization, the operator of international satellite services. The protocol used in the satellite portion of Rockwell's Link2000 is based on the INMARSAT-C satellite protocol.

Lower L-Band

Outbound frequencies in the range of 1530 MHz to 1544 MHz and inbound frequencies in the range of 1626.5 MHz to 1645.5 MHz are referred to as Lower L-Band by Footnote US315 to the FCC rules. US315 requires that users in this band give priority access with real-time preemptive capability to the Global Maritime Distress and Safety Service (GMDSS).

LES

Land Earth Station, the system element providing terrestrial access to the satellite channels. In the pre-MSAT system, an LES is capable of providing access to no more than two satellite channels. For MSAT, an LES is capable of providing access to a minimum of six satellite channels. An LES for the Rockwell Link2000 network combines the functionality of the NCS and LES as defined by INMARSAT.

MET

Mobile Earth Terminal, another name for the system element on board the vehicle used for communication.

MT

Mobile Terminal, the system element on board the vehicle used for communication. See also MET.

MSAT

Mobile SATellite, the name given to the type of spot beam satellite.

NCS

Network Coordination Station, the INMARSAT satellite network control channel. On some networks, the functionality of the NCS channel is combined with the LES channel.

NTIA

National Telecommunications and Information Administration, the government agency responsible for coordinating spectrum use.

Preemption

A requirement imposed on the MSAT service by the FCC/FAA where Land Mobile services must be capable of being shut down to provide satellite capacity to priority aeronautical services.

TDM

Time Division Multiplex, a term generally used to define a satellite channel group consisting of a forward Time Division Multiple Access channel, one to forty return signaling channels, and some number of return message channels. A typical TDM channel group consists of 1 forward channel, 6 signaling channels, and 3 message channels.

Terrestrial Service Provider

The supplier of terrestrial communication Services (ARDIS, RAM, CDPD, etc.)

Upper L-Band

Outbound frequencies in the range of 1545 MHz to 1558.5 MHz and inbound frequencies in the range of 1651 MHz to 1660 MHz are referred to as Upper L-Band by Footnote US308 to the FCC rules. US308 requires that users in this band gives priority access with real-time preemptive capability to the AMS(R)S.

What is claimed is:

1. In a mobile satellite system including a communication switching office (CSO) having a satellite antenna for receiving/transmitting a satellite message via a satellite from/to at least one mobile communication system (MCS), at least one controller receiving/transmitting the satellite message from/to the communication switching office issued from the at least one MCS via the satellite to another party, a method of performing a priority process for a priority event in the mobile satellite system, said method comprising the steps of:

(a) continuously monitoring, by the at least one MCS, for receipt of a priority and preemption message comprising at least data relating to the priority event;

(b) transmitting, by the at least one controller, a first satellite message including the priority and preemption message in the mobile satellite system;

(c) receiving, by the at least one MCS, the first satellite message including the priority and preemption message;

(d) receiving, by the at least one MCS, a second satellite message to be transmitted to the mobile satellite system;

(e) performing, by the at least one MCS, responsive to the first satellite message, a message segment protocol to the second satellite message prior to transmitting creating a plurality of message segments comprising the second satellite message;

(f) transmitting, by the at least one MCS, one of the plurality of message segments at a time, until all of the plurality of message segments have been transmitted; and (g) receiving, by the at least one controller, the one of the plurality of message segments, until all of the plurality of message segments have been received.

2. The method of claim 1, wherein said step of transmitting (f) further comprises the steps of:

transmitting the one of the plurality of message segments to an orbiting satellite;

relaying the one of the plurality of message segments from the orbiting satellite to an earth station; and transmitting the one of the plurality of message segments from the earth station to the at least one controller.

3. The method of claim 1, wherein said step of transmitting (f) further comprises the step of transmitting the one of the plurality of message segments from the at least one controller via a second communications system to a user terminal.

4. The method of claim 1, wherein said step of transmitting (f) comprises the steps of transmitting the one of the plurality of message segments to a base station of a cellular telephone system; and transmitting the one of the plurality of message segments from the base station to the central controller.

5. The method of claim 1, further comprising the step of reconstructing the second satellite message using at least substantially all of the plurality of message segments.

6. The method of claim 5, further comprising the step of transmitting the second satellite message to another destination.

7. The method of claim 1, further comprising the step of reconstructing, by at least one of the controller and a base station, the second satellite message using all of the plurality of message segments.

8. The method of claim 7, further comprising the step of transmitting the second satellite message to another destination.

9. The method of claim 7, further comprising the step of transmitting the second satellite message to the base station.

10. The method of claim 1, wherein said step of receiving (c) comprises the step of receiving, by the at least one MCS, the first satellite message including the priority and preemption message comprising a common receive only DNID transmitted in a group poll command.

11. The method of claim 1, wherein said step of receiving (c) further comprises the step of receiving, by a plurality of MCSs, the first satellite message including the priority and preemption message in a group poll command substantially simultaneously, thereby reducing time required to send commands to a large group of the plurality of MCSs.

12. The method of claim 11, wherein said step of receiving (c) further comprises the step of disabling transmission in the plurality of MCSs responsive to the group poll command.

13. The method of claim 1, further comprising at least one of the steps of:

preempting other mobile communicator systems that are at least one of blocked and powered off at time of the preemption are automatically preempted without substantially missing a command;

substantially simultaneously preempting at least one outbound channel with at least one inbound channel of the at least one MCS;

preempting the at least one MCS without a synchronization delay associated with the at least one outbound channel; and preempting the at least one MCS without a delay associated with receiving a command by the at least one MCS.

14. The method of claim 1, wherein said step of receiving (c) further comprises the steps of:

monitoring a signaling channel used by the at least one MCS;

disabling a transmitter in the at least one MCS; and preempting the at least one MCS by at least one of shutting down the signaling channel used by the at least one MCS and utilizing a shut-off command to disable the at least one MCS.

15. The method of claim 14, wherein said preempting step comprises a warning command to warn the at least one MCS a predetermined time period in advance of an expected preemption event, for the at least one MCS to perform the message segment protocol to the second satellite message.

16. The method of claim 14, wherein said monitoring step comprises monitoring the signaling channel used by the at least one MCS to facilitate reception of the first satellite message and reduce time between samples to a substantially single frame.

17. The method of claim 14, wherein said monitoring step comprises monitoring the signaling channel used by the at least one MCS to facilitate reception of the first satellite message and reduce time between samples to a substantially single frame, thereby reducing the time for said monitoring by approximately 17.28 seconds per channel acquired.

18. The method of claim 1, wherein said receiving step (c) further comprises the step of receiving the first satellite message comprising a preemption warning command to warn the at least one MCS a predetermined time period in advance of an expected preemption event, for the at least one MCS to perform the message segment protocol to the second satellite message.

19. The method of claim 1, further comprising the steps of:

determining, by the at least one controller, when the priority event has been completed;

transmitting, by the at least one controller, after the priority event is completed, a third satellite message to the at least one MCS to discontinue the message segment protocol.

20. In a communication system, a method of performing a priority process for a priority event, said method comprising the steps of:

(a) continuously monitoring, by at least one mobile communication system (MCS), for receipt of a priority message comprising at least data relating to an instance of the priority event;

(b) transmitting, by at least one controller, a first message including the priority message in the communication system;

(c) receiving, by the at least one MCS, the first message including the priority message;

(d) receiving, by the at least one MCS, a second message to be transmitted to the communication system;

(e) performing, by the at least one MCS, responsive to the first message, a message segment protocol to the second message prior to transmitting a plurality of message segments comprising the second message;

(f) transmitting, by the at least one MCS, one of the plurality of message segments at a time, until all of the plurality of message segments have been transmitted; and (g) receiving, by the at least one controller, the one of the plurality of message segments, until all of the plurality of message segments have been received.

21. In a communication system, a method of performing a priority process for a priority event, said method comprising the steps of continuously monitoring, by at least one mobile communication system (MCS), a signaling channel for receipt of a priority message, and upon receipt of the priority message disabling a transmitter in the at least one MCS; and preempting the at least one MCS by at least one of shutting down the signaling channel and utilizing a shut-off command to disable the at least one MCS.

22. The method of claim 21, wherein said preempting step comprises a warning command to warn the at least one MCS a predetermined time period in advance of an expected preemption event, for the at least one MCS to perform a message segment protocol responsive to the priority message.

23. The method of claim 14, wherein said monitoring step comprises monitoring the signaling channel used by the at least one MCS to facilitate reception of the priority message and reduce time between samples to a substantially single frame.

24. The method of claim 14, wherein said monitoring step comprises monitoring the signaling channel used by the at least one MCS to facilitate reception of the priority message and reduce time between samples to a substantially single frame, thereby reducing the time for said monitoring by approximately 2–18 seconds per channel acquired.

25. In a mobile satellite system, a method of performing a preemption process for a preemption event, comprising the steps of:
(a) determining by at least one controller that the preemption event is substantially imminent;
(b) determining by the at least one controller at least one service to be preempted;
(c) determining by the at least one controller a predetermined amount of bandwidth to be preempted;
(d) determining by the at least one controller that the preemption event is imminent; and
(e) transmitting a shutdown command with respect to the predetermined amount of bandwidth to be preempted.

26. A method according to claim 25, further comprising the step of maintaining a connection between the at least one controller and the at least one service to be preempted on a substantially continuous basis until the preemption event is completed.

27. A method according to claim 25, further comprising the steps of:
determining when the preemption event has at least one of completed and substantially completed;
transmitting a release bandwidth message to the at least one service to release at least one of all and a portion of the predetermined bandwidth for use by the at least one mobile communication system.

28. A method according to claim 25, further comprising the step of transmitting by the at least one controller additional shutdown commands identifying additional bandwidth to be cleared for use during the preemption event.

29. In a mobile satellite system, a method of performing a preemption process for a preemption event, comprising the steps of determining by at least one controller that the preemption event is substantially imminent and at least one service to be preempted for use by an aeronautical system; determining by the at least one controller a predetermined amount of bandwidth to be preempted; determining by the at least one controller that the preemption event is imminent; transmitting a shutdown command with respect to the predetermined amount of bandwidth to be preempted; and upon at least substantial completion of the preemption event, clearing a connection between the aeronautical system and the at least one controller.

30. In a mobile satellite system including a communication switching office (CSO) having a satellite antenna for receiving/transmitting a satellite message via a satellite, a system for performing a priority process for a priority event, comprising:
at least one mobile communication system (MCS) continuously monitoring for receipt of a priority and preemption message comprising at least data relating to an instance of preemption, said at least one mobile communication system
receiving a first satellite message including the priority and preemption message,
receiving a second satellite message to be transmitted by the mobile satellite system,
performing, responsive to the first satellite message, a message segment protocol to the second satellite message prior to transmitting and creating a plurality of message segments comprising the second satellite message, and
transmitting each of the plurality of message segments at a time, until substantially all of the plurality of message segments have been transmitted; and
at least one controller responsively communicable and connected to said at least one MCS, and transmitting the first satellite message including the priority and preemption message in the mobile satellite system, and receiving each of the plurality of message segments transmitted by the at least one MCS.

31. A receiver-transmitter system comprising half-duplex hardware capable of continuously receiving control messages while simultaneously transmitting short message segments, said capability providing the equivalent of full-duplex performance at half-duplex cost, wherein when said receiver-transmitter system is in a preemption mode, only the short message segments are transmitted as short data packets substantially individually and substantially one packet at a time.

32. A receiver-transmitter system according to claim 31, wherein the short data packets are transmitted within at least a time interval where interleaving may be used to substantially reconstruct the control messages from a bulletin board to determine whether to transmit in the pre-emption mode.

33. A receiver-transmitter system according to claim 31, wherein when the receiver-transmitter system receives a preemption command to transition the receiver-transmitter to the pre-emption mode, the receiver-transmitter system transitions into a short message transmitting mode waiting to be instructed to start transmitting again.

34. A receiver-transmitter system according to claim 31, wherein the short message segments are used to further minimize an amount of data in a bulletin board that may be lost.

35. A receiver-transmitter system according to claim 31, wherein when the receiver-transmitter system receives a pre-emption command to transition the receiver-transmitter to the pre-emption mode, the receiver-transmitter system shuts down a forward channel via a bulletin board, denying the receiver-transmitter system from transmitting information, thereby making available resources for priority traffic.

36. A receiver-transmitter system according to claim 31, wherein when the receiver-transmitter system receives a pre-emption command comprising a super DNID in a bulletin-board transmitted by an external source to transition the receiver-transmitter to the pre-emption mode and the super DNID substantially matches a stored super DNID, the receiver-transmitter system transitions into a short message transmitting mode to transmit only the short message segments to indicate that a potential urgent message in the bulletin board may be transmitted, and to indicate to the receiver-transmitter system to start sending only the short message segments to conserve communication resources.

37. A receiver-transmitter system according to claim 31, wherein when another super DNID is received by the receiver-transmitter system, the pre-emption mode is terminated and the receiver-transmitter system returns to a normal mode.

38. A receiver-transmitter system according to claim 31, wherein when the receiver-transmitter system receives the pre-emption command, the receiver-transmitter system is at least one of shut down or the transmitting of the short message segments performed, thereby freeing up communication resources for a subsequent priority message.

39. A receiver-transmitter system according to claim 32, wherein when the receiver-transmitter system receives the preemption command, the receiver-transmitter system is at least one of shut down or the transmitting of the short message segments performed, thereby freeing up communication resources for a subsequent priority message.

40. A receiver-transmitter system according to claim 33 wherein when the receiver-transmitter system receives the pre-emption command, the receiver-transmitter system is at least one of shut down or the transmitting of the short message segments performed, thereby freeing up communication resources for a subsequent priority message.

41. A receiver-transmitter system according to claim 31, wherein when the receiver-transmitter system receives a pre-emption command to transition the receiver-transmitter to the pre-emption mode, the receiver-transmitter system transits the short message segments, permitting the receiver-transmitter system to transmit without substantially missing any bulletin boards, thereby conserving communication resources for a subsequent priority and pre-emption message.

42. A receiver-transmitter system according to claim 31, wherein when the receiver-transmitter system receives a pre-emption command to transition the receiver-transmitter to the pre-emption mode, the receiver-transmitter system transits the short message segments on one channel, receives the control commands on another channel.

43. A receiver-transmitter system according to claim 31, wherein when the receiver-transmitter system receives a preemption command to transition the receiver-transmitter to the pre-emption mode, the receiver-transmitter system operates at substantially less than full transmit capacity, thereby conserving communication resources for a subsequent priority and pre-emption message.

* * * * *